United States Patent [19]
Nagai et al.

[11] Patent Number: 6,124,700
[45] Date of Patent: Sep. 26, 2000

[54] CHARGING METHOD, CHARGING EQUIPMENT, AND INTEGRATED CIRCUIT

[75] Inventors: Tamiji Nagai; Kazunori Ozawa, both of Kanagawa; Kuniharu Suzuki, Tokyo; Kazuo Yamazaki, Kanagawa, all of Japan

[73] Assignee: Sony Corporation, Tokyo, Japan

[21] Appl. No.: 08/809,724

[22] PCT Filed: Jul. 31, 1996

[86] PCT No.: PCT/JP96/02162

§ 371 Date: Aug. 10, 1998

§ 102(e) Date: Aug. 10, 1998

[87] PCT Pub. No.: WO97/06591

PCT Pub. Date: Feb. 20, 1997

[30] Foreign Application Priority Data

Aug. 10, 1995 [JP] Japan ................................. P07-204686
Jan. 17, 1996 [JP] Japan ................................. P08-006028
Jun. 28, 1996 [JP] Japan ................................. P08170230

[51] Int. Cl.[7] ............................................ H02J 7/00
[52] U.S. Cl. ................................... 320/132; 320/130
[58] Field of Search .................... 320/132, 130, 320/152, 153, 157, 159, 162

[56] References Cited

U.S. PATENT DOCUMENTS

| 5,355,073 | 10/1994 | Nguyen | 320/160 |
| 5,391,974 | 2/1995 | Shiojima et al. | 320/162 |
| 5,408,170 | 4/1995 | Umetsu et al. | 320/155 |
| 5,465,039 | 11/1995 | Narita et al. | 320/152 |
| 5,637,981 | 6/1997 | Nagai et al. | 320/162 |
| 5,977,749 | 11/1999 | Kim | 320/132 |

*Primary Examiner*—Peter S. Wong
*Assistant Examiner*—Lawrence Luk
*Attorney, Agent, or Firm*—Jay H. Maioli

[57] ABSTRACT

When a secondary battery such as a lithium ion battery, etc. requiring constant-voltage charging is charged, the battery voltage and charging current of the secondary battery are detected under a specified state, and in accord with the detected state, a voltage at which charging is carried out, the charging time or charging stop period thereof, or connecting condition of the charging circuit etc. are controlled in order to favorably charge the secondary battery to a full-charge or to a nearly full-charged state, thereby effectively preventing deterioration of characteristics of the secondary battery.

65 Claims, 49 Drawing Sheets

F I G. 17
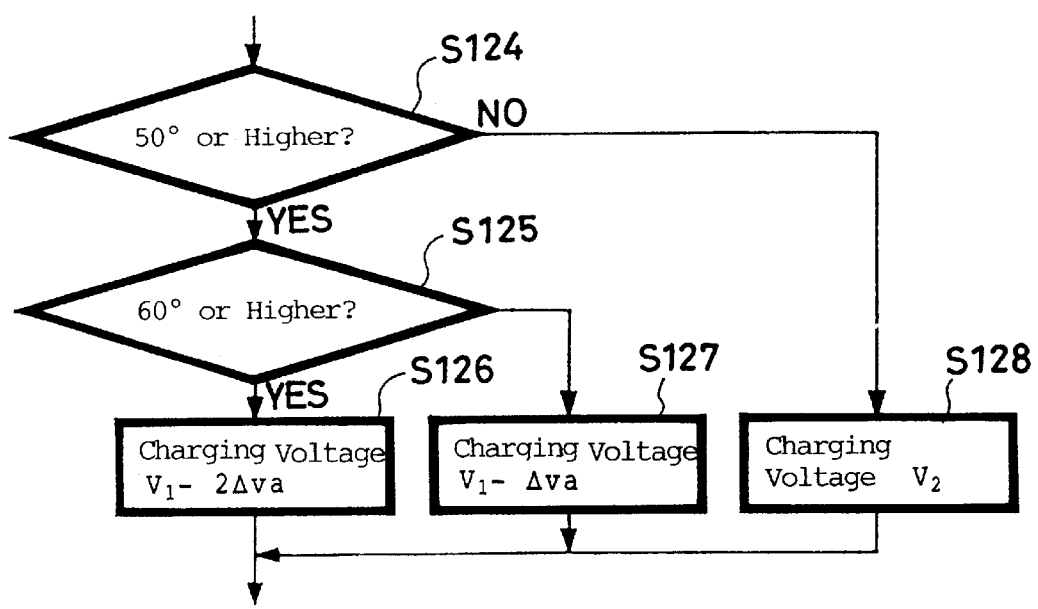

F I G. 28
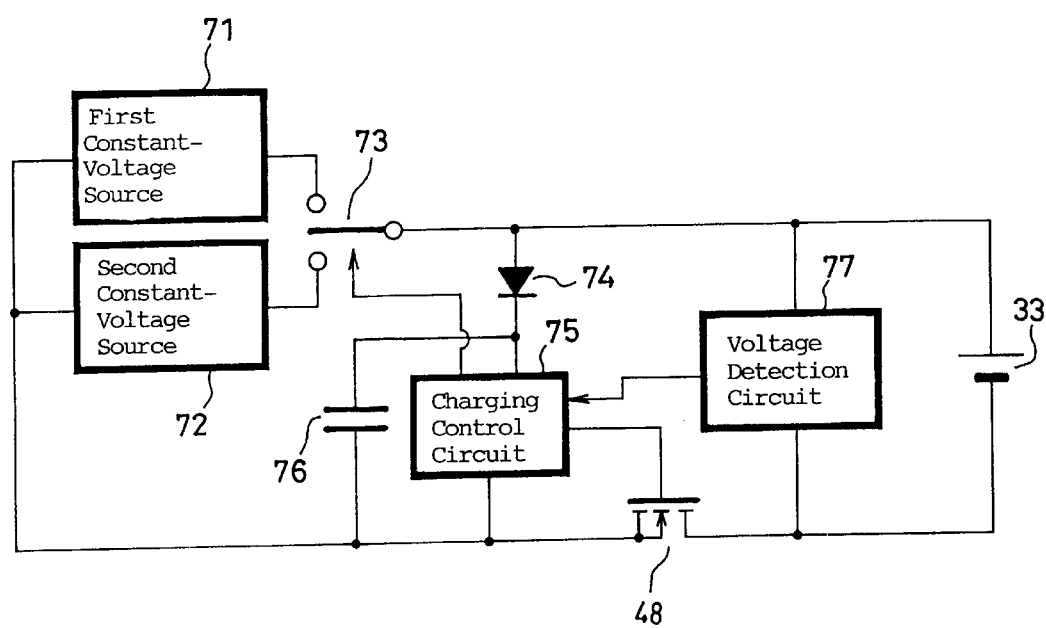

CHARGING METHOD, CHARGING EQUIPMENT, AND INTEGRATED CIRCUIT

TECHNICAL FIELD

The present invention relates to a charging method and charging equipment for secondary batteries and an integrated circuit used for its charging control, and more particularly to a charging method and charging equipment suitable for applying to secondary batteries which require constant-voltage charging such as lithium ion batteries or the like and an integrated circuit used for its charging control.

BACKGROUND ART

Conventionally, for secondary batteries which are able to be charged and require constant-voltage charging, lithium ion batteries are developed. This lithium ion battery is charged with the characteristics shown, for example, in FIG. 1. FIG. 1 is a characteristic diagram of charging current/voltage vs. elapsed time of a general lithium ion battery, in which charging is carried out with a charging current I set as a constant current from the initiation of charging until the battery voltage reaches a specified potential. Carrying out this constant-current charging increases a battery voltage V and when it exceeds a specified value, charging is changed over to constant-voltage charging. In this event, for example, voltage $V_1$ corresponding to battery voltage when the lithium ion battery is fully charged (that is, 100% charged) is supplied. Carrying out this constant-voltage charging charges the lithium ion battery, causes the battery voltage to rise to voltage $V_1$, but as this charging takes place, the charging current I decreases. Now, when this charging current I decreases to a specified value, it is judged that the lithium ion battery is 100% charged (or charged nearly to 100%), and supply of charging current is stopped.

Charging in this way allows the lithium ion battery to be efficiently charged to 100%.

Now, the lithium ion battery charged to 100% in this way may sometimes have the characteristics deteriorated by the charging condition thereafter. That is, if the voltage $V_1$ corresponding to battery voltage when the lithium ion battery is fully charged is constantly applied to the 100% charged lithium ion battery from the charging equipment as charging voltage and small-power charging is repeatedly carried out, the charging condition can be maintained to nearly 100% condition even when there is self-discharge. However, when such nearly 100% condition continues, the lithium ion battery becomes characteristics which tends to gradually reduce the chargeable capacity, and eventually deteriorates the characteristics as a secondary battery.

In order to prevent characteristics deterioration due to the continuation of the 100% charged condition, for example, stopping charging at about 90% of the charging capacity is assumed, but this results in inconvenience that the capacity prepared as a secondary battery is not effectively utilized.

When temperature of the battery itself rises, the lithium ion battery has a disadvantage that the chargeable capacity decreases and battery characteristics rapidly deteriorate, and it also has a disadvantage that it is not preferable to be charged to the full charging level with the battery temperature increased at the time of charging under the same conditions as those free of temperature rise.

As described above, it is when there remains scarcely charged voltage in the lithium ion battery to carry out constant-current charging at first and then change over to constant-voltage charging to charge the battery, and when any voltage remains in the battery, it is necessary to carry out constant-voltage charging with the charging current reduced, thereby preventing deterioration of characteristics as a secondary battery resulting from rapid charging by large current.

Consequently, before charging is started, the condition of the battery to be charged must be detected and the remaining voltage must be detected. In order to detect this remaining voltage, charging is carried out with a small current called pre-charging at the start of charging, the battery voltage, etc. at that time is detected, and the remaining voltage of the battery is detected.

FIG. 2 shows one example of a circuit configuration of a conventional charging equipment which can carry out the pre-charging, in which to one end on the secondary side (primary side is omitted) of a switching transformer 1 that composes the switching power supply, the anode of diode 2 is connected, and the cathode of this diode 2 and the other end on the secondary side of a transformer 1 are connected with a capacitor 3, and direct current power supply of a specified voltage is obtained by rectification by diode 2 and smoothing by capacitor 3.

The cathode of diode 2 is connected to one end (positive electrode) of a secondary battery (lithium ion battery) 4 loaded to this charging equipment via an opening and closing switch SW1, and the other end (negative electrode) of this secondary battery 4 is connected to the other end on the secondary side of the switching transformer 1. In parallel to the opening and closing switch SW1, a series circuit comprising an opening and closing switch SW2 and a resistor 5 is connected.

In this event, opening and closing of switches SW1 and SW2 are controlled by a control circuit 6. This control circuit 6 is connected in such a manner that the power supply is fed from the secondary side of the switching transformer 1 and is operated by this power supply. And this control circuit is designed to detect the condition of the secondary battery 4 by some method not illustrated (for example, detection of battery voltage).

To explain the control by the control circuit 6, at the start of charging, the switch SW2 is held closed, while the switch SW1 is held open. Keeping the switches in this condition allows the power supply to be fed from the secondary side of switching transformer 1 with the resistor 5 connected to the secondary battery 4 in series, reduces the charging current to be fed to the secondary battery 4 as much as the loss caused by this resistor 5, and allows pre-charging by small current to take place. And under this pre-charging condition, the battery condition such as battery voltage of the secondary battery 4 or the like is detected by the control circuit 6, and if the detected condition is judged to be the condition with little remaining voltage that allows rapid charging, switch SW1 is held closed, switch SW2 is held open, charging current is supplied to the secondary battery 4 with the resistor 5 in the condition free of loss, and rapid charging by large current is begun.

Now, FIG. 3 shows the charging characteristics when switch SW1 is turned on and those when switch SW2 is turned on, indicating that comparatively large current is allowed to flow at a given voltage as charging characteristics when switch SW1 is turned on. The charging characteristics when switch SW2 is turned on are such that the current value is suppressed to a small value.

In this way, configuring to provide a plurality of paths for accommodating the charging current and to vary the charging current to carry out pre-charging results in complicated configuration of the charging equipment as much and constitutes an inconvenience.

As a configuration of another charging equipment for enabling conventional pre-charging, there is one with the circuit configuration shown in FIG. 4. In the case of this circuit, the cathode of diode 2 is connected to one end (positive electrode) of the secondary battery 4 (lithium ion battery) mounted to this charging equipment via an opening/ closing closing switch SW3, and the other end (negative electrode) of this secondary battery 4 is connected to the other end on the secondary side of the switching transformer 1.

And opening and closing of the switch SW3 are controlled by a control circuit 7. This control circuit 7 is connected in such a manner that the power supply is fed from the secondary side of the switching transformer 1. And this control circuit is designed to detect the condition of the secondary battery 4 by some method not illustrated (for example, detection of battery voltage), and opening and closing of switch SW3 are controlled based on the detected condition.

Now, to explain the control condition of switch SW3, in carrying out ordinary charging (rapid charging, etc.), switch SW3 is continuously held closed, and in carrying out pre-charging with small current, opening and closing of switch SW3 are repeatedly carried out. That is, for example, as shown in FIG. 5, when precharging is carried out at the start of charging, ON/OFF of switch SW3 are repeated to intermittently supply a specified current value I to the secondary battery 4, and average charging current is lowered, bringing about the conditions in which pre-charging Pre is able to be carried out by small current. When precharging is switched to ordinary charging, switch SW3 is continuously held closed, and charging by the specified current value I is continuously carried out.

Pre-charging by intermittently opening and closing this switch in this way enables both ordinary charging and pre-charging only by installing one switch, but at the time of pre-charging by ON/OFF of this switch, the peak current when opening and closing of the switch are changed over is transmitted to the control circuit 7, and there is a high possibility to adversely affect operation of the control circuit 7. Consequently, pre-charging by repeating ON/OFF of the switch in this way is not preferable.

Another problem is an error in detection of battery voltage in the battery charger, and there is a case in which the error deteriorates the battery characteristics.

That is, FIG. 6 shows one example of the charging control condition when the conventional lithium ion battery is 100% charged. For example, suppose that a lithium ion battery with voltage $V_1$ when fully charged is charged and the battery voltage of this battery reaches $V_1$ at a certain timing $t_1$. In this event, this lithium ion battery is judged to be fully charged and supply of charging current is stopped. Stopping charging causes the lithium ion battery to gradually reduce battery voltage due to self discharge or discharge to the load circuit.

Now, the charging circuit is set to restart charging when the battery voltage reaches a predetermined voltage $V_2$. Suppose that the charging circuit detects this battery voltage $V_2$ at timing $t_2$, then, charging is restarted at this timing $t_2$, and the battery voltage rises again as shown with characteristic Vx, achieving the fully charged condition.

By setting in this way, the battery voltage is able to be held to the voltage close to full charging. Now the lithium ion battery is constantly charged nearly 100% by bringing the voltage $V_2$ to restart charging to a voltage value extremely close to the battery voltage $V_1$ when fully charged, but since achieving this state accelerates deterioration of the battery, voltage $V_2$ to restart charging shall be set to the voltage slightly reduced from the battery voltage $V_1$ when fully charged to allow the remaining battery voltage to vary in a certain range, thereby preventing deterioration of the battery.

However, in general, in the voltage detection circuit with comparatively simple configuration built into this kind of battery charger, it is difficult to constantly accurately detect voltage $V_{12}$, and an error $\Delta V$ is generated in the detection value of the voltage. Now, as shown in FIG. 6, if a voltage higher than actual setting by the error $\Delta V$ is judged to be the voltage $V_1$(timing $t_2$'), the battery returns to the fully charged condition more quickly than the originally set condition (condition by characteristic Vx) as in the case of the characteristic Vy shown with broken line, and deterioration of the battery characteristics is accelerated.

In addition, when the secondary battery is charged to full charge and charging is stopped, depending on the condition on the battery charger side, there is a case in which discharge current is generated from the secondary battery to the battery charger side, and in such event, charging of the secondary battery is restarted in a short time, shortening the frequency to carry out charging.

DISCLOSURE OF THE INVENTION

In view of the foregoing problems, it is the first object of the invention to effectively utilize the battery capacity without deteriorating the battery.

The second object is to detect the battery condition in a simple construction and accurately upon charging.

The third object is to effectively charge the battery without deteriorating the battery even if there is any detection error in the battery condition.

The fourth object is to prevent wasteful discharge from the secondary battery in the fully charged condition of the secondary battery.

The first invention is a charging method to change over the voltage applied to the secondary battery to the second voltage lower than the first voltage when charging current is detected during charging by applying the first voltage to the secondary battery and the first charging current corresponding to the nearly fully charged condition of the said secondary battery is detected in the charging method for charging the secondary battery which is charged by constant-voltage charging, as well as to change over the voltage application to that of the first voltage when the current exceeding the second charging current corresponding to the specified remaining battery voltage is detected, with the second voltage applied to the secondary battery. By this charging method, only when the remaining battery voltage lowers to the specified value, the battery is charged to the fully charged condition by the first voltage. Consequently, after the battery is once charged to the fully charged condition, charging to full charge is repeated every time the battery lowers to the specified remaining battery voltage, and the secondary battery condition can be constantly maintained to the nearly fully charged condition, and at the same time, because the second voltage lower than the first voltage is applied to the battery except when charging to this full charge is carried out, the secondary battery is not continuously brought to the fully charged condition, and deterioration in secondary battery performance caused by continued fully charged condition can be prevented.

The second invention uses the same current value for the said second charging current and the said first charging current in the charging method according to the first invention. According to this charging method, charging condition can be successfully controlled.

The third invention is a charging method according to the first invention designed to detect temperature inside or in the vicinity of the said secondary battery, and to change over the application of the said second voltage to the application of the third voltage of the potential across the said first and the second voltages in place of changing it over to the said first voltage when the detected temperature exceeds a specified temperature. According to this charging method, it is possible to suppress deterioration of secondary battery performance caused by temperature rise.

The fourth invention is a charging method according to the third invention designed to continuously change the said third voltage in accordance with the temperature detected as above. According to this charging method, charging control corresponding to temperature is favorably carried out.

The fifth invention is a charging method to detect the battery voltage of the said secondary battery while charging the said secondary battery by applying the first voltage according to the charging method of the secondary battery where charging takes place by constant-voltage charging, to change over the voltage applied to the said secondary battery to the second voltage lower than the said first voltage when a specified voltage corresponding to the nearly full-charge state of the said secondary battery is detected, and at the same time, to change over to application of the said first voltage when a specified charging current is detected with this second voltage applied to the secondary battery. According to this charging method, the battery is charged to nearly full-charge state only when the remaining battery voltage lowers to a specified value. Consequently, once after it is charged to the full-charge state, charging to the full-charge is repeatedly carried out every time the battery remaining voltage lowers to a specified value, thereby maintaining the secondary battery condition constantly to nearly full-charge state, and at the same time, because except when this charging to the full-charge is carried out, the secondary voltage lower than the first voltage is applied, the secondary battery is not continuously brought to the full-charge state and thereby deterioration of the secondary battery performance caused by continuation of the full-charge state can be prevented.

The sixth invention is a charging method according to the fifth invention wherein the application of the said second voltage is changed over to the application of the third voltage of the potential between the said first and the second voltages in place of changing it over to application of the said first voltage when temperature inside or in the vicinity of the said secondary battery is detected and the detected temperature is a specified temperature or higher. According to this charging method, it is possible to favorably control the charging state.

The seventh invention is a charging method according to the sixth invention designed to continuously change the said third voltage in accord with the temperature detected as above. According to this charging method, it is possible to favorably control charging in accord with the temperature.

The eighth invention is a charging method designed to detect the potential across one end and the other end of a switching means for controlling start and stop of supply of the charging power supply to the said secondary battery or the potential across one end and the other end of the said secondary battery with low-voltage charging power supply fed to the said secondary battery in the charging method for charging the secondary battery which requires constant-current charging at the start of charging, to turn on the said switching means based on this detected potential, and at the same time to start charging to the secondary battery with the charging power supply to be fed to the said secondary battery designated as a specified potential. According to this charging method, it is possible to control the switching means and to detect the secondary battery condition based on the detection of the potential across one end and the other end of this switching means or the potential across one end and the other end of the secondary battery, thereby enabling accurate detection of the secondary battery condition as in the case of the conventional pre-charging. Consequently, it is possible to accurately detect the secondary battery condition without providing a charging circuit specialized for pre-charging and to simplify the circuit configuration of the charging equipment.

The ninth invention is a charging method according to the eighth invention designed to use a field effect transistor as the said switching means, to increase the impedance across one end and the other end of this field effect transistor, and to detect the said potential. According to this charging method, only carrying out the impedance control of the field effect transistor, it is possible to easily detect the secondary battery condition, and at the same time to reduce the loss of the field effect transistor even when the battery voltage of the secondary battery is low or shorted.

The tenth invention is a charging method according to the eighth invention designed to keep the potential of the said charging power supply when the said potential is detected to the value in the vicinity of the lowest required voltage for controlling the said switching means. According to this charging method, it is possible to detect the secondary battery condition with the lowest voltage charging power supply fed to the secondary battery, and to detect the electrical condition of the secondary battery with the minimum load applied to the secondary battery and the circuit, as well as to detect the secondary battery electrical state under the favorable condition.

The 11th invention is a charging method according to the eighth invention designed to raise the potential of the said charging power supply in accord with an increase of the potential across one end and the other end of the said secondary battery after the start of the said charging. According to this charging method, it is possible to nearly uniformly hold the electric power applied to the switching means, and it is also possible to hold the switching means to a favorable condition.

The 12th invention is a charging method according to the eighth invention designed to change and increase the potential of the said charging power supply in a plurality of stages in accord with an increase of the potential across one end and the other end of the secondary battery after the said charging begins. According to this charging method, it is possible to nearly uniformly keep the electric power applied to the switching means, and it is also possible to keep the switching means to the favorable condition. In this case, since voltage is allowed to be varied in a plurality of stages, a simple control is only required for the voltage circuit.

The 13th invention is a charging method according to the eighth invention designed to lower the potential of the said charging power supply, when the said potential is detected, to the voltage below the minimum required one for controlling the said switching means, and at the same time to accumulate this charging power supply by a charge-storage means, thereby securing the potential required for carrying out the corresponding control by the said switching means. According to this charging method, as long as electric charge is accumulated in the charge-storage means, it is possible to keep the voltage of the charging power supply to be fed to the secondary battery when the voltage is detected with a detection means to the voltage lower than the one which can control the switching means, enabling the detection of the secondary battery condition more favorably with lower voltage applied.

The 14th invention is a charging method for enabling the restart of charging of the secondary battery after a specified time passes from this detection when the said secondary battery is detected to achieve a specified electrical state after charging is stopped when the nearly full-charge state is detected in a charging method for charging the secondary battery which is carried out by constant-voltage charging. According to this charging method, it is possible to designate the time to restart charging once it comes in the full-charge state (or nearly full-charge state) to the time in which a specified time is added to the time for a battery to reach a specified electrical condition, and even if any error exists in the detected battery condition, it is possible to secure a certain time for returning to the full-charge condition, and it is thereby possible to prevent deterioration of characteristics of the secondary battery caused by continuation of the full-charge conditions.

The 15th invention is a charging method according to the 14th invention designed to detect the said specified electrical condition and to detect that the battery voltage of the said secondary battery lowers by a specified value from the voltage with the said charging voltage set as a standard. According to this charging method, it is possible to exactly detect the decrease of battery voltage with the charging voltage as a standard, and to accurately control the condition of the secondary battery.

The 16th invention is a charging method according to the 14th invention designed to detect the said specified electrical condition, and to detect that the battery voltage becomes a specified voltage from the voltage value with the grounding potential of the said secondary battery set as a standard. According to this charging method, it is possible to properly control the secondary battery condition by comparatively simple voltage detection.

The 17th invention is a charging method according to the 14th invention designed to detect that the charging current when a specified voltage is applied to the said secondary battery becomes a specified value as detection of the said required electrical condition. According to this charging method, it is possible to properly control the charging condition of the secondary battery based on the detection of the current value.

The 18th invention is a charging method according to the 17th invention wherein the said required voltage is lower than the charging voltage of the said constant voltage. According to this invention, it is possible to detect the secondary battery condition by the voltage lower than the charging voltage, and to properly detect the battery condition with a load applied to the secondary battery reduced.

The 19th invention is a charging method for charging the secondary battery with the constant voltage charging voltage, which is designed to detect the electrical condition of the said secondary battery every time a specified time passes from the time when the nearly full-charge of the secondary battery is detected to the time when charging is stopped, and to restart charging when this detected electrical condition is a specified condition. According to this charging method, it is possible to keep the time open at least for the specified period from the time when charging is stopped once full-charge condition is attained to the time when charging is restarted, thereby enabling preventing of deterioration of the secondary battery characteristics.

The 20th invention is a charging method according to the 19th invention designed to restart charging after a specified time passes from the time when the specified electrical condition is detected. According to this charging method, it is possible to more effectively secure the time before it returns to the full-charge condition and to more improve the effect to prevent deterioration of the secondary battery characteristics.

The 21st invention is a charging method according to the 19th invention designed to detect that the charging current exceeds a specified value when the said charging voltage or voltage lower than this charging voltage is applied to the said secondary battery for the detection of the said specified electrical condition. According to this charging method, it is possible to accurately detect the secondary battery condition from the charging current.

The 22nd invention is a charging method according to the 19th invention designed to detect that the battery voltage of the said secondary battery attains the specified voltage for the detection of the said specified electrical condition. According to this charging method, it is possible to accurately detect the secondary battery condition from the battery voltage.

The 23rd invention is a charging method according to the 22nd invention designed to charge at least the energy required for detecting the battery voltage in the said secondary battery when the said secondary battery voltage does not attain the specified voltage and charging is not restarted. According to this charging method, it is possible to effectively prevent the decrease of remaining voltage caused by repeating detection of the battery condition every specified time.

The 24th invention is a charging method according to the 22nd invention designed to detect that a specified voltage lowers from the voltage set by the said charging voltage designated as a standard for detection of the said specified voltage. According to this charging method, it is possible to accurately detect lowering of the battery voltage set by the charging voltage designated as a standard, and to accurately control the secondary battery condition.

The 25th invention is a charging method according to the 22nd invention designed to detect that the battery voltage attains the specified voltage value from the voltage set with the grounding potential of the said secondary battery designated as standard for detection of the said specified voltage. According to this charging method, it is possible to accurately control the secondary battery condition by comparatively simple voltage detection.

The 26th invention is a charging method for charging the secondary battery which is designed to detect the electrical condition of the said secondary battery, to selectively supply the first and the second voltages to the said secondary battery in accordance with the detected electrical condition, and to carry out ON/OFF control of application of the selected voltage to the said secondary battery in accord with the said detected electrical condition. According to this charging method, it is possible to select the first and the second voltages for the voltage applied to the secondary battery, and at the same time, to be able to carry out ON/OFF control for the application of the selected voltage, and to prevent discharge from the battery to the charging circuit side when charging voltage lower than the battery voltage is established, thereby preventing wasteful discharge of the secondary battery when voltage applied to the secondary battery is allowed to be varied.

The 27th invention is a charging method according to the 26th invention designed to charge the secondary battery with application of this voltage to the said secondary battery turned off with the said second voltage selected when the said secondary battery is judged to be charged to a specified value by the detection of the said electrical condition after the said first voltage is selected and applied to charge the said secondary battery when the charging voltage of the said secondary battery is lower than the specified value by the detection of the said electrical condition, and it is also designed to charge the secondary battery with the application of the said second voltage to the said secondary battery turned on when the secondary battery voltage is judged to be lower than the said second voltage. According to this charging method, it is possible to effectively prevent wasteful discharge from the secondary battery and at the same time to be able to charge the second voltage to the secondary battery free of detrimental effects when charging is restarted.

The 28th invention is a charging method according to the 27th invention designed to judge that the said secondary battery voltage is lower than the said second voltage when it is judged that the voltage is lower than the said second voltage again in a specified time after it is judged at least once that the voltage is lower than the said second voltage. According to this charging method, it is possible to charge the secondary battery with the second voltage when the secondary battery voltage is positively lower than the second voltage and to restart charging under the favorable condition free of deteriorating the secondary battery.

The 29th invention is a charging method according to the 27th invention designed to apply the said second voltage to the secondary battery for charging when it is judged that the secondary battery voltage is the third voltage lower than the second voltage. According to this charging method, it is possible to restart charging under the favorable condition free of deteriorating the secondary battery only by judgment of the battery voltage without counting passage of time.

The 30th invention is a charging method according to the 27th invention designed to detect the potential difference between one end and the other end of a switching means for carrying out the said ON/OFF control and judge that the said secondary battery voltage is lower than the second voltage. According to this charging method, it is possible to accurately judge the battery voltage at the restart of charging.

The 31st invention is a charging method according to the 27th invention designed to judge that the said secondary battery voltage is lower than the said second voltage when the current of the said secondary battery is judged to be lower than the specified current value when voltage application to the said secondary battery is turned off. According to this charging method, charging process at the second voltage is carried out only when the current flowing in the load circuit is lower than the specified value (for example, in the case of the vicinity of zero), and it is possible to prevent charging at a low voltage when the load current exceeds the specified value.

The 32nd invention is a charging method according to the 27th invention designed to detect the potential difference between one end and the other end of a switching means for carrying out the ON/OFF control when the said secondary battery current is lower than the specified current when the application of voltage to the said secondary battery is turned off and to judge that the said secondary battery voltage is lower than the said second voltage. According to this charging method, it is possible to judge the restart of charging by accurate voltage judgment based on the potential difference between one end and the other end of the switching means only when the current flowing in the load current is lower than the specified value.

The 33rd invention is a charging method according to the 26th invention designed to select the second voltage and charge with the application of voltage to the said secondary battery turned on when the current flowing in the secondary battery again at least after a specified time is judged to be lower than the said specified value after the current flowing in the secondary battery is judged to be lower than the specified value under the condition in which this second voltage is selected with the application of voltage to the secondary battery turned off under the condition in which the second voltage is selected when the voltage is charged with the application of the voltage to the secondary battery turned on with the first voltage selected when the charged voltage of the secondary battery is judged to be lower than the specified value. According to this charging method, it is possible to effectively prevent wasteful discharge from the secondary battery as well as to judge the restart of charging based on judgment of the current.

The 34th invention is a charging method according to the 33rd invention designed to detect the current flowing in the current path connected to the said secondary battery different from the current path fed to the said secondary battery via a switching means for carrying out the said ON/OFF control from a means for supplying the said first and the second voltages for detection of the current flowing to the said secondary battery. According to this charging method, it is possible to detect the stable current value not subject to fluctuation of voltage applied.

The 35th invention is a charging method according to the 26th invention designed to provide the first and the second switching means in parallel as switching means to carry out the said ON/OFF control and to supply constant current to the second switching means, and when the charged volume of the secondary battery is lower than the specified volume, it is designed to charge the secondary battery with the first switching means turned on and the second switching means turned off under the condition in which the first voltage is selected when the charging volume of the secondary battery is judged to be lower than the specified volume, and when the charged volume of the secondary battery is judged to be charged to the specified volume, it is designed to turn off the first and the second switching means with the second voltage selected, and when the secondary battery voltage is judged to be lower than the second voltage with the second voltage selected, it is designed to turn on the second switching means and to supply the said constant current to the secondary battery for charging. According to this charging method, it is possible to achieve favorable charging by constant current.

The 36th invention is a charging equipment for charging the secondary battery which is charged by constant charging voltage, comprising a first voltage feeding means for feeding the first voltage to the secondary battery, a second voltage feeding means for feeding the second voltage lower than the first voltage to the secondary battery, a current detection means for detecting charging current to the secondary battery, and a control means for changing over the supply by the first voltage feeding means to and from the supply by the second voltage feeding means based on the detection results by the said current detection means, wherein when the current detecting means detects the first charging current corresponding to nearly full-charge by the current detection means, the supply to the secondary battery is changed over from the first voltage feeding means to the second voltage feeding means, and at the same time, when the current detection means detects current exceeding the second charging current with the second voltage fed to the secondary battery from the second voltage feeding means by this change-over, the supply is changed over to that by the first voltage feeding means. According to this charging equipment, the battery is charged to the full-charge condition by the first voltage only when the battery charging remainder lowers to a specified value. Consequently, once it is charged to the full-charge condition, charging to the full-charge is repeated every time the battery lowers to the specified battery charging remainder and the secondary battery is able to be constantly maintained to nearly full-charge condition, and at the same time, because the second voltage lower than the first voltage is applied to the battery except when charging to this full-charge is carried out, the secondary battery is not brought to continuous full-charge condition, and deterioration of secondary battery performance caused by continued full-charge condition can be prevented.

The 37th invention is the charging equipment according to the 36th invention wherein the first charging current is the same as the second charging current. According to this charging equipment, the charging condition can be favorably controlled.

The 38th invention is the charging equipment according to the 36th invention, comprising the third voltage feeding means for feeding the third voltage of the potential across the first and the second voltages to the secondary battery, and a temperature detection means for detecting temperature inside or in the vicinity of the secondary battery, wherein only when the detected temperature of the secondary battery exceeds a predetermine temperature, the second voltage feeding means is changed over to the third voltage feeding means in place of changing over from the second voltage feeding means to the first voltage feeding means. According to this charging equipment, charging corresponding to temperature is favorably controlled.

The 39th invention is designed to continuously change the output voltage of the third voltage feeding means in accord with temperature detected by the temperature detection means in the charging equipment according to the 38th invention. According to this charging equipment, it is possible to finely control the charging voltage in accord with the then temperature at that time, and charging control corresponding to temperature can be favorably carried out.

The 40th invention is the charging equipment for charging the secondary battery in which charging is carried out by the constant voltage charging voltage, comprising a first voltage feeding means for feeding the first voltage to the secondary battery, a second voltage feeding means for feeding the second voltage lower than the first voltage to the secondary battery, a current detection means for detecting the charging current to the secondary battery, a voltage detecting means for detecting one voltage of the secondary battery, and a control means for changing over the supply by the first voltage feeding means to and from the supply by the second voltage feeding means based on the detected result by the voltage detecting means, wherein when the specified voltage corresponding to the condition in which the secondary battery is nearly fully charged is detected by the voltage detection means, the supply to the secondary battery is changed over from the first voltage feeding means to the second voltage feeding means, and when the current detection means detects the current exceeding the predetermined charging current with the second voltage supplied from the second voltage feeding means to the secondary battery by this change-over, the supply is changed over by the first voltage feeding means. According to this charging equipment, the battery is charged to the full-charge condition by the first voltage only when the battery charging remainder lowers to the specified value. Consequently, after the battery is charged to the full-charge condition once, charging to the full-charge is repeated every time the battery charging remainder lowers to a specified volume, and the secondary battery can constantly be maintained to a nearly charged condition, and at the same time, because the second voltage lower than the first voltage is applied to the battery except when charging to the full-charge is carried out, the secondary battery is not brought continuously to the full-charged condition, thereby preventing deterioration of the secondary battery performance caused by the continuation of the full-charged condition.

The 41st invention is the charging equipment according to the 40th invention, comprising the third voltage feeding means for feeding the third voltage of the potential across the first and the second voltage to the secondary battery and a temperature detection means for detecting the temperature inside or in the vicinity of the secondary battery, wherein when the detection temperature of the said temperature detecting means exceeds a specified temperature, the voltage feeding means is changed over to the third voltage feeding means in place of changing over from the second voltage feeding means to the first voltage feeding means. According to this charging equipment, charging is able to be favorably controlled in accord with the temperature.

The 42nd invention is the charging equipment according to the 41st invention, wherein the output voltage of the said third voltage feeding means is designed to be continuously changed in accord with the temperature detected by the said temperature detecting means. According to this charging equipment, it is possible to finely control the charging voltage in accord with the then temperature and to favorably control charging in accord with the temperature.

The 43rd invention is the charging equipment for charging the secondary battery requiring constant current charging at the start of charging, comprising a power supply circuit for feeding the specified charging power supply to the secondary battery, a switching means connected across the said power supply circuit and the said secondary battery for controlling the start and stop of charging, a detecting means for detecting the potential across one end and the other end of the said switching means or the potential across one end and the other end of the said secondary battery with the low-voltage charging power supply fed from the said power supply circuit, and a charging control means for starting charging to the secondary battery with the said switching means turned on based on the potential detected by the said detection means as well as the output voltage of the said power supply circuit set to a specified potential. According to this charging equipment, it is possible to detect the secondary battery condition based on the control of the switching means and the detection of the potential across one end an the other end of the switching means or the potential across one end and the other end of the secondary battery, and to accurately detect the condition of the secondary battery as in the case of the conventional pre-charging. Consequently, it is possible to precisely detect the secondary battery condition without providing a charging circuit special for pre-charging and simplify the circuit configuration of the charging equipment.

The 44th invention is the charging equipment according to the 43rd invention, wherein a field-effect transistor is used for the said switching means, and the potential is designed to be detected by the said detection means by increasing the impedance value across one end and the other end of the field-effect transistor. According to this charging equipment, the condition of the secondary battery can be easily detected only by controlling the impedance of the field-effect transistor, and at the same time, even when the secondary battery voltage is low or shorted, it is possible to minimize the loss of the field-effect transistor, and to minimize the size of the transistor itself and a radiation plate, contributing to downsizing of the charging equipment.

The 45th invention is the charging equipment according to the 43rd invention, wherein the output potential of the said power supply circuit when detected by the above detection means is set to the value in the vicinity of the lowest voltage at which the said charging control means operates. According to this charging equipment, it is possible to detect the secondary battery condition with the charging power supply of the lowest voltage fed to the secondary battery, to detect the electrical condition of the secondary battery with the load to the secondary battery or circuit brought to the minimum, and to detect the electrical condition of the secondary battery under the favorable condition.

The 46th invention is the charging equipment according to the 43rd invention, wherein the output voltage of the said power supply is designed to increase with an increase of the potential across one end and the other end of the secondary voltage after the start of charging. According to this charging equipment, the power applied to the switching means is able to be held nearly uniformly, and the condition of the switching means is able to be held favorably.

The 47th invention is the charging equipment according to the 43rd invention, wherein the output voltage of the said power supply circuit is designed to be varied in a plurality of stages with an increase of the potential across one end and the other end of the said secondary battery after the start of charging. According to this charging equipment, it is possible to keep the power supply applied to the switching means nearly uniformly and to keep the condition of the switching means in the favorable condition. In this event, because the voltage is able to be varied in the plurality of stages, only simplified control is required for control of the voltage circuit.

The 48th invention is the charging equipment according to the 43rd invention, wherein a charged load storage means is connected across the said power supply circuit and the said charging control means, and to lower the output potential of the said power supply circuit when detected by the said detection means to the minimum voltage at which the charging control means lowers. According to this charging equipment, as long as electric charge is accumulated in the electric charge storage means, voltage of the charging power supply to be fed to the secondary battery in detecting by the detection means can be brought to the voltage lower than the voltage for controlling the switching means, and the condition of the secondary battery can be detected more favorably with the still lower voltage applied.

The 49th invention is the charging equipment for charging the secondary battery to be charged by the constant voltage charging voltage, comprising a constant-voltage means for feeding the said charging voltage to the said secondary battery, a battery condition detecting means for detecting the said secondary battery condition, a charging control means for controlling charging by the constant-voltage means, and a timer means which operates when the said battery condition detecting means detects the specified condition of the said secondary battery, wherein a specified time passes from the start of operation of the timer means, the charging control means is designed to start charging by the said constant voltage means. According to this charging equipment, it is possible to designate the time from the time when the battery once attains the full-charged condition (or nearly full-charged condition) to the time when charging is restarted as the time required for the battery to attain a specified electrical condition with a specified time added, thereby securing some time before the battery returns to the full-charged condition even if an error occurs in the detection of the battery condition, and it is possible to prevent deterioration of secondary battery characteristics caused by the continued full-charged condition.

The 50th invention is the charging equipment according to the 49th invention, wherein the said battery condition detection means is designed to detect the condition in which the secondary battery voltage attains a specified voltage. According to this charging equipment, it is possible to accurately detect the lowering of battery voltage with the charging voltage set as a standard, enabling accurate control of the secondary battery condition.

The 51st invention is the charging equipment according to the 49th invention, wherein the said battery condition detection means is designed to detect the condition in which the charging current attains the specified value when the specified voltage is applied to the above secondary battery. According to this charging equipment, it is possible to properly control the charging condition of the secondary battery based on the detection of the current value.

The 52nd invention is the charging equipment according to the 49th invention, wherein the constant voltage for pre-charging lower than the said charging voltage is designed to be fed as the said constant voltage means and this constant voltage for pre-charging is designed to be used for the specified voltage applied to the said secondary battery. According to this charging equipment, it is possible to favorably set the voltage applied at the time of precharging.

The 53rd invention is the charging equipment for charging the secondary battery in which charging takes place by constant voltage charging voltage, comprising a constant voltage means for supplying the said charging voltage to the secondary battery, a battery condition detection means for detecting the said secondary battery condition, a charging control means for controlling charging by the said constant voltage means, and a timer means for operating when the said battery condition detection means detects the nearly charged condition of the said secondary battery, wherein the said charging control means allows the said battery condition detection means to detect the condition of the said secondary battery every time nearly a specified time passes from the time when the said timer means begins to operate, and when this detected condition falls in the specified condition, charging by the said constant voltage means is designed to be restarted. According to this charging equipment, it is possible to keep at least a predetermined time open for the specified period from the time when charging is stopped once full-charge condition is attained to the time when charging is restarted, thereby enabling preventing of deterioration of the secondary battery characteristics.

The 54th invention is the charging equipment according to the 53rd invention, wherein charging by the constant voltage means is restarted after a specified time passes from the time when the specified condition is detected. According to this charging equipment, it is possible to more effectively secure the time before it returns to the full-charge condition and to more improve the effect to prevent deterioration of the secondary battery characteristics.

The 55th invention is the charging equipment according to the 53rd invention, wherein the said battery condition detection means is designed to detect as the specified condition detection that the charging current exceeds a specified value when the said charging voltage or voltage lower than this charging voltage is applied to the said secondary battery. According to this charging equipment, it is possible to accurately detect the secondary battery condition from the charging current.

The 56th invention is the charging equipment according to the 53rd invention, wherein the said battery condition detection means is designed to detect as the specified condition detection that the battery voltage of the said secondary battery attains the specified voltage. According to this charging equipment, it is possible to accurately detect the secondary battery condition from the battery voltage.

The 57th invention is the charging equipment according to the 56th invention, wherein at least the energy required for detecting the battery voltage in the said secondary battery is designed to be charged in the secondary battery by the control of the said charging control means when the said secondary battery voltage does not attain the specified voltage and charging is not restarted. According to this charging equipment, it is possible to effectively prevent the decrease of remaining voltage caused by repeating detection of the battery condition every specified time.

The 58th invention is the charging equipment for charging the secondary battery, comprising a first voltage supply means for supplying the first voltage to the secondary battery, a second voltage supply means for supplying the second voltage lower than the said first voltage to the secondary battery, a selection means for changing over the charging voltage applied to the said secondary battery between the said first and second voltage supply means, a switching means for ON-OFF controlling the application of the output voltage of the first or second voltage supply means selected by the selection means to the secondary battery, a detecting means for detecting the electrical condition of the said secondary battery, and a control means for controlling the selection with the said selection means and ON/OFF control by the said change-over means in accord with the condition detected by the detection means. According to this charging equipment, it is possible to select the first and the second voltages for the voltage applied to the secondary battery, and at the same time, to be able to carry out ON-OFF control of the application of this selected voltage, to prevent discharge from the battery to the charging circuit side when charging voltage lower than the battery voltage is established, thereby preventing wasteful discharge of the secondary battery when voltage applied to the secondary battery is allowed to be varied.

The 59th invention is the charging equipment according to the 58th invention, wherein when the said control means judges that the charged volume of the secondary battery is lower than the specified volume, the said switching means is turned on and at the same time the first voltage supply means is selected by the selection means to apply the first voltage to the secondary battery for charging, and when the said control means judges that the secondary battery is charged to the specified volume, the said switching means is turned off, and at the same time the second voltage feeding means is selected by the said selection means, and when the said control means judges that the secondary battery voltage is lower than the second voltage under the state that the second voltage feeding means is selected, the switching means is turned on by control of the said control means to apply the second voltage to the secondary battery for charging. According to this charging equipment, it is possible to effectively prevent wasteful discharge from the secondary battery and at the same time to be able to charge the second voltage to the secondary battery free of detrimental effects when charging is restarted.

The 60th invention is the charging equipment according to the 59th invention, wherein for the said control means to judge that the secondary battery voltage is lower than the second voltage is when it is judged that the voltage is lower than the second voltage again in a specified time after it is judged at least once that the voltage is lower than the second voltage. According to this charging equipment, it is possible to charge the secondary battery with the second voltage when the secondary battery voltage is positively lower than the second voltage and to restart charging under the favorable condition free of deteriorating the secondary battery.

The 61st invention is the charging equipment according to the 59th invention, wherein it is when the secondary battery voltage is the third voltage lower than the second voltage that the second voltage feeding means applies the said second voltage to the secondary battery for charging. According to this charging equipment, it is possible to restart charging under the favorable condition free of deteriorating the secondary battery only by judgment of the battery voltage without counting passage of time.

The 62nd invention is the charging equipment according to the 59th invention, wherein the potential difference between one end and the other end of the switching means is detected for judging that the said secondary battery voltage is lower than the second voltage. According to this charging equipment, it is possible to accurately judge the battery voltage at the restart of charging.

The 63rd invention is the charging equipment according to the 59th invention, wherein it is judged whether or not the said secondary battery voltage is lower than the said second voltage when the current of the said secondary battery is judged to be lower than the specified current value when the said switching means is turned off. According to this charging equipment, charging processing at the second voltage is carried out only when the current flowing in the load circuit is lower than the specified value (for example, in the case of the vicinity of zero), and it is possible to prevent charging at a low voltage when the load current exceeds the specified value.

The 64th invention is the charging equipment according to the 59th invention, wherein the potential difference between one end and the other end of the switching means is detected when the said secondary battery current is judged lower than the specified current when the said switching means is turned off and it is judged that the said secondary battery voltage is lower than the said second voltage. According to this charging equipment, it is possible to judge the restart of charging by accurate voltage judgment based on the potential difference between one end and the other end of the switching means only when the current flowing in the load current is lower than the specified value.

The 65th invention is the charging equipment according to the 58th invention, wherein when the said control means judges that the charged volume of the secondary battery is lower than the specified volume, the switching means is turned on and at the same time, the first voltage feeding means is selected with the said selecting means to apply and charge the first voltage to the secondary battery, and when the control means judges that the charged volume of the secondary battery is charged to the specified volume, the switching means is turned off, and at the same time the second voltage feeding means is selected by the said selecting means, and the second voltage is applied to the secondary battery to change the same with the switching means turned on by the control of the control means when the current flowing in the secondary battery is judged again to be lower than the specified value at least in the specified time after the control means judges that the current flowing in the secondary battery is lower than the specified value with this second voltage feeding means selected. According to this charging equipment, it is possible to effectively prevent wasteful discharge from the secondary battery as well as to judge the restart of charging based on judgment of the current.

The 66th invention is the charging equipment according to the 65th invention, wherein the current flowing in the current path connected to the said secondary battery different from the current path fed to the said secondary battery via the switching means is detected for the current flowing to the said secondary battery. According to this charging equipment, it is possible to detect the stable current value not subject to fluctuation of voltage applied.

The 67th invention is the charging equipment according to the 58th invention, wherein the first and the second switching means are provided in parallel as the said switching means and a constant current output means is connected to the second switching means, and when the charged volume of the secondary battery is judged to be lower than the specified volume, the first switching means is turned on and the second switching means is turned off, and at the same time the first voltage feeding means is selected by the selecting means to apply and charge the first voltage to the secondary battery, and when the control means judges that the charged volume of the secondary battery is charged to the specified volume, the first and the second switching means are turned off and the second voltage feeding means is selected with the selecting means, and when the control means judges that the second battery voltage is lower than the second voltage with this second voltage feeding means selected, the control means controls to turn on the second switching means and to turn off the first switching means, and the output of the constant current output means is supplied to charge the secondary battery. According to this charging equipment, it is possible to achieve favorable charging by constant current.

The 68th invention is an integrated circuit for controlling charging of the secondary battery in which control is carried out for selectively supplying the first voltage and the second voltage lower than this first voltage to the said secondary battery, and when the secondary battery is judged to be nearly fully charged based on the judgment of the detected charging current while control is being carried out for applying and charging the first voltage to the secondary battery, control is carried out for changing over to the application of the second voltage to the secondary battery, and when the secondary battery is judged to have a specified battery remaining voltage based on the judgment of the detected charging current while control of applying this second voltage is being underway, control is carried out for changing over to the application of the first voltage to the secondary battery. According to this integrated circuit, control for charging to the full-charge condition by the first voltage is carried out only when the remaining battery volume lowers to the specified volume. Consequently, after the battery is charged to the full-charge condition once, charging to the full-charge is repeatedly carried out every time the battery lowers to the specified battery charging remainder, thereby maintaining the secondary battery condition constantly to the nearly full-charge condition, and at the same time, because except when charging to this full-charging is carried out, the second voltage lower than the first voltage is applied to the battery, the secondary battery does not reach the full-charge condition continuously, enabling favorable charging control in which deterioration of the secondary battery performance caused by continued full-charge condition can be prevented.

The 69th invention is an integrated circuit according to the 68th invention, wherein when the temperature is higher than a specified temperature based on the judgment of the detected temperature inside or in the vicinity of the secondary battery, control is carried out for applying the third voltage across the first voltage and the second voltage to the secondary battery. According to this integrated circuit, it is possible to favorably carry out charging control while suppressing the deterioration of performance of the secondary battery due to temperature rise of the battery.

The 70th invention is an integrated circuit according to the 69th invention, wherein the third voltage is controlled to be continuously varied based on the judged temperature. According to this integrated circuit, the charging voltage can be finely controlled in accord with the temperature at the time and charging can be more favorably carried out in accord with temperature.

The 71st invention is an integrated circuit for controlling charging of the secondary battery in which control is carried out for selectively supplying the first voltage or the second voltage lower than this first voltage to the said secondary battery, and when the secondary battery is judged to be nearly fully charged based on the judgment of the detected charging voltage while control is being carried out for applying and charging the first voltage to the secondary battery, control is carried out for changing over to the application of the second voltage to the secondary battery, and when the secondary battery is judged to have a specified battery remaining voltage based on the judgment of the detected charging voltage while control of applying this second voltage is being underway, control is carried out for changing over to the application of the first voltage to the secondary battery. According to this integrated circuit, control for charging to the full-charge condition by the first voltage is carried out only when the remaining battery volume lowers to the specified volume. Consequently, after the battery is charged to the full-charge condition once, charging to the full-charge is repeatedly carried out every time the battery lowers to the specified battery charging remainder, thereby maintaining the secondary battery condition constantly to the nearly full-charge condition, and at the same time, because except when charging to this full-charging is carried out, the second voltage lower than the first voltage is applied to the battery, the secondary battery does not reach the full-charge condition continuously, enabling favorable charging control in which deterioration of the secondary battery performance caused by continued full-charge condition can be prevented.

The 72nd invention is an integrated circuit according to the 71st invention, wherein when the temperature is higher than the specified temperature based on the judgment of the detected temperature inside or in the vicinity of the secondary battery, control is carried out for applying the third voltage across the first voltage and the second voltage to the secondary battery. According to this integrated circuit, it is possible to favorably carry out charging control while suppressing the deterioration of performance of the secondary battery due to temperature rise of the battery.

The 73rd invention is an integrated circuit according to the 69th invention, wherein the third voltage is controlled to be continuously varied based on the judged temperature. According to this integrated circuit, the charging voltage can be finely controlled in accord with the temperature at the time and control of charging can be more favorably carried out in accord with temperature.

The 74th invention is an integrated circuit for controlling charging of the secondary battery, wherein the detected value of the potential across one end and the other end of the switching means for controlling start and stop of the supply of the charging power supply to the secondary battery or the potential across one end and the other end of the secondary battery is judged while control for supplying the low-voltage charging power supply to the secondary battery is being carried out, and when this judged potential is a specified potential, control for turning on the switching means is carried out and at the same time control for setting the charging power supply supplied to the secondary battery to the specified potential is carried out so that control for starting the charging to the secondary battery takes place. According to this integrated circuit, it is possible to control the switching means and to detect the secondary battery condition based on the detection of the potential across one end and the other end of this switching means or the potential across one end and the other end of the secondary battery, thereby enabling accurate detection of the secondary battery condition as in the case of conventional pre-charging. Consequently, it is possible to precisely detect the secondary battery without providing a charging circuit specialized for pre-charging, and it is possible to simplify the circuit configuration of the charging equipment.

The 75th invention is an integrated circuit according to the 74th invention, wherein the detected value of the potential across one end and the other end of the secondary battery after the said charging begins is judged, and control is carried out to raise the potential of the charging power supply in accordance with the increase of the judged potential. According to this integrated circuit, it is possible to hold the power supply applied to the switching means nearly uniformly, thereby enabling the control for maintaining the switching means to a favorable condition.

The 76th invention is an integrated circuit according to the 74 invention, wherein the detected value of the potential across one end and the other end of the secondary battery after the charging begins is judged, and control for raising the potential of the charging power supply by varying it in a plurality of stages in accord with an increase of the judged potential. According to this integrated circuit, it is possible to nearly uniformly keep the electric power applied to the switching means, and it is also possible to keep the switching means to the favorable condition. In this case, since voltage is allowed to be varied in a plurality of stages, a simple control is only required for control of the voltage circuit.

The 77th invention is an integrated circuit for controlling the charging of the secondary battery, wherein if it is judged that the battery reaches a specified electrical condition based on the specified electrical detection data related to the secondary battery after carrying out the control for stopping the charging operation when charging operation by constant voltage is carried out and it is judged that the secondary battery reached the nearly full-charged condition, control is carried out to restart the charging operation of the secondary battery after a specified time passes from this judgment of this specified electrical condition. According to this integrated circuit, it is possible to designate the time to restart charging once it comes in the full-charge state (or nearly full-charge state) to the time in which a specified time is added to the time for a battery to reach a specified electrical condition, and even if any error exists in the detected battery condition, it is possible to secure a certain time for returning to the full-charge condition, and it is thereby possible to carry out favorable control to prevent deterioration of characteristics of the secondary battery caused by continuation of the full-charge conditions.

The 78th invention is an integrated circuit according to the 77th invention, wherein the said specified electrical condition is judged by judging that the battery voltage of the said secondary battery reaches the specified voltage. According to this integrated circuit, it is possible to exactly judge the condition of the secondary battery by the judgment of the battery voltage.

The 79th invention is an integrated circuit according to the 77th invention, wherein the said specified electrical condition is judged by judging that the charging current reaches a specified current value when a specified voltage is applied to the secondary battery. According to this integrated circuit, it is possible to exactly judge the secondary battery condition by judgment of the charging current.

The 80th invention is an integrated circuit according to the 79th invention, wherein control is made to apply the said specified voltage to the secondary battery, which is lower than the charging voltage of the said constant voltage. According to this integrated circuit, it is possible to detect the secondary battery condition by the voltage lower than the charging voltage, and to properly detect the battery condition with a load applied to the secondary battery reduced.

The 81st invention is an integrated circuit for controlling the charging of the secondary battery in which charging is carried out by constant voltage charging to judge that the secondary battery reaches the nearly full-charged condition, and after control for stopping the charging operation is carried out, the specified electrical detection data related to the secondary battery is judged every time a specified time passes from the stopping of this charging operation, and when it is judged that the battery enters a specified electrical condition by this judgment, control is carried out for restarting the charging operation. According to this integrated circuit, it is possible to keep the time open at least for the specified period from the time when charging is stopped once full-charge condition is attained to the time when charging is restarted, thereby enabling control while preventing the deterioration of the secondary battery characteristics.

The 82nd invention is an integrated circuit according to the 81st invention, wherein control is carried out to restart charging after a specified time passes from the time when the specified electrical condition is judged. According to this integrated circuit, it is possible to more effectively secure the time before it returns to the full-charge condition and to more improve the effect to prevent deterioration of the secondary battery characteristics.

The 83rd invention is an integrated circuit according to the 81st invention, wherein the specified electrical condition is judged by judging that the detected charging current exceeds a specified value while control for applying a constant voltage or specified voltage lower than this constant voltage is being applied to the said secondary battery. According to this integrated circuit, it is possible to accurately detect the secondary battery condition from judgment of the charging current.

The 84th invention is an integrated circuit according to the 81st invention, wherein the specified electrical condition is judged by judging that the detected secondary battery voltage reaches a specified voltage. According to this integrated circuit, it is possible to accurately detect the secondary battery condition from judgment of the charging current.

The 85th invention is an integrated circuit according to the 84th invention, wherein control is carried out so that at least the energy required for detecting the battery voltage in the said secondary battery is designed to be charged to the secondary battery when it is judged that the detected value of the secondary battery voltage does not attain the specified voltage and charging is not restarted. According to this integrated circuit, it is possible to carry out control for effectively preventing the decrease of remaining voltage caused by repeating detection of the battery condition every specified time.

The 86th invention is an integrated circuit for controlling the charging of the secondary battery, wherein control is carried out for selectively supplying the first voltage and the second voltage lower than the said first voltage to the secondary battery, and detected value of the electrical condition of the secondary battery is judged, and in accord with the judged detected value, the first voltage and the second voltage are selected for the voltage to be applied to the secondary battery, and ON-OFF control is carried out for applying the selected voltage to the secondary battery. According to this integrated circuit, it is possible to select the first and the second voltages for the voltage applied to the secondary battery, and at the same time, to be able to carry out ON-OFF control of the application of this selected voltage, to prevent discharge from the battery to the charging circuit side when charging voltage lower than the battery voltage is established, and to enable the control for preventing wasteful discharge of the secondary battery when voltage applied to the secondary battery is allowed to be varied.

The 87th invention is an integrated circuit according to the 86th invention, wherein when based on the judgment of the detection value of the electrical condition of the said secondary battery, it is judged that the secondary battery is charged to the specified volume, the second voltage is selected and at the same time control for turning off the application of this voltage to the secondary battery, and if it is judged that under this condition, the secondary battery voltage reaches below the second voltage, control for turning on the application of the second voltage to the secondary battery is carried out. According to this integrated circuit, it is possible to effectively prevent wasteful discharge from the secondary battery and at the same time to be able to control of the charging of the second voltage to the secondary battery free of detrimental effects when charging is restarted.

The 88th invention is an integrated circuit according to the 87th invention, wherein to judge that the secondary battery voltage is lower than the second voltage is when it is judged that the voltage is lower than the second voltage again in a specified time after it is judged at least once that the voltage is lower than the second voltage. According to this integrated circuit, it is possible to charge the secondary battery with the second voltage when the secondary battery voltage is positively lower than the second voltage and to restart charging under the favorable condition free of deteriorating the secondary battery.

The 89th invention is an integrated circuit according to the 87th invention, wherein it is when it is judged that the secondary battery voltage is the third voltage lower than the second voltage that the said second voltage is applied and charged to the secondary battery. According to this integrated circuit, it is possible to restart charging under the favorable condition free of deteriorating the secondary battery only by judgment of the battery voltage without counting passage of time.

The 90th invention is an integrated circuit according to the 87th invention, wherein it is judged that the said secondary battery voltage is lower than the said second voltage when the current of the said secondary battery is judged to be lower than the specified current value when voltage application to the said secondary battery is turned off. According to this integrated circuit, charging processing at the second voltage is carried out only when the current flowing in the load circuit is lower than the specified value (for example, in the case of the vicinity of zero), and it is possible to prevent charging at a low voltage when the load current exceeds the specified value.

The 91st invention is an integrated circuit according to the 87th invention, wherein when the secondary battery current is judged to be lower than the specified value when application of the voltage to the secondary battery is turned off, the potential difference between one end and the other end of the switching means for carrying out the ON/OFF control is detected and the secondary battery voltage is judged to be lower than the second voltage. According to this integrated circuit, it is possible to judge the restart of charging by accurate voltage judgment based on the potential difference between one end and the other end of the switching means only when the current flowing in the load current is lower than the specified value.

The 92nd invention is an integrated circuit according to the 86th invention, wherein when it is judged that the charged volume of the secondary battery is lower than the specified volume, control is carried out for turning on the application of the voltage to the secondary battery to charge the same with the first voltage selected, and when it is judged that the secondary battery is charged to the specified volume, control is carried out for turning off the application of the voltage to the secondary battery with the second voltage selected, and when it is judged that the current flowing in the secondary battery again at least after a specified time after it is judged that the current flowing in the secondary battery is lower than the specified value with this second voltage selected, control is carried out for selecting the second voltage and turning on the application of the voltage to the secondary voltage for charging. According to this integrated circuit, it is possible to effectively prevent wasteful discharge from the secondary battery as well as to judge the restart of charging based on judgment of the current.

BRIEF DESCRIPTION OF DRAWINGS

FIG. 17 is a flow chart showing the charging processing when voltage is varied in the three stages by temperature in the second embodiment.

FIG. 28 is a structural diagram showing a charging equipment according to the eighth embodiment of this invention.

BEST MODE FOR CARRYING OUT THE INVENTION

Now, the first embodiment of this invention will be described with reference to FIG. 7–FIG. 13.

Figure 1:
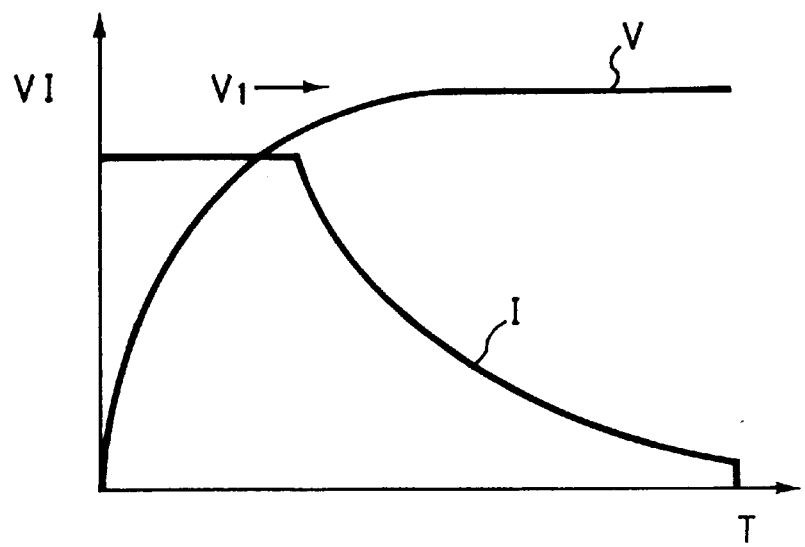
FIG. 1 is an explanatory diagram showing one example of charging characteristics of a lithium ion battery.
Figure 2:
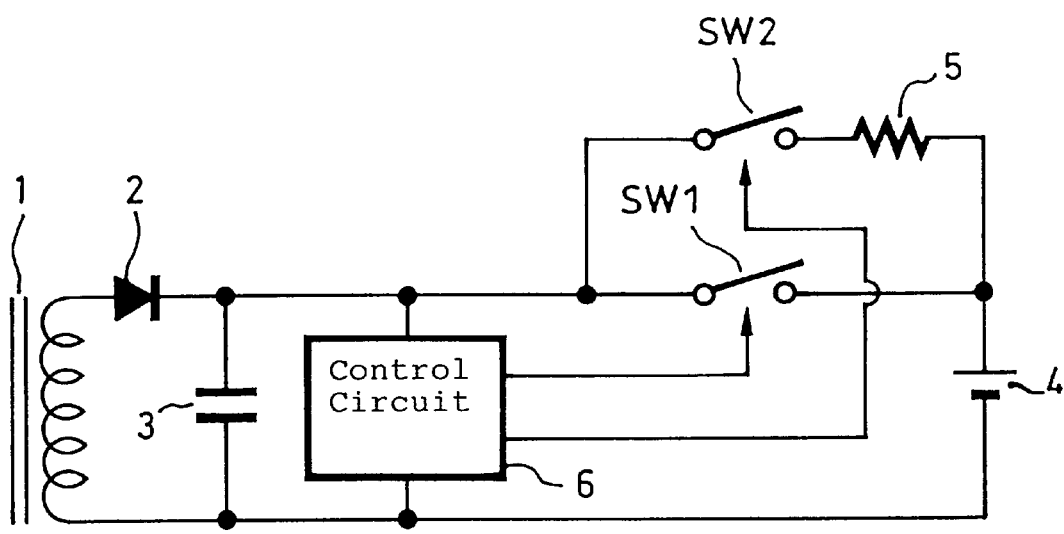
FIG. 2 is a structural diagram showing one example of a conventional charging equipment.
Figure 3:
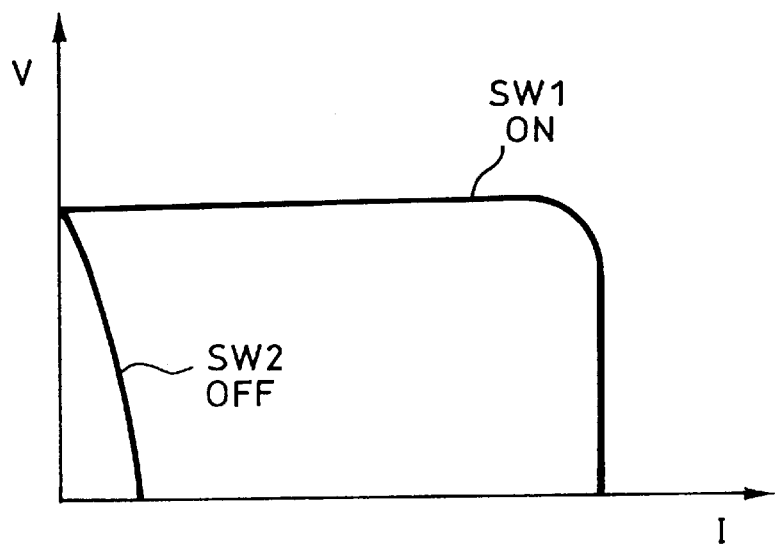
FIG. 3 is a characteristic diagram showing charging characteristics of the example of FIG. 2.
Figure 4:
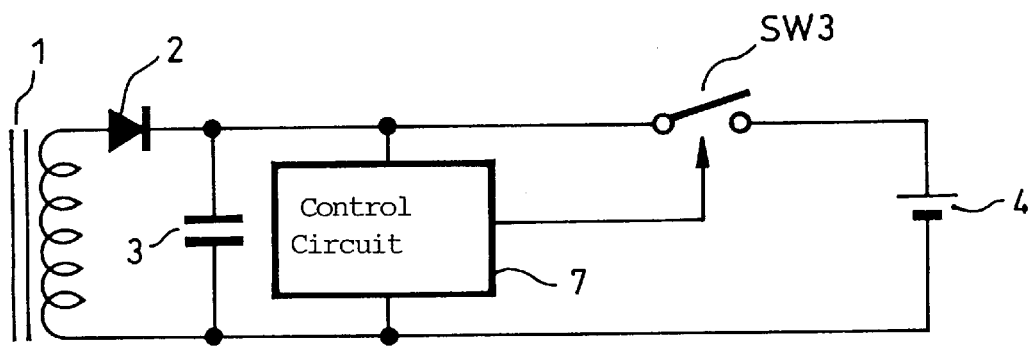
FIG. 4 is a structural diagram showing another example of the conventional charging equipment.
Figure 5:
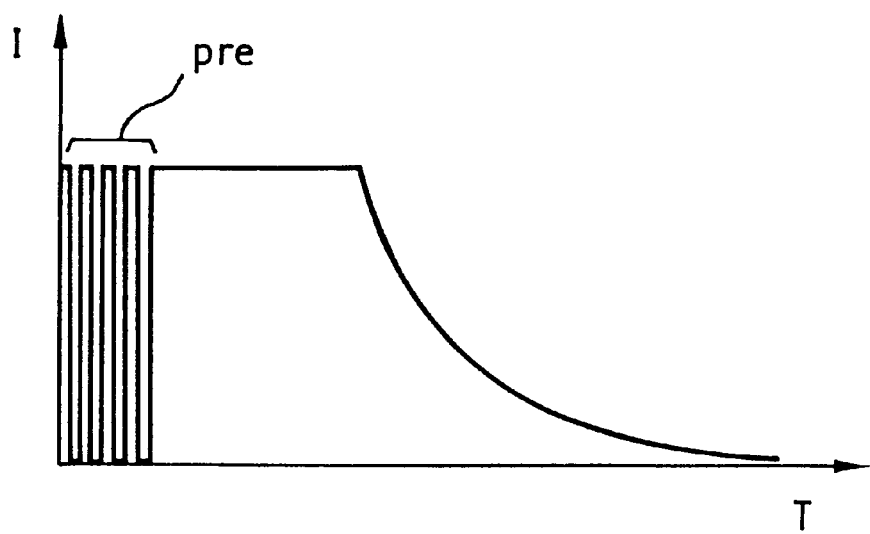
FIG. 5 is a characteristic diagram showing charging characteristics of the example of FIG. 4.
Figure 6:
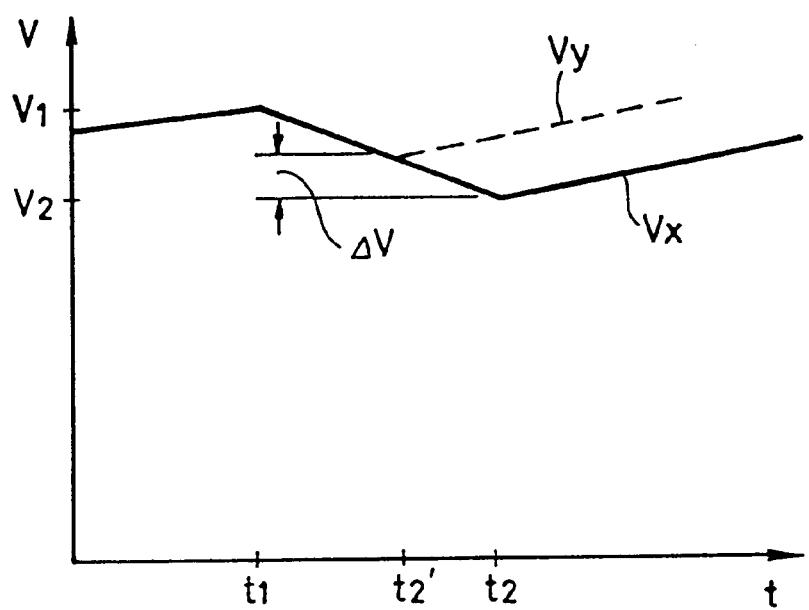
FIG. 6 is a characteristic diagram showing one example of the recharging condition of the conventional lithium battery.
Figure 7:
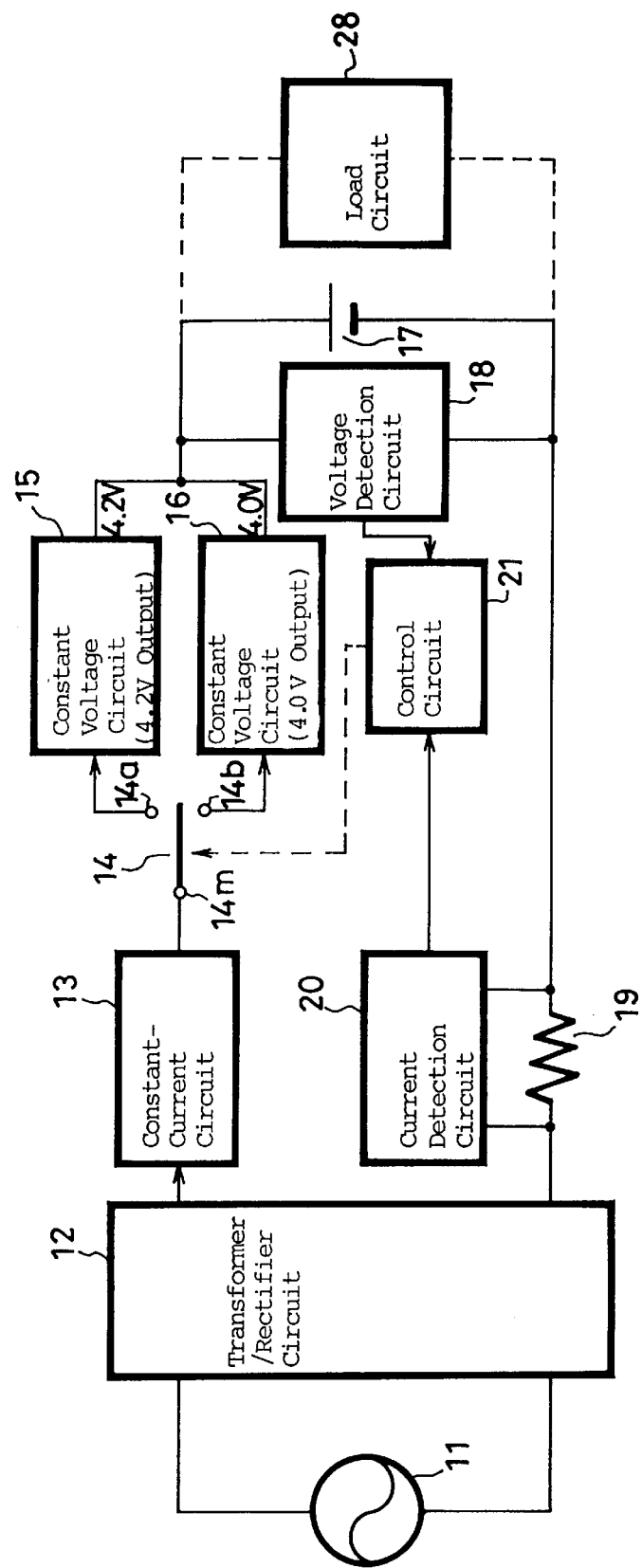
FIG. 7 is a structural diagram showing a charging equipment according to the first embodiment of this invention.

FIG. 7 is a block diagram showing the configuration of the charging equipment of this embodiment, where AC power supply (about 100V–240V) from a commercial AC power supply 11 is supplied to a transformer/rectifier circuit 12 to provide a DC low-voltage power supply. This DC low-voltage power supply is supplied to a constant current circuit 13 to produce an output of constant current. And this constant-current output is supplied to a movable contact 14m of a change-over switch 14. First and second fixed contacts 14a and 14b of this change-over switch 14 are connected to constant voltage circuits 15 and 16, respectively, and a specified voltage is outputted from the constant voltage circuit 15 or 16 on the side to which the movable contact 14m is connected. In this event, the constant voltage circuit 15 is designed to output 4.2V, while the constant voltage circuit 16 is designed to output 4.0V.

To the positive electrode side of a secondary battery 17 loaded on this charging equipment, the output voltage of the constant voltage circuit 15 or 16 is applied. In this event, in this example, a lithium ion battery is used for the secondary battery 17. The lithium ion battery used here must provide characteristics in which the battery voltage is 4.2V when the battery is 100% charged (fully charged).

Then, the potential difference between the positive electrode side and the negative electrode side of this secondary battery 17 is detected with a voltage detection circuit 18. The data of voltage values detected by this voltage detection circuit 18 is supplied to a control circuit 21 later described.

The negative electrode side of the secondary battery 17 is connected to the transformer/rectifier circuit 12 via a current detection resistor 19 to form a charging circuit of the secondary battery 17. Based on the potential difference between one end and the other end of the current detection resistor 19, the current flowing through the resistor 19 is detected by a current detection circuit 20. The current value detected by this current detection circuit 20 corresponds to the charging current supplied to the secondary battery 17. The data of current values detected by the current detection circuit 20 is supplied to the control circuit 21. This control circuit 21 is a circuit composed by a microcomputer with integrated circuits for controlling the charging operation, and based on the comparison between the data of current values detected by the current detection circuit 20 and a current value $I_1$ stored in advance in the control circuit 21, the connection condition of the movable contact 14m of the change-over switch 14 is controlled. In this event, for this current value $I_1$, the charging current value when the secondary battery 17 is 100% charged with the charging voltage 4.2V is used.

By the way, there is a case in which a load circuit 28 may be connected to the secondary battery 17.

Now, referring to the flow chart of FIG. 8, processing when the secondary battery (lithium ion battery) is charged with this charging equipment will be described.

First of all, the control circuit 21 detects whether there is the secondary battery 17 or not (that is, whether it is loaded on the charging equipment or not) (Step S101). The presence of the battery 17 is judged by electrical detection, such as detection of the battery voltage and so on or mechanical detection, and either detection is acceptable.

Based on the detection results, whether the battery is present or not is judged (Step S102), and if it is judged that the battery is present, the movable contact 14m of the change-over switch 14 is connected to the fixed contact 14a, and with the 4.2-V charging voltage $V_1$ outputted by the first constant voltage circuit 15, charging of the battery 17 is carried out (Step S103). And in this event, charging current is detected by the current detection circuit 20 (Step S104), and judgment is made on whether the detected charging current value is lower than the specified value $I_1$ previously set or not (Step S105).

In this event, if the current exceeds the setting value $I_1$, the flow returns to Step S103 and charging with 4.2V charging voltage $V_1$ is continuously carried out. When it is judged that the current is lower than the setting value $I_1$ at Step S105, processing for stopping charging is carried out (Step S106), the movable contact 14m of the changeover switch 14 is changed over to the second fixed contact 14b from the first fixed contact 14a, and the 4.0-V charging voltage $V_2$ outputted from the second constant voltage circuit 16 is applied to the secondary battery 17 (Step S107).

Under th is condition, charging current is detected by the current detection circuit 20 (Step S108), the detected charging current value $I_2$ is compared with the previously set specified value $I_1$ (Step S109), and if the charging current value $I_2$ is lower than the setting value $I_1$, the flow returns to Step S108, and current detection is continuously carried out. If in this current detection, the current value $I_2$ exceeds the setting value $I_1$ (that is, $I_2 \geq I_1$), the movable contact 14m of the changeover switch 14 is changed over to the first fixed contact 14a from the second fixed contact 14b, the 4.2-V charging voltage $V_1$ outputted by the first constant voltage circuit 15 is applied to the secondary battery 17, and charging is allowed to take place with this 4.2V charging voltage $V_1$ (Step S110). Then, the flow returns to Step S104, and the charging current is detected by the current detection circuit 20.

Figure 8:
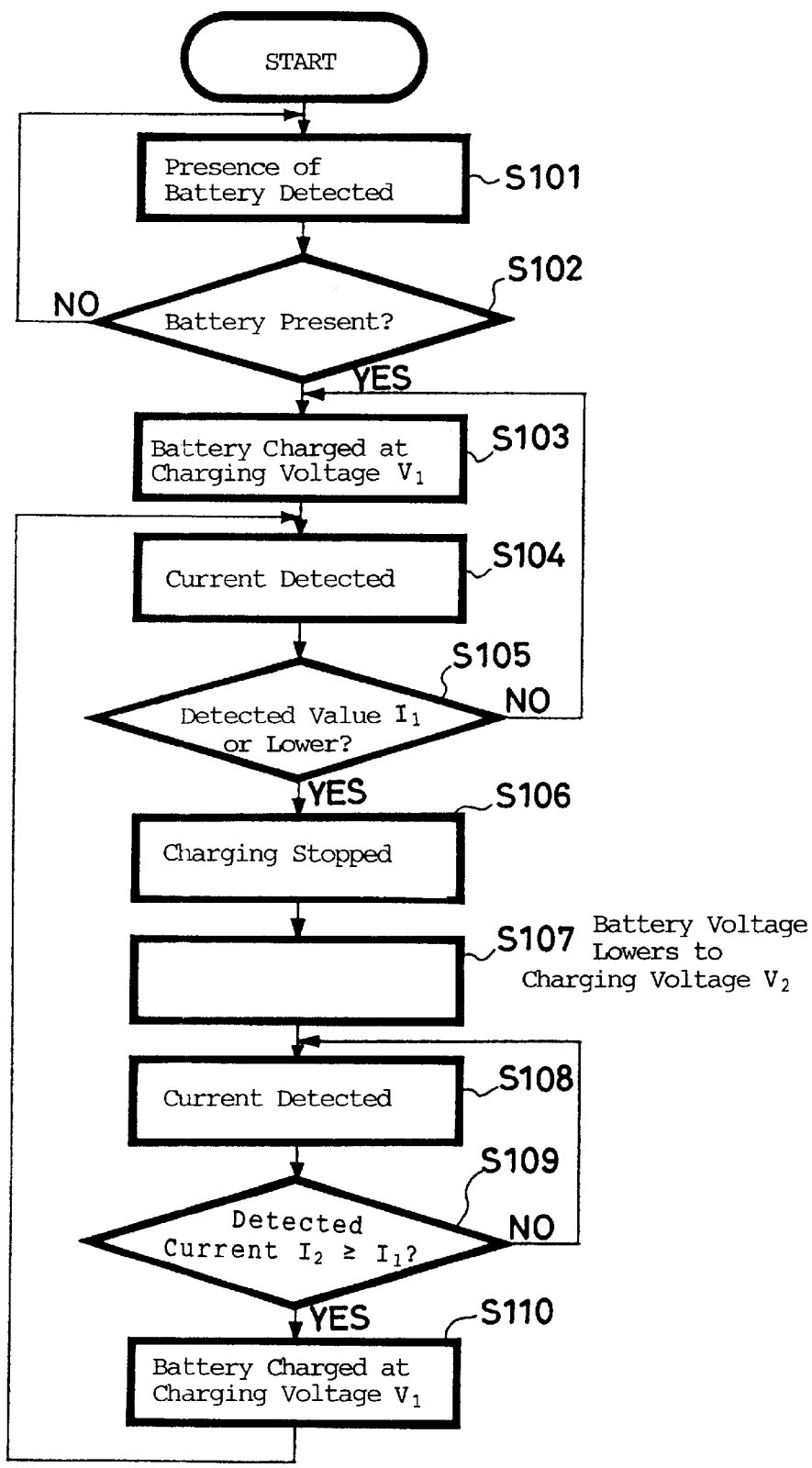
FIG. 8 is a flow chart showing charging processing according to the first embodiment.
Figure 9:
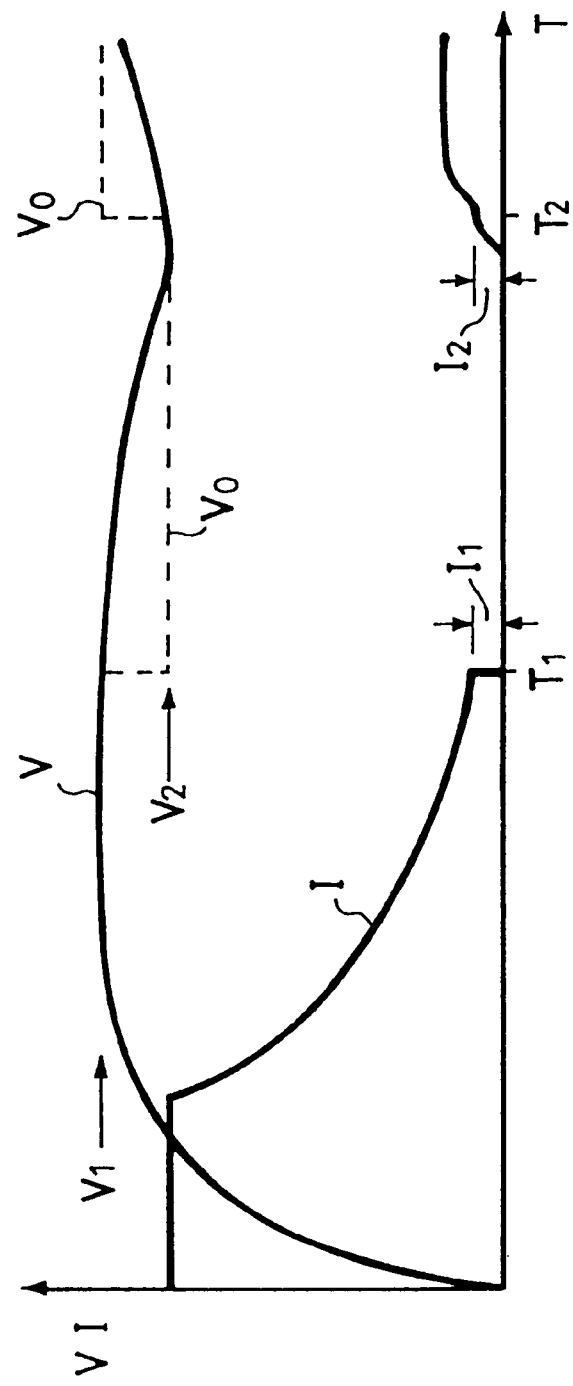
FIG. 9 is a characteristic diagram showing the charging condition according to the first embodiment.
Figure 10:
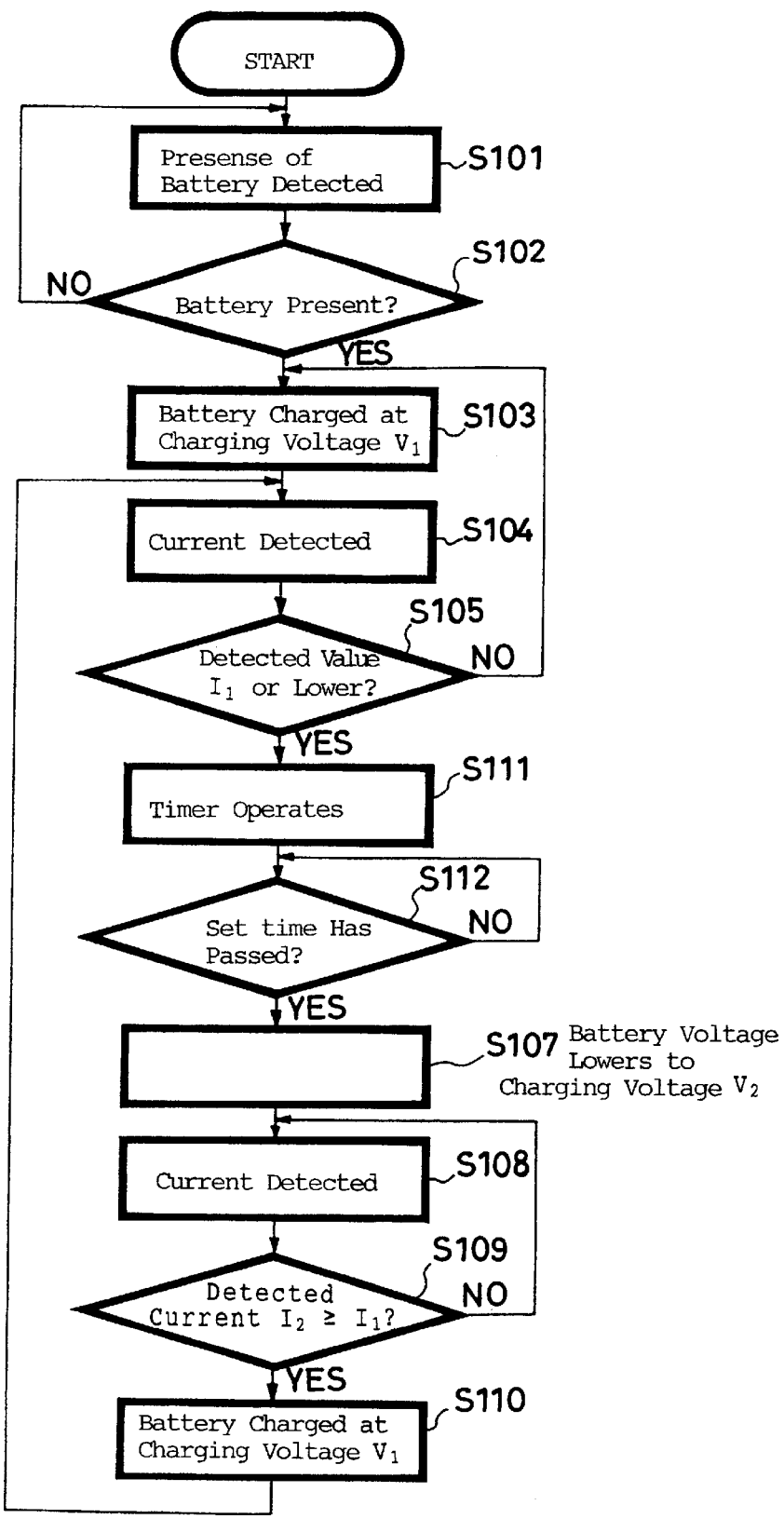
FIG. 10 is a flow chart showing charging processing when full-charge detection is carried out by another processing in the first embodiment.

A shown in the flow char t of FIG. 8, controlling the charging operation with the control circuit 21 allows charging to take place with the characteristics shown in FIG. 9. FIG. 9 is a characteristic diagram in which charging current/voltage is plotted against the elapsed time, and constant current charging with the charging current I set as a constant current is carried out from the start of charging until the battery voltage attains a specified potential (in this example, the arrangement to carry out constant current charging is omitted), and then, charging is changed over to constant-voltage charging, and charging takes place with the 4.2V charging voltage $V_1$. The execution of this constant voltage charging causes the battery voltage V to coincide with the charging voltage $V_1$, but the charging current I gradually decreases, and the charging current I becomes the value lower than the previously set current value $I_1$. The charging current reaching the value lower than this current value $I_1$ means that the secondary battery (lithium ion battery) is 100% charged.

At the timing when the secondary battery is 100% charged, that is, at the timing $T_1$ when the charging current becomes lower than the current value $I_1$, the changeover switch 14 is changed over from the first fixed contact 14a to the second fixed contact 14b side, and the charging voltage is changed over from 4.2V ($V_1$) to 4.0V ($V_2$) (charging voltage $V_0$ shown with a broken line in FIG. 9). The charging voltage becoming 4.0V in this way prevents the secondary battery 17 from being charged because the battery voltage V is 4.2V, and charging current is prevented from flowing.

Leaving the secondary battery 17 under this condition causes the battery voltage V to gradually lower due to self-discharge of the battery (or discharge to the load 28 connected), but when the voltage lowers to 4.0V, the charging voltage, charging current I begins to flow through the secondary battery from the charging circuit side. For example, if the battery voltage V lowers to 4.0V at the timing T3 of FIG. 9, charging current $I_2$ is generated, and this charging current $I_2$ is detected at the current detection circuit 20. In this event, if the charging current $I_2$ is compared with the previously set current value $I_1$ and is greater than the setting value $I_1$, the charging voltage is changed over from 4.0V to 4.2V (increase of charging voltage $V_0$ shown with a broken line in FIG. 9). By this rise of the charging voltage, the charging current I further increases and charging takes place. When the 100% charged condition is approached by this charging, the charging current decreases as in the case of the initial charging, and when the charging current I becomes below the setting value $I_1$, the charging voltage again lowers to 4.0V, and charging operation stops.

The secondary battery is efficiently maintained in the nearly 100% charged condition by carrying out the charging operation of the secondary battery, the lithium ion battery, in this way. That is, when the charging operation is carried out, charging is carried out at 4.2V, the proper charging voltage, until the battery is 100% charged, and at the same time, after 100% charged, the charging voltage becomes 4.0V, voltage slightly lower than 4.2V, and when the battery voltage V lowers to 4.0V by self-discharge (or discharge to a load), charging voltage rises to 4.2V again, and the operation to 100% charge the battery is repeatedly carried out. Consequently, after the battery is charged to the fully charged condition once, every time the remaining battery volume lowers to a specified volume, charging to the full charge is repeated, thereby maintaining the charging condition of the lithium ion battery constantly to the nearly fully charged condition, and at the same time, except when this charging to the full charge is carried out, the battery voltage 4.0V slightly lower than that at the time of full-charge of the battery, 4.2V, is applied to the battery, and charging does not take place until the battery voltage lowers to this 4.0V; consequently, the lithium ion battery does not continuously enter the full-charged condition and deterioration of lithium ion battery performance due to the continued full-charged condition can be prevented.

In this example, the charging current $I_2$ detected at the time of recharging is designed to be compared with the current setting value $I_1$ used for charging stop judgment, but it is allowed to compare the charging current $I_2$ detected at the time of recharging with the current value set separately from the setting value $I_1$ and to change over the charging voltage to 4.2V when the current value exceeding this set current value is detected.

In the example described above, the secondary battery 17 is judged to be 100% charged when the charging current becomes lower than the specified value $I_1$, but judgment of full charge is allowed to be made in a specified time passed after the charging current becomes lower than the specified value $I_1$. That is, as shown in the flow chart of FIG. 10, when the charging current I detected by the current detection circuit 20 in Step S105 becomes lower than the specified value $I_1$, a timer circuit inside the control circuit 21 is operated (step S111), and when this timer circuit counts a specified time, processing is allowed to move to Step S107 and to lower the charging voltage from $V_1$ to $V_2$. In other steps of the flow chart of FIG. 10, the processings same as those described in FIG. 8 take place.

In the example described above, the 100% charged condition is designed to be judged by detection of the charging current, but it may be designed to detect the 100% charged condition by detection of battery voltage using the voltage detection circuit 18. That is, as shown in the flow chart of FIG. 11, after the charging voltage is set to $V_1$ in Step S103, it may be designed to detect the battery voltage by the voltage detection circuit 18 (Step S113), and when the voltage $V_1$, the voltage value corresponding to full-charge, is detected (Step S114), it may be designed to allow the processing to move to Step S107 to lower charging voltage from $V_1$ to $V_2$. In other steps of the flow chart of FIG. 11, processings same as those described in FIG. 8 take place.

Figure 11:
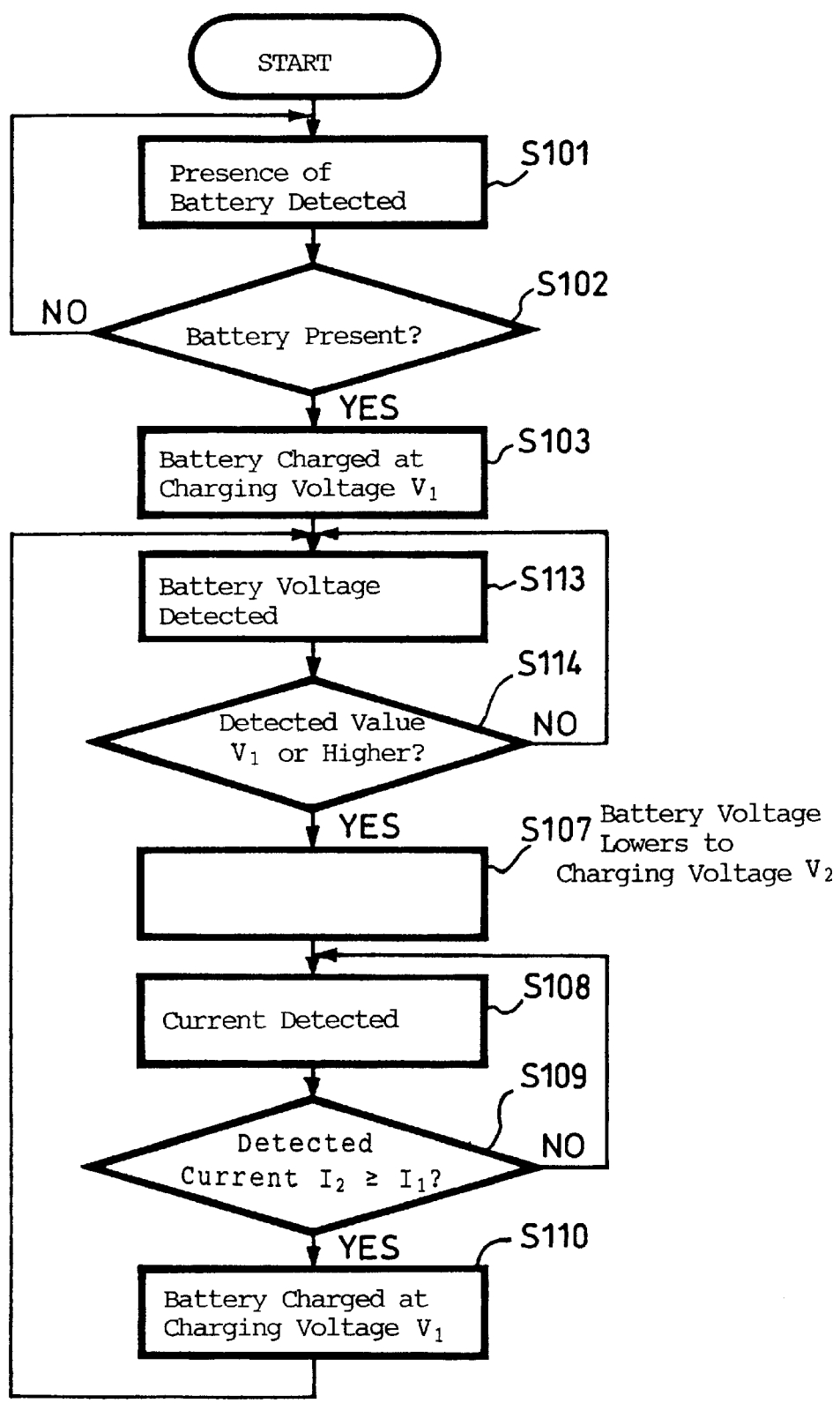
FIG. 11 is a flow chart showing charging processing when full-charge detection is carried out by still another processing in the first embodiment.
Figure 12:
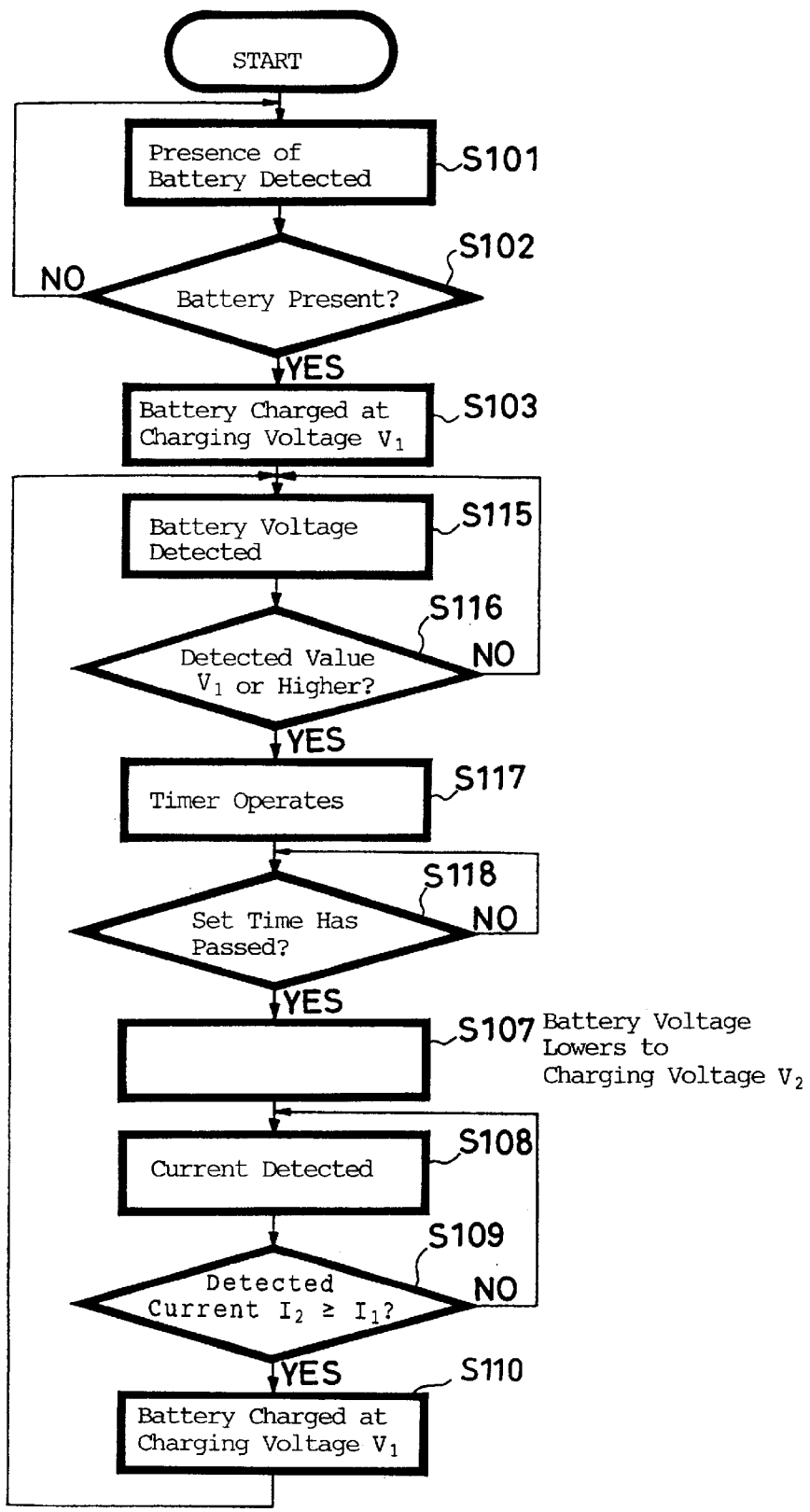
FIG. 12 is a flow chart showing charging processing when full-charge detection is carried out by still further processing in the first embodiment.
Figure 13:
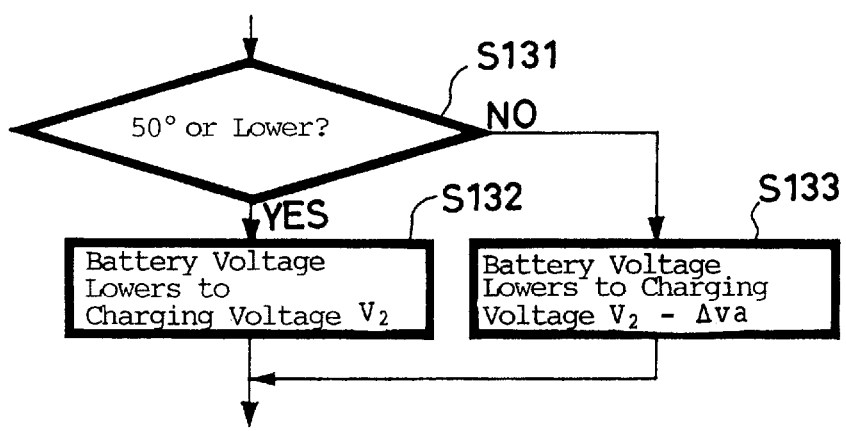
FIG. 13 is a flow chart when control of charging processing at the time of full-charge of the first embodiment is carried out by temperature.

When the 100% charged condition is detected by the battery voltage as in the case of the flow chart of this FIG. 11, it may be designed to judge as full charge the time when a specified time passes from the time when a specified battery voltage is detected. That is, as shown in the flow chart of FIG. 12, after the charging voltage is set to $V_1$ in Step S103, battery voltage may be detected by the voltage detection circuit 18 (Step S113), and when the voltage $V_3$, this detected value $V_1$ detects the voltage slightly lower than the voltage value corresponding to full-charge (Step S114), it is judged to be full-charge and the processing may move to Step S107 and the charging voltage may be lowered from $V_1$ to $V_2$. In other steps of the flow chart of FIG. 12, processings same as those described in FIG. 8 take place.

In the respective flow charts of FIGS. 8, 10, 11, and 12, it may be designed for the voltage not to directly lower to the charging voltage $V_2$ at Step S107 but to detect temperature on the surface or inside of the secondary battery 17 and to select voltage values to be lowered in accord with the detected temperature. That is, in place of Step S107 of each drawing, processing of the flow chart of FIG. 17 may be carried out. The processing of FIG. 17 may be designed to judge whether some temperature sensor provided in the charging equipment detects temperature higher than a specified value (here set to 50° C.) as surface temperature, etc. of the secondary battery 17 (Step S131), and if it is 50° C. or lower, to lower the charging voltage to the voltage value $V_2$ described above (for example, 4.0V) (Step S132), and if it exceeds 50° C., to lower the charging voltage to a voltage value (for example, 3.9V) obtained by subtracting a specified value $\Delta V\alpha$ (for example, 0.1V) from the above-mentioned voltage value $V_2$ (Step S133), and to move to the next step. Designing the processing in this way enables the proper setting of the charging voltage corresponding to temperature. In this event, it is necessary to prepare a temperature sensor and a constant voltage circuit for generating the voltage value ($V_2 - \Delta V\alpha$) in addition to the circuit of FIG. 7.

Figure 14:
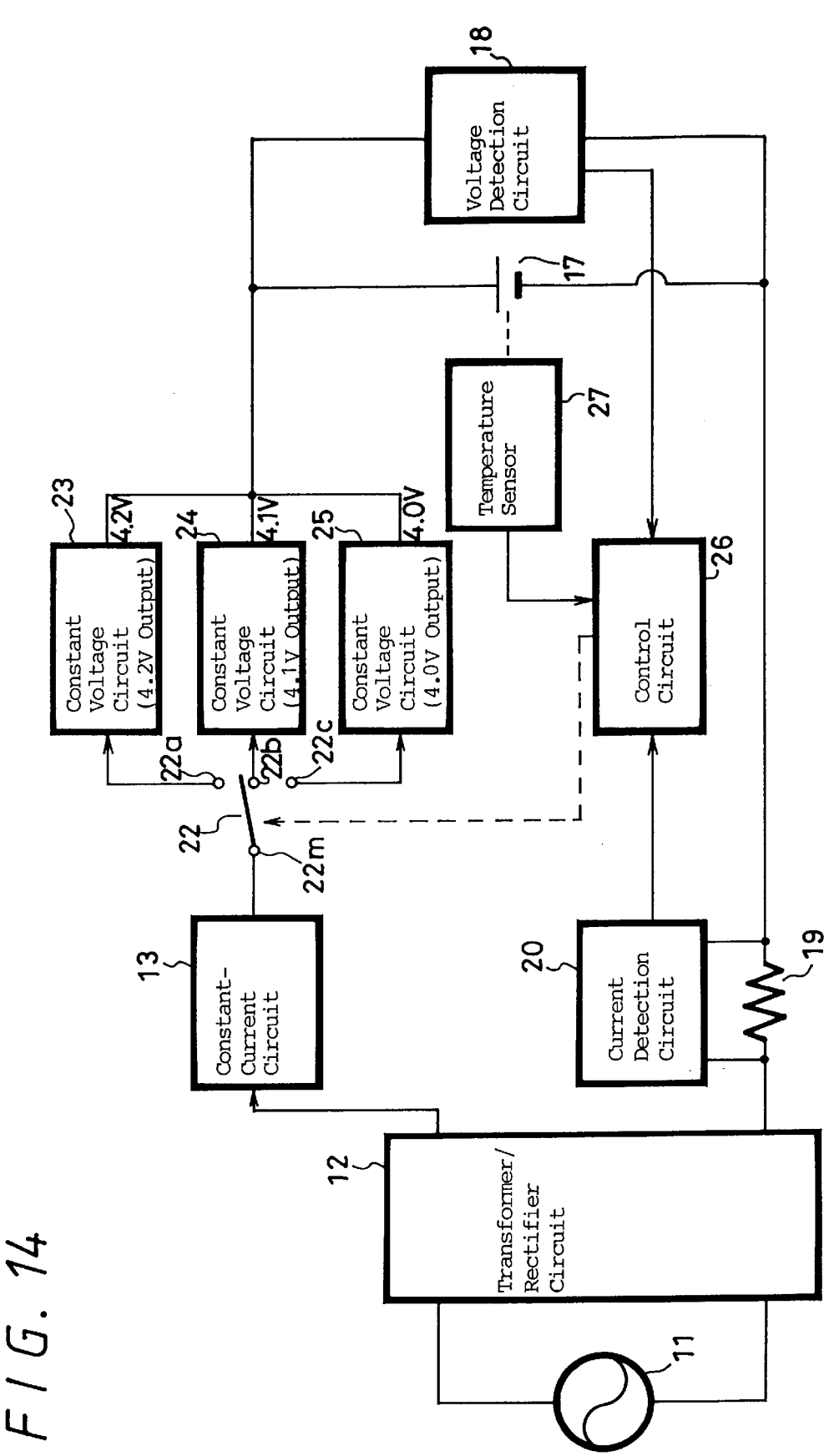
FIG. 14 is a structural diagram showing a charging equipment according to the second embodiment of this invention.

Now, referring to FIG. 14–FIG. 17, the second embodiment of this invention will be described. In this example, the battery temperature is detected to vary the charging voltage at the time of recharging, and the charging equipment is configured as shown in FIG. 14. In FIG. 14, parts corresponding to those previously described with reference to FIG. 7 are denoted by the same reference numerals and their detailed description is omitted.

In this example, the output of the constant current circuit 13 is fed to a movable contact 22*m* of a change-over switch 22, and the first, the second and the third fixed contacts 22*a*, 22*b*, and 22*c* of this changeover switch are connected to constant voltage circuits 23, 24, and 25, respectively. Now, the constant voltage circuit 13 is a circuit in which 4.2V constant voltage output is obtained, and the constant voltage circuit 25 is a circuit in which 4.0V constant voltage output is obtained. The outputs of respective constant voltage circuits 23, 24, and 25 are fed to the positive electrode side of the secondary battery 17, a lithium ion battery. The current flowing through the current detection resistor 19 connected to the negative electrode side of this secondary battery 17 is detected with the current detection circuit 20, and the detection data of the current value is compared with the current value $I_1$ set for the standard by a control circuit 26, and based on the comparison results, the changeover switch 22 is controlled. The inside temperature or surface temperature of the secondary battery 17 connected to this charging equipment or temperature in the vicinity of the secondary battery 17 is designed to be detected by a temperature sensor 27, and the data on the detected temperature is designed to be supplied to the control circuit 26, and based on the judgment whether the detected temperature is the set temperature Ta or higher, the change-over condition in controlling the changeover switch 22 is varied. For this set temperature Ta, for example, 50° C. is designated.

Other portions are configured in the same manner as in the case of the charging equipment shown in FIG. 7. Though it is not illustrated, in the case of this charging equipment, a load circuit may be connected to the secondary battery.

Now, referring to a flow chart of FIG. 15, operation when charging is carried out by the charging equipment of this example will be described. In the flow chart of FIG. 15, the same processing in the flow chart as shown in FIG. 8 takes place up to Step S109 (that is, step in which the charging current value $I_2$ detected after the battery is 100% charged once is compared with the setting value $I_1$) and the description thereof will be omitted. However, the charging voltage $V_1$ set in Step S103 is 4.2V voltage by the constant voltage circuit 23 (that is, the movable contact 22m of the changeover switch 22 is connected to the first fixed contact 22a), and the charging voltage $V_2$ set in Step S107 is 4.0V voltage by the constant voltage circuit 25 (that is, the movable contact 22m of the changeover switch 22 is connected to the third fixed contact 22c).

When the comparison in Step S109 indicates that the detected charging current value $I_2$ is greater than the setting value $I_1$ (that is $I_2 \geq I_1$) the detected temperature of the temperature sensor 27 is judged, and judgment is made on whether the detected temperature is higher than the set temperature Ta (for example, 50° C.) (Step S121). In this event, if the detected temperature is higher than the set temperature Ta, the movable contact 22m of the changeover switch 22 is changed over from the third fixed contact 22c to the second fixed contact 22b, and 4.1V charging voltage outputted by the second constant voltage circuit 24 (this charging voltage is designated to $V_1-\Delta V\alpha$) is applied to the secondary battery 17, and charging is carried out with this 4.1V charging voltage $V_1-\Delta V\alpha$ (Step S122). Then, the processing returns to Step S104 where charging current is detected by the current detection circuit 20.

If the detected temperature is less than the set temperature Ta in Step S121, the movable contact 22m of the changeover switch 22 is changed over from the third fixed contact 22c of the changeover switch 22 to the first fixed contact 22a, and 4.2V charging voltage $V_1$ outputted by the first constant voltage circuit 23 is applied to the secondary battery 17, and charging is carried out with this 4.2V charging voltage $V_1$ (Step S123). Then, the processing returns to Step S104 where the charging current is detected by the current detection circuit 20.

Figure 15:
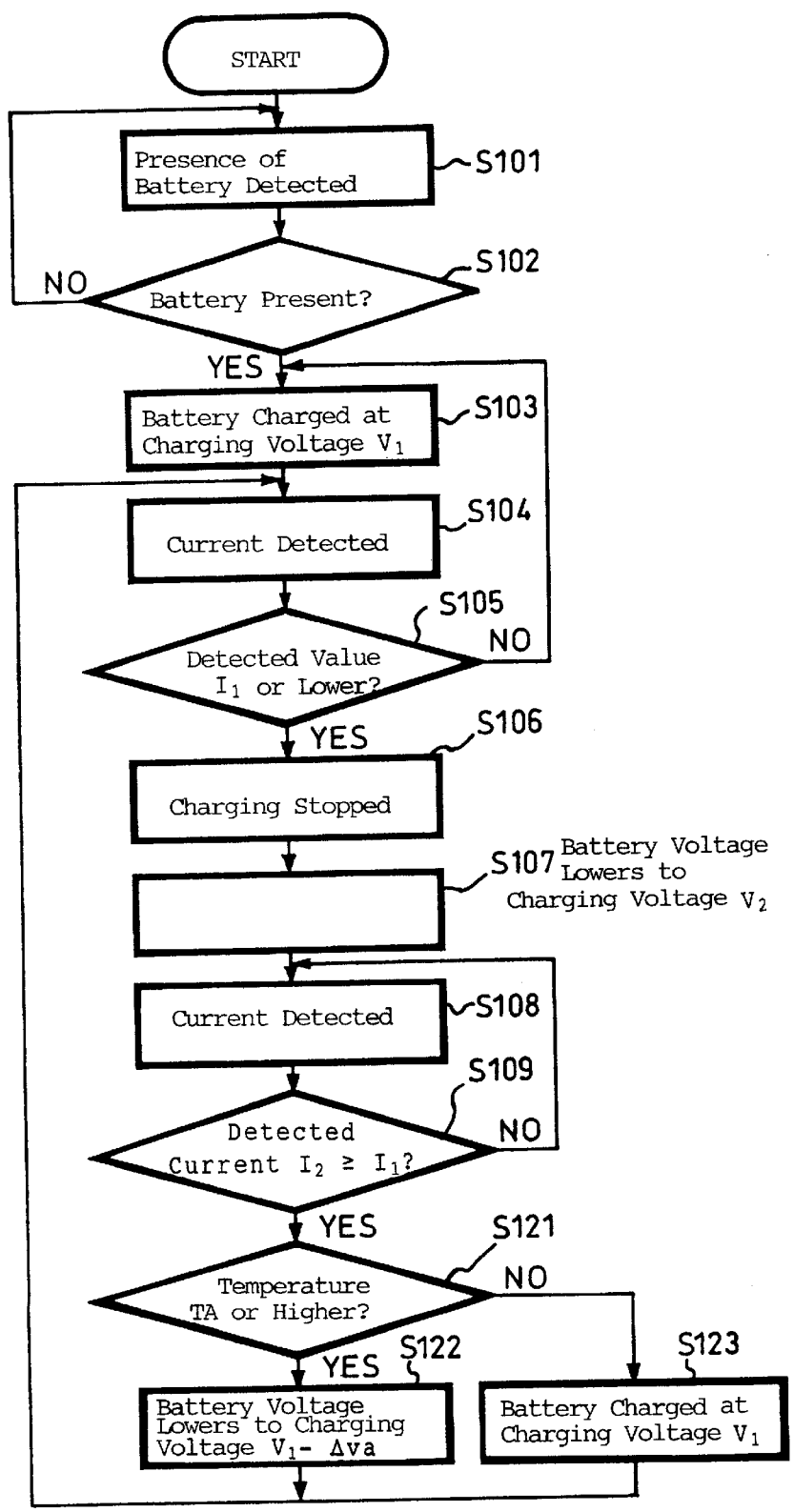
FIG. 15 is a flow chart showing charging processing according to the second embodiment.
Figure 16:
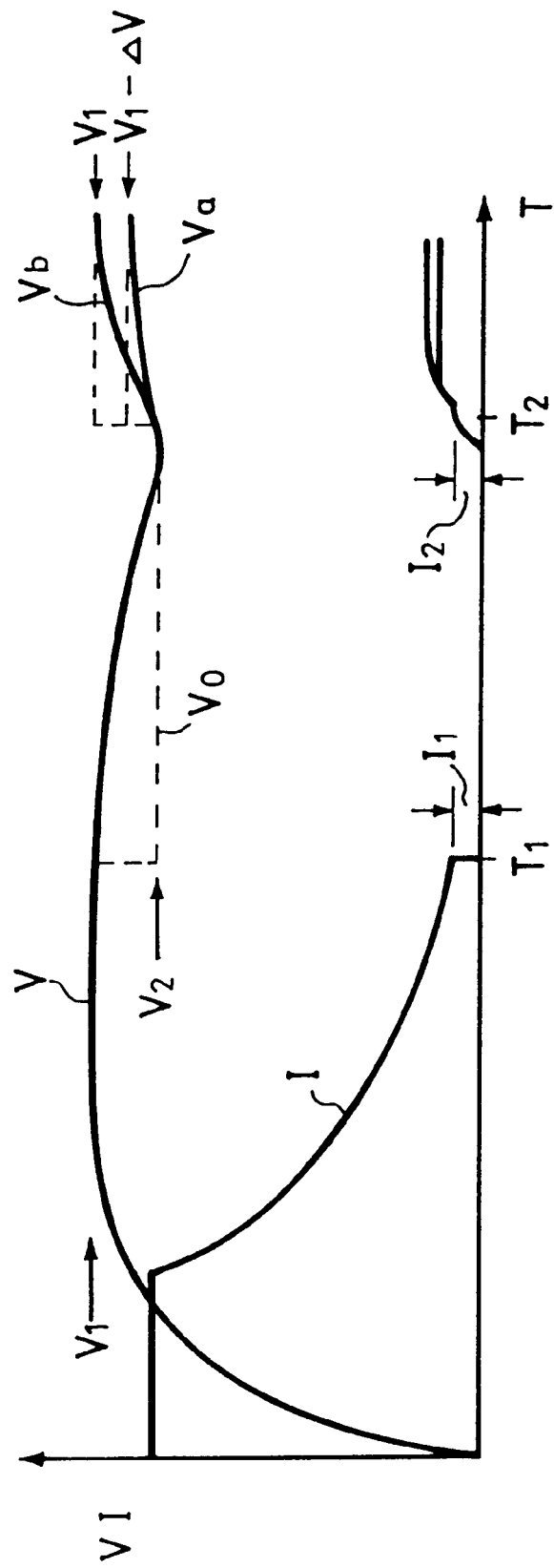
FIG. 16 is a characteristic diagram showing the charging condition according to the second embodiment.

As shown in the flow chart of FIG. 15, controlling the charging operation by the control circuit 26 allows charging to take place with the characteristics shown in FIG. 16. FIG. 16 is a characteristic diagram with charging current/voltage plotted against the elapsed time, indicating that charging is carried out at 4.2V charging voltage $V_1$ once constant voltage charging is established after the start of charging. Execution of this constant voltage charging allows the battery voltage V to coincide with the charging voltage $V_1$ but the charging current I gradually decreases, and when the charging current I attains the preset current value $I_1$ or lower, the secondary battery (lithium ion battery) is 100% charged. At the timing $T_1$ with the battery 100% charged, the changeover switch 12 is changed over from the first fixed contact 12a to the third fixed contact 12c side, and the charging voltage is changed over from 4.2V ($V_1$) to 4.0V ($V_2$) (lowering of charging voltage $V_0$ shown with a broken line in FIG. 16). By the charging voltage attaining 4.0V in this way, charging to the secondary battery 7 is not carried out because the battery voltage V is 4.2V, and the charging current is prevented from flowing. Up to this point, the condition is exactly same as that described in connection with FIG. 9.

If the secondary battery 17 is left as it is under this condition, the battery voltage V gradually lowers due to the self-discharge (or discharge to the load connected), but when it lowers to 4.0V, the charging voltage (timing $T_2$ in FIG. 16), charging current $I_2$ starts to flow from the charging circuit side to the secondary battery 17. And this charging current $I_2$ is detected by the current detection circuit 20 and compared with the setting value $I_1$ and if it is the setting value $I_1$ or higher, processing to raise the charging voltage is carried out, but depending on whether or not the detected temperature of the temperature sensor 27 in this event is the set temperature Ta or higher, either $V_1$ (4.2V) or $V_2-\Delta V\alpha$ (4.1V) is selected for the changed-over charging voltage.

That is, if the detected temperature in this event is the set temperature Ta or higher, 4.1V is selected for the charging voltage, and the battery is charged with this 4.1V charging voltage until the battery voltage reaches 4.1V (the condition of battery voltage Va shown in FIG. 16). Because this condition in which the battery voltage is 4.1V provides a potential slightly lower than the battery voltage 4.2V when the battery is 100% charged, charging stops with the battery charged with a volume slightly lower than 100% (for example, 90%). And if the detected temperature is less than the set temperature Ta, 4.2V is selected for the charging voltage, and with this 4.2V charging voltage, the battery voltage becomes 4.2V and the battery is 100% charged (condition of battery voltage Vb shown in FIG. 16).

By varying the charging voltage for re-charging after fully charged in this way in accord with the battery or its surrounding temperature, the battery protection is carried out when temperature is high. That is, when the temperature is high, the lithiumion battery has a disadvantage in which characteristic deterioration (that is, reduction of charging capacity) when 100% charged occurs more quickly than at the normal time, and it is not preferable to charge the battery to 100%. Now, in the case of this example, when the battery temperature is high, charging is designed to be stopped right before 100% charging takes place, thereby preventing characteristic deterioration due to 100% charging at high temperatures. Because when the battery temperature is not high, the battery is designed to be 100% charged, the battery is charged to the point in which the capacity of the secondary battery is able to be utilized to the maximum when no protection due to temperature is required, enabling highly efficient charging. With respect to the charging operation when the temperature is lower than the set temperature Ta, exactly same charging operation of one embodiment described in connection with FIG. 9 takes place, providing the similar effects as in the case of the one embodiment.

In the example described in connection with FIG. 14–FIG. 16, the charging voltage at the time of re-charging is changed over between two types based on the judgment on whether or not the temperature is the set temperature Ta or higher, but charging voltage may be controlled more finely based on the results of temperature detection more finely carried out. For example, in place of the temperature judgment at Step S121 in the flow chart of FIG. 15 and setting of charging voltage at Steps S122, S123 based on the judgment, temperature may be judged in two stages as shown in the flow chart of FIG. 17, and the charging voltage at the time of re-charging may be changed over in three stages.

That is, as shown in the flow chart of FIG. 17, first of all, judgment is made on whether or not the temperature detected by the temperature sensor 27 is 50° C. or higher (Step S124), and if it is higher than 50° C., further judgment is made on whether or not the temperature is 60° C. or higher (Step S125). And if it is judged to be 60° C. or higher, $[V_2-2\Delta V\alpha]$ is set for the charging voltage (Step S126). In this event, let $V_1$ 4.2V and $\Delta V\alpha$ be 0.1V, 4.0V is set (if $V_2$ is 4.0V, charging voltage will not vary).

If the temperature is judged to be less than 60° C. at Step S125, $[V_1-\Delta V\alpha]$ is set as charging voltage (Step S127). Here, assuming the values of the $V_1$ and $\Delta V\alpha$, 4.1V is set.

When the temperature is judged to be less than 50° C. at Step S124, $V_1$ is set as charging voltage (Step S128). Here, assuming the above-mentioned value for $V_1$, 4.2V is set.

Controlling the voltage more finely in accord with the temperature in this way achieves an effect in that protection of the secondary battery by temperature is able to be carried out more accurately. In addition to changing temperature stepwise in this way, the voltage value at the time of re-charging may be continuously varied in accord with the detected temperature.

With respect to specific configuration of the temperature sensor 27 for detecting temperature of the secondary battery 7, no particular description is made here, but temperature sensors of various configurations may be applied. For example, the surface temperature of the secondary battery may be detected by an infrared sensor, or the inside temperature may be detected by a terminal for temperature detection equipped to the secondary battery, and in addition, using some kind of temperature detection elements, temperature in the vicinity of the mounting portion of the secondary battery may be detected.

Now referring to FIG. 18 and FIG. 19, the third embodiment according to this invention will be described.

Figure 18:
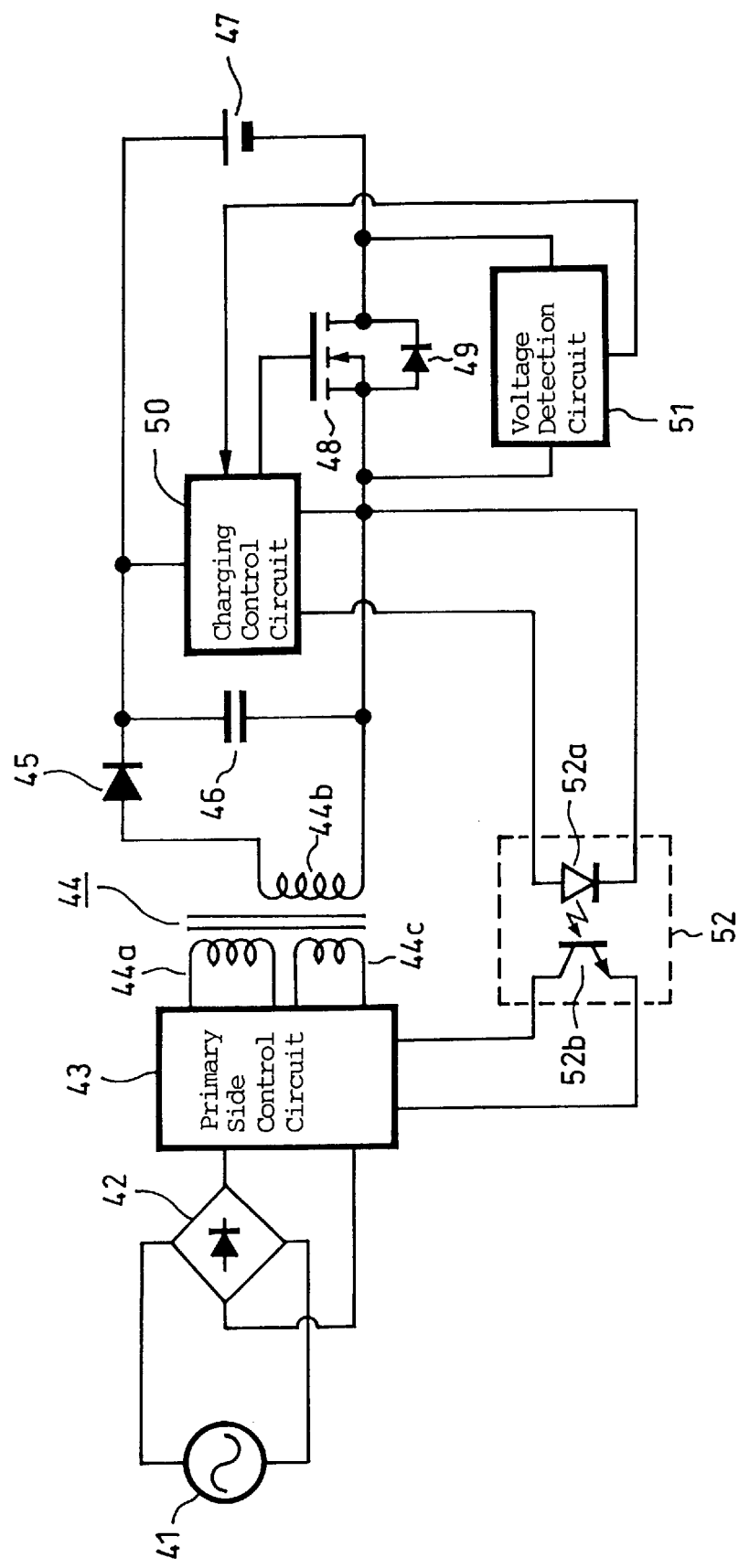
FIG. 18 is a structural diagram showing a charging equipment according to the third embodiment of this invention.

FIG. 18 is a block diagram showing an arrangement of the charging equipment of this example, in which AC power supply from a commercial AC power supply 41 is fed to a rectifier circuit 42 comprising a diode bridge to provide a DC power supply. This DC power supply is fed to a primary side control circuit 43, and specified processing is carried out at this primary-side control circuit 43, and the then is fed to a primary-side winding 44a of a switching transformer 44. And on a secondary-side winding 44b of the switching transformer 44, low-voltage DC power supply converted to specified low voltage is obtained. In this event, on the primary side of the switching transformer 44, an auxiliary winding 44c is provided for controlling the switching condition. To the primary-side control circuit 43, a control signal is supplied from a charging control circuit 50 on the secondary side later described via a photocoupler 52, and the output voltage is controlled in accord with this control signal.

One end of the secondary winding 44b of this switching transformer 44 is connected to the anode of a switching diode 45, and the cathode of this diode 45 an the other end of the secondary winding 44b are connected by a switching capacitor 46 to provide a DC low-voltage power supply of a specified voltage.

The anode of the diode 45 from which the low-voltage DC power supply is obtained is connected to one end (positive electrode) of a secondary battery (here, lithium ion battery is used for the secondary battery) 47 loaded on this charging equipment, and the other end of this secondary battery 47 (negative electrode) is connected to the other end of the secondary winding 44 of the switching transformer 44 via the source and the drain of a field-effect transistor (FET) 48, a switching means for charging control. In this case, the connecting direction across the source and the drain of the field-effect transistor 48 is such that the current flows from the secondary battery 47 to the other end side of the secondary winding 44b when this transistor 48 conducts, and the current flowing from this secondary battery 47 to the other end side of the secondary winding 44b is restricted when it does not conduct. Across the source and the drain of this field-effect transistor 48, a parasitic diode 49 is generated in which the current flows in the direction reversal to the direction to control the current flow (that is, the direction in which the current flows from the other end side of the secondary winding 44b to the negative electrode of the secondary battery 47).

And for a circuit to control the gate of this transistor 48, the charging control circuit 50 is provided. The charging control circuit 50 comprises an integrated circuit and is connected in such a manner for the signal obtained on the secondary side of the switching transformer 44 is supplied as a power supply. That is, the cathode of the diode 45 and the other end side of the secondary winding 44b are connected to the charging control circuit 50 respectively. From this charging control circuit 50 to the gate of the transistor 48, the switching control signal is supplied to control the current flow as described above (that is, control of conduction and nonconduction), and at the same time when it is brought to the nonconducting state, the impedance across the source and the drain is designed to be controlled to be high.

In the present example, a voltage detection circuit 51 is provided for detecting the potential across one end and the other end of the charging current path of the field effect transistor 48, that is, the potential across the source and the drain, and the data of the potential across the source and the drain detected by this detection circuit 51 is supplied to the charging control circuit 50.

The charging control circuit 50, based on the detection data of this voltage detection circuit 51, controls the condition of the transistor 48. The charging control circuit 50 is designed to supply the voltage control signal (that is, the signal which varies in proportion to the voltage value to control) to a light emitting diode 52a comprising the photocoupler 52. A light receiving element 52b for receiving light from the light emitting diode 52a of this photocoupler 52 is connected to the primary side control circuit 43, so that the voltage control signal outputted by the charging control circuit 50 can be transmitted to the primary side control circuit 43. The primary side control circuit 43, based on this voltage control signal, controls the voltage of the power supply obtained for the secondary winding 44b of the switching transformer 44.

Figure 19:
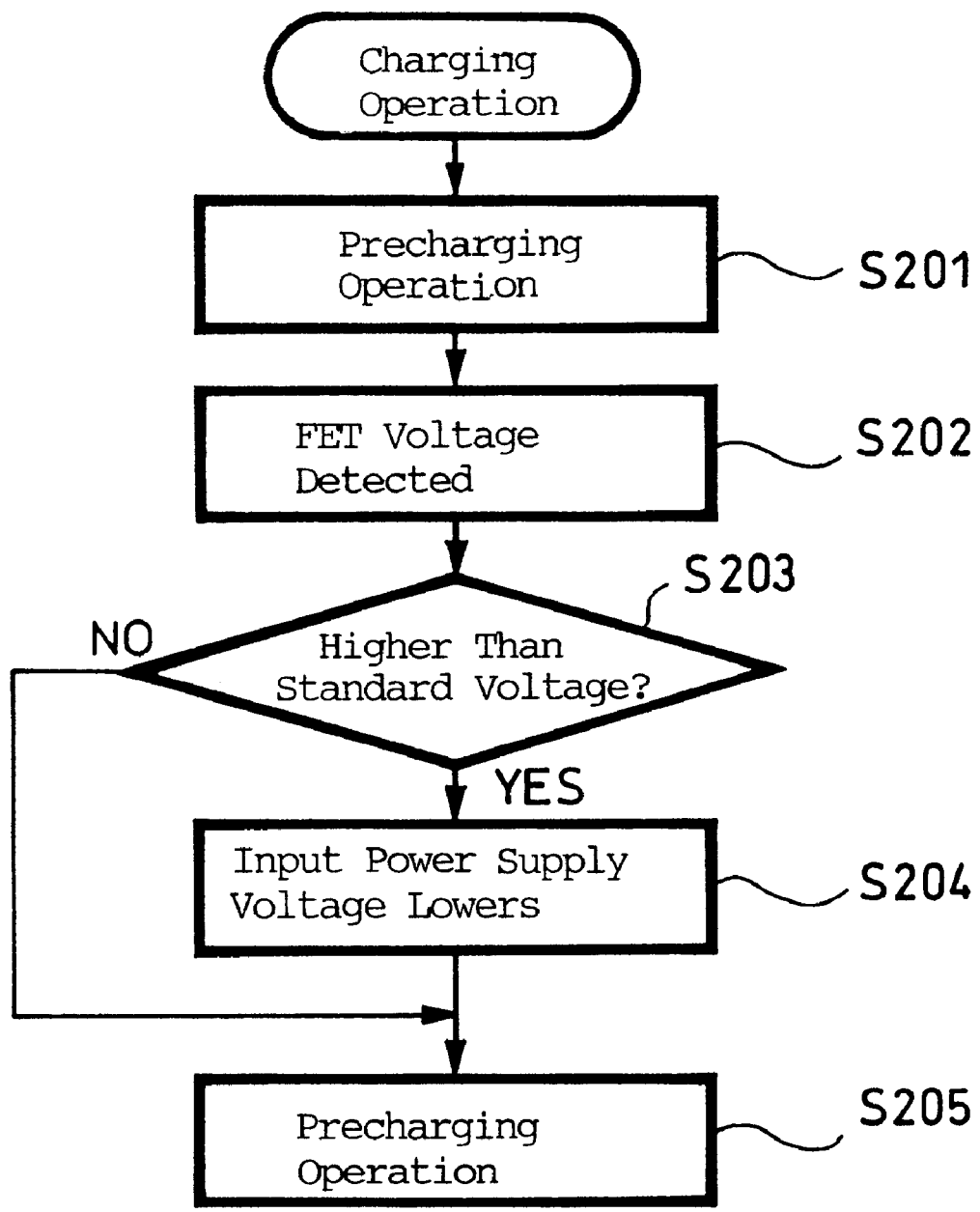
FIG. 19 is a flow chart showing charging processing according to the third embodiment.

Now referring to the flow chart of FIG. 19, operation when the secondary battery 47 is charged with the charging equipment of the configuration of FIG. 18 is described with special emphasis on the pre-charging operation when charging begins.

When the secondary battery 47, the lithium ion battery, is charged, processing called pre-charging is carried out, and then, processing for detecting the condition of the secondary battery 47 is carried out (Step S201). For pre-charging processing in the case of this example, first, by the control signal to be supplied from the charging control circuit 50 to the gate of the field effect transistor 48, the impedance across the source and drain of this transistor 48 is brought into the high state. In the case of this example, for the secondary battery 47, the one with the battery voltage of 4.2V when fully charged is used, and at the time of pre-charging, the voltage of the power supply obtained in the secondary winding 44b of the switching transformer 44 (hereinafter simply called input power supply) is set to 4.2V or a voltage slightly lower than 4.2V.

Under this condition, the voltage across the source and the drain of the field effect transistor 48 is detected in the voltage detection circuit 51 (Step S202). And the detected voltage is judged by the charging control circuit 50 to judge whether or not the voltage is the standard voltage or higher previously set to the charging control circuit 50 (Step S203). And if the voltage is the standard voltage or higher, processing to lower the input power supply voltage by the voltage control signal supplied from the charging control circuit 50 to the primary side control circuit 43 via the photocoupler 52 (Step S204), and pre-charging operation is allowed to continue under this condition (Step S205).

When the voltage detected by the voltage detection circuit 51 is less than the standard voltage, pre-charging operation is allowed to continue at the input power supply voltage as it is.

After this pre-charging is started, the condition of the secondary battery 47 (such as battery voltage, etc.) is detected, and when the battery voltage etc. is brought to a specified state, the high impedance state is changed to the conducting state across the source and the drain of the transistor 48, and the secondary battery 47 is charged with an input power supply of comparatively large current (e.g. 1A), allowing it to carry out so-called rapid charging.

As described above, according to the charging equipment of this example, allowing the charging current with the field effect transistor 48, a switching means for controlling the start of charging, held in the high-impedance state enables pre-charging by a small current, and the condition of the secondary battery 47 mounted is able to be accurately detected. And pre-charging under the high-impedance state with the power supply voltage lowered to allow the charging current to flow achieves pre-charging with loss reduced at the field effect transistor 48, thereby enabling highly efficient pre-charging.

Figure 20:
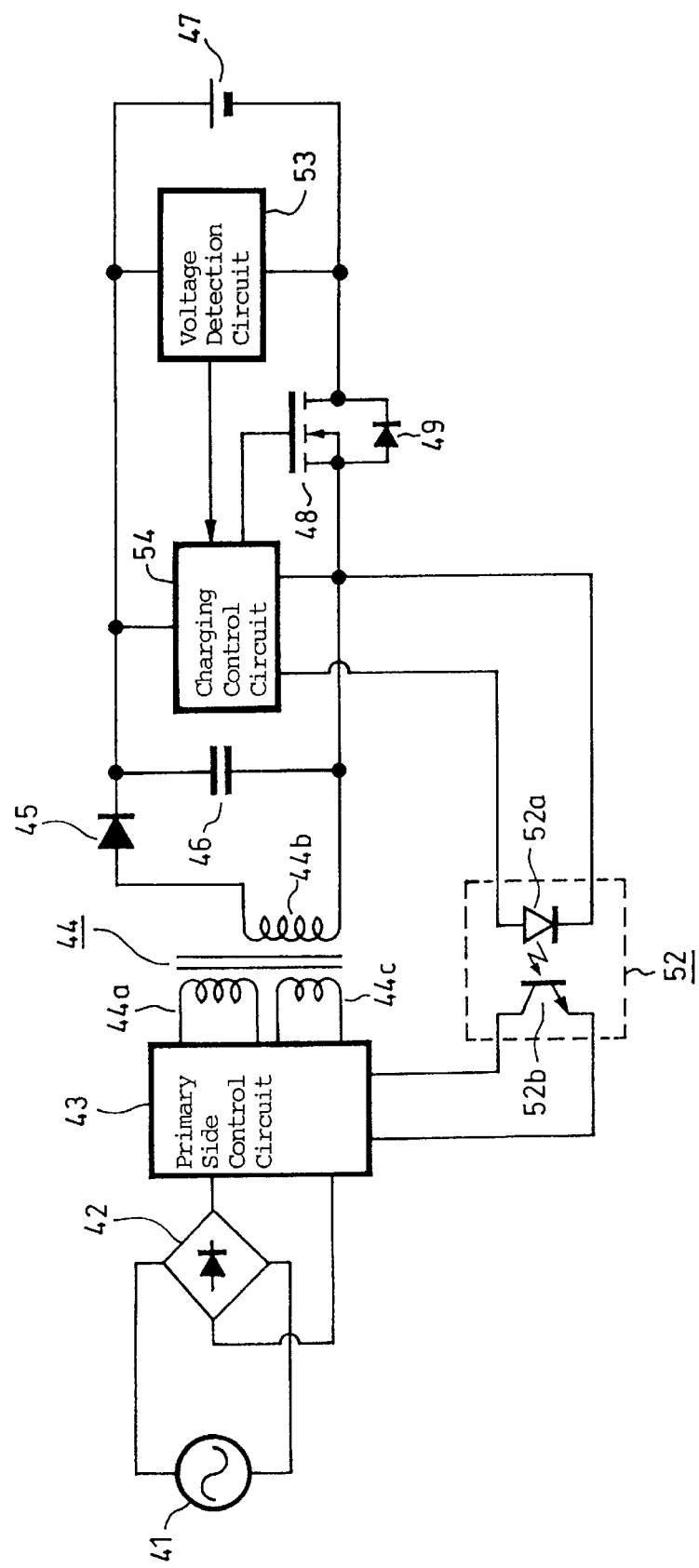
FIG. 20 is a structural diagram showing a charging equipment according to the fourth embodiment of this invention.
Figure 21:
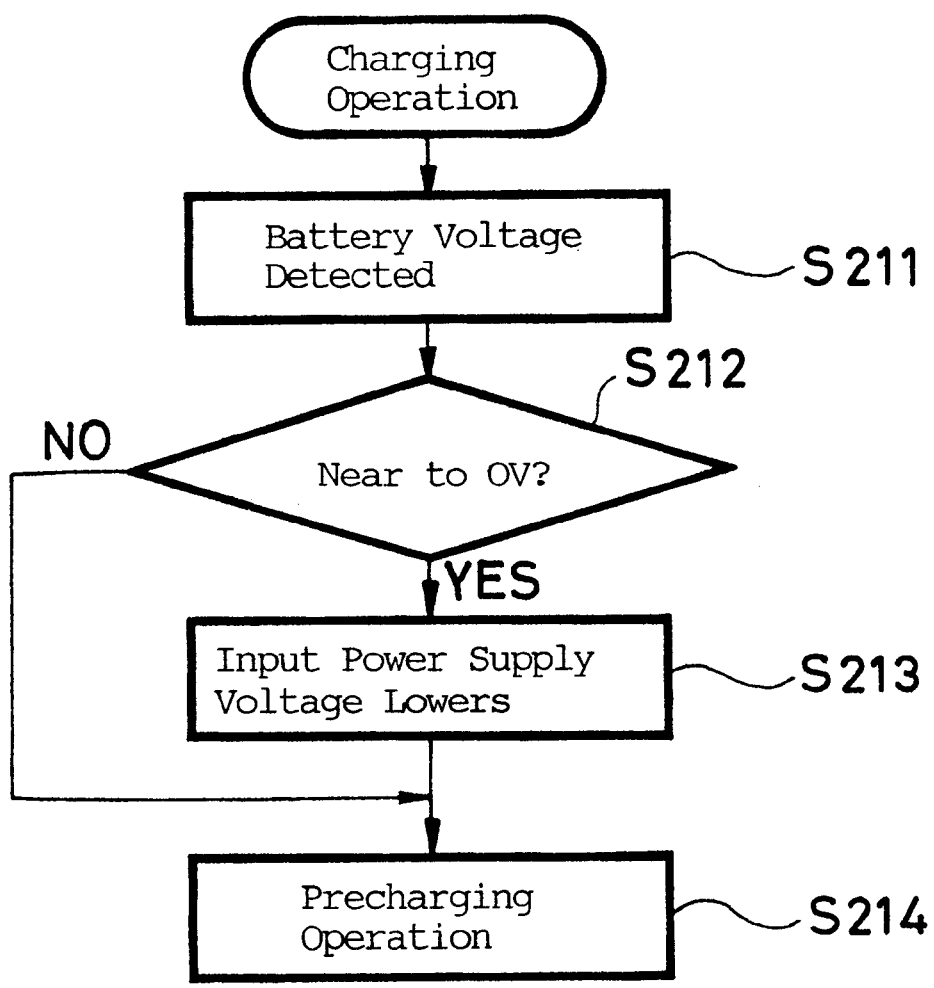
FIG. 21 is a flow chart showing charging processing according to the fourth embodiment.

Now referring to FIG. 20 and FIG. 21, the fourth embodiment according to the present invention is described. In FIG. 20 showing the configuration of the charging equipment of the fourth embodiment, parts similar to or corresponding to those previously described with reference to FIG. 18 which shows the configuration of the third embodiment are denoted by the same reference numerals, and their detailed description is omitted.

Turning now to the configuration of the fourth embodiment, in this example, as shown in FIG. 20, the anode of the diode 45 from which the low-voltage DC power supply is obtained is connected to one end (positive electrode) of the secondary battery 47 (lithium ion battery) loaded on this charging equipment, and the other end (negative electrode) of this secondary battery 47 is connected to the other end of the secondary winding 44b of the switching transformer 44 via across the source and the drain of the field-effect transistor (FET) 48, a switching means for charging control. In this case, the connecting direction across the source and the drain of the field-effect transistor 48 is such that the current flows from the secondary battery 47 to the other end side of the secondary winding 44b when this transistor 48 conducts, and the current flowing from this secondary battery 47 to the other end side of the secondary winding 44b is restricted when it does not conduct.

And for a circuit to control the gate of this transistor 48, a charging control circuit 54 is provided. The charging control circuit 54 comprises an integrated circuit and is connected in such a manner for the signal obtained on the secondary side of the switching transformer 44 is supplied as a power supply. That is, the cathode of the diode 45 and the other end side of the secondary winding 44b are connected to the charging control circuit 54 respectively. From this charging control circuit 54 to the gate of the transistor 48, the switching control signal is supplied to control the current flow as described above (that is, control of conduction and nonconduction), and at the same time when it is brought to the nonconducting state, the impedance across the source and the drain is designed to be controlled to be high.

In the present example, a voltage detection circuit 53 is provided for detecting the battery voltage, that is, the potential across one electrode and the other electrode of the secondary battery 47 mounted, and the data of the battery voltage detected by this detection circuit 53 is supplied to the charging control circuit 54.

In the charging control circuit 54, based on the detection data of this voltage detection circuit 53, the condition of the transistor 48 is controlled. The charging control circuit 54 is designed to supply the voltage control signal to the primary side control circuit 43 via the photocoupler 52. In the primary side control circuit 43, based on this voltage control signal, the voltage of the power supply obtained for the secondary winding 44b of the switching transformer 44 is designed to be controlled. Other portions are configured in the same manner as in the case of the charging equipment shown in FIG. 18.

Now referring to the flow chart of FIG. 21, operation when the secondary battery 47 is charged with the charging equipment of the configuration of FIG. 20 is described with special emphasis on the pre-charging operation when charging begins.

When the secondary battery 47, the lithium ion battery, is charged in the circuit of this example, processing for detecting the battery voltage by the voltage detection circuit 53 with the impedance across the source and the drain of this transistor 48 held in the high state by the control signal supplied from the charging control 54 to the gate of the filed effect transistor 48 is carried out (Step S211).

And the detected voltage is judged by the charging control circuit 54 to judge whether or not the voltage is 0V or the value close to 0V (Step S212). And if the voltage is 0V or the value close to 0V, processing to lower the input power supply voltage is carried out by the voltage control signal supplied from the charging control circuit 54 to the primary side control circuit 43 via the photocoupler 52 (Step S213), and pre-charging operation is allowed to continue under this condition (Step S214).

When the voltage detected by the voltage detection circuit 53 is not the value close to 0V, processing to continue pre-charging operation is carried out at the input power supply voltage as it is.

After this pre-charging is started, the condition of the secondary battery 47 (such as battery voltage, etc.) is detected, and when the battery voltage etc. is brought to a specified state, the high impedance state is changed to the conducting state across the source and the drain of the transistor 48, and the secondary battery 47 is charged with an input power supply of comparatively large current (e.g. 1A), allowing it to carry out so-called rapid charging.

As described above, according to the charging equipment of this example, similar to the third embodiment described above, the charging current with the field effect transistor 48, a switching means for controlling the start of charging is, held in the high-impedance state which enables pre-charging by a small current, and the condition of the secondary battery 47 mounted is able to be accurately detected. And pre-charging under the high-impedance state with the power supply voltage lowered to allow the charging current to flow achieves pre-charging with loss reduced at the field effect transistor 48, thereby enabling highly efficient pre-charging.

Figure 22:
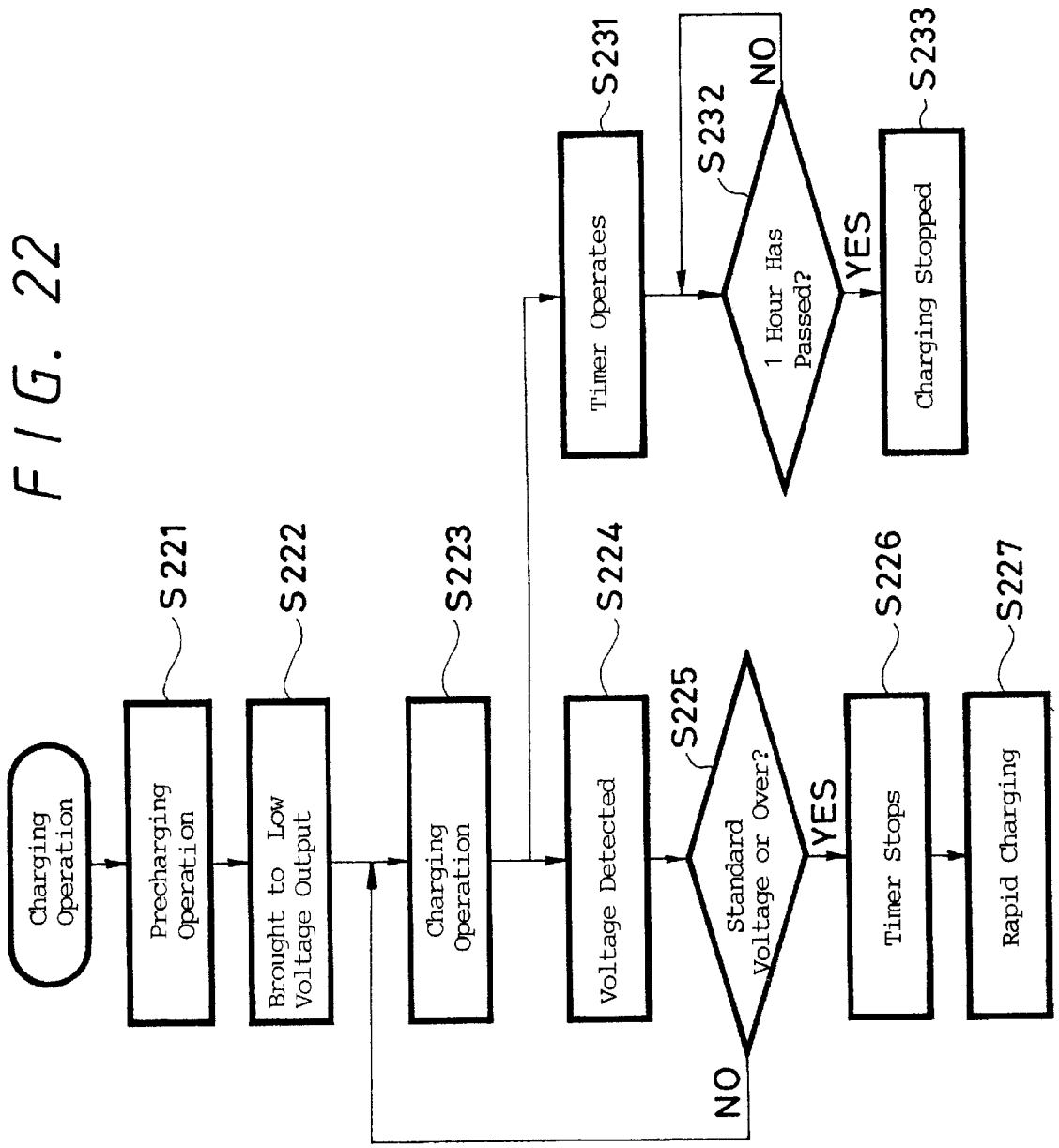
FIG. 22 is a flow chart showing charging processing according to the fifth embodiment of this invention.

Now, referring to the flow chart of FIG. 22, the fifth embodiment of the present invention is described. In the case of the fifth embodiment, the secondary battery (lithium ion battery) is charged by the charging equipment of the circuit configuration of the third embodiment mentioned above, and processing of pre-charging by the control of the charging control circuit 50 is carried out as shown in the flow chart of FIG. 22.

That is, at the start of charging, pre-charging operation is started with the field effect transistor 48, a switching means for controlling the start of charging brought into the high state (Step S221). In this event, the charging control circuit 50 is controlled to bring the power supply voltage obtained in the secondary winding 44b of the switching transformer 44 to a low voltage (Step S222). The voltage in this event should be the minimum voltage that can operate the charging control circuit 50 formed with integrated circuits (for example, 3.0V) or the voltage slightly higher than that.

Under this condition, pre-charging is carried out (Step S223), and the potential across one end and the other end of the transistor 48 in the high impedance state is detected by the voltage detection circuit 51 (Step S224), and at the same time, the time in the charging control circuit 50 is operated (Step S231). And it is judged whether or not the detected voltage is the standard voltage or higher (Step S225). And if the voltage is the standard voltage or lower, the battery voltage is judged to be low, and processing is returned to pre-charging at Step S223.

When it is judged to be the standard voltage or higher at Step S225, after the timer operated at Step S231 is stopped (Step S226), and the field effect transistor 48 is brought into the conducting state to increase the charging current, and rapid charging is carried out (Step S227).

And if the condition in which the voltage is detected to be lower than the standard voltage at Step S225 continues, it must be determined whether or not it has passed 1 hour since the timer began to be operated at Step S231 (Step S232), and if one hour has passed, it shall be judged that something wrong occurs in the secondary battery 47 at this time, and the transistor 48 shall be brought into the nonconducting state to stop charging (Step S233).

Carrying out processing at the start of charging in this way enables the detection of the condition of the secondary battery mounted with the field effect transistor, a switching means for controlling the charging, brought into the high impedance state before rapid charging, and highly efficient detection processing of the battery condition is achieved similar to the third embodiment. In this example, lowering the output voltage of the power supply circuit (switching power supply) at the time of precharging under the condition for detecting the battery condition to the minimum voltage at which the charging control circuit 50, the integrated circuit, can be operated carries out pre-charging at the minimum voltage under the condition that enables the control of charging by the charging control circuit 50, and precharging is enabled under the condition with the lowest voltage applied to the secondary battery. Consequently, it is possible to detect the condition of the secondary battery with the minimum burden to the secondary battery or the circuit, thereby enabling the detection of the secondary battery under the favorable condition.

In this fifth embodiment, the potential across one end and the other end of the field effect transistor 48 described in the third embodiment is detected and is applied to the configuration in which the battery condition is detected, but it is possible to apply to the configuration in which the battery voltage is detected described in the fourth embodiment. That is, in the configuration of FIG. 20 described in the fourth embodiment, the power supply voltage at the time of pre-charging may be brought to the minimum voltage that can operate the charging control circuit 54.

Figure 23:
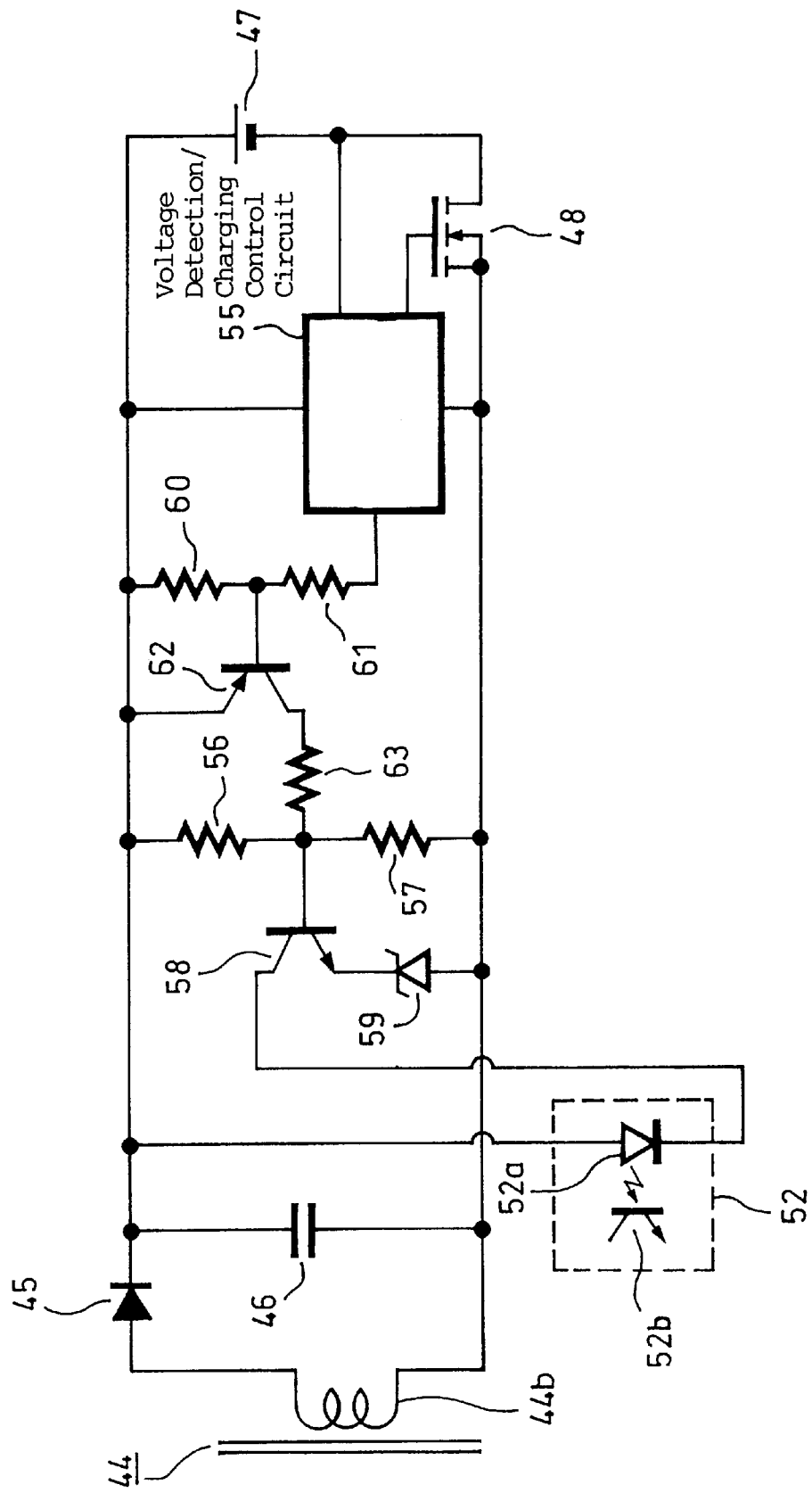
FIG. 23 is a structural diagram showing a charging equipment according to the sixth embodiment of this invention.
Figure 24:
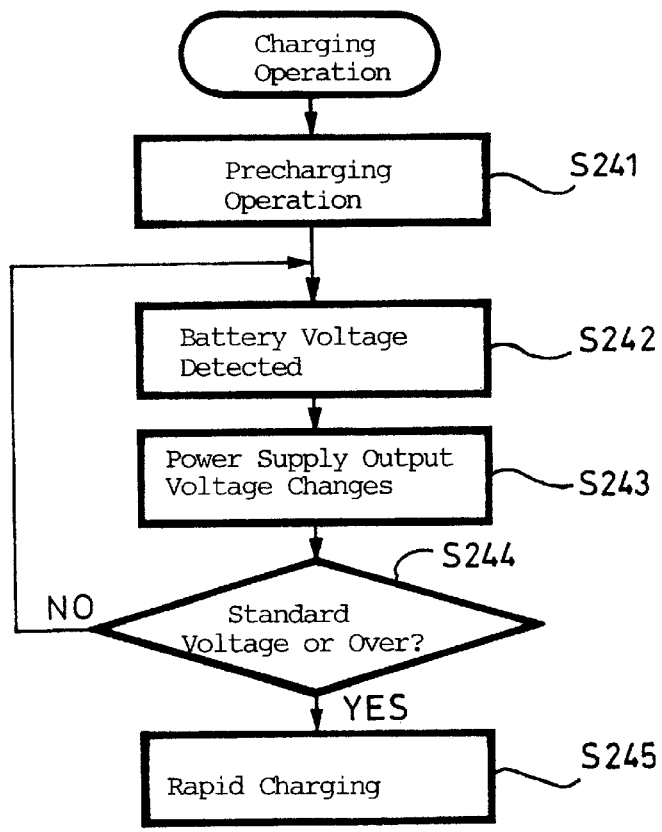
FIG. 24 is a flow chart showing charging processing according to the sixth embodiment.
Figure 25:
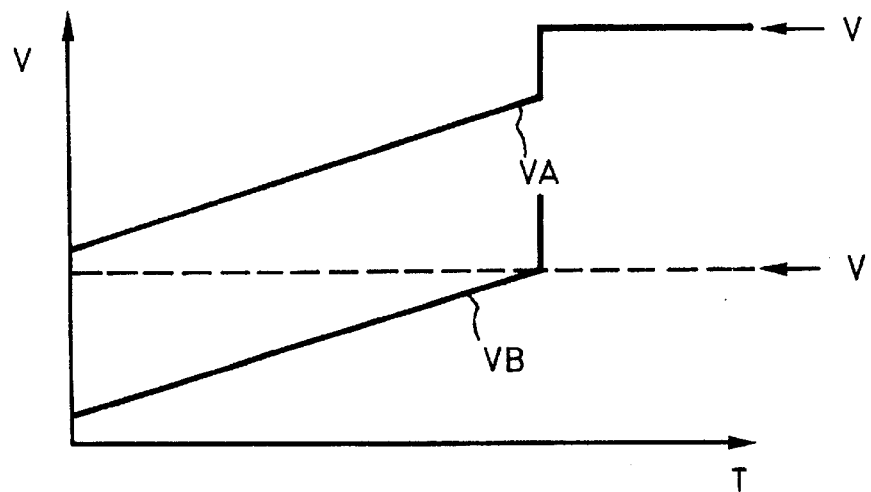
FIG. 25 is a characteristic diagram showing the charging condition according to the sixth embodiment.

Now referring to FIG. 23–FIG. 25, the sixth embodiment of the present invention is described. In the case of this sixth embodiment, the secondary battery (lithium ion battery) is charged by the charging equipment of the circuit shown in FIG. 23. In FIG. 23 showing the configuration of the charging equipment of the sixth embodiment, parts corresponding to those previously described with reference to FIG. 18 and FIG. 20 which show a configuration of the fourth embodiment are denoted by the same reference numerals, and their detailed description is omitted.

Referring to FIG. 23, the charging equipment of this example is described. The circuit of FIG. 23 has the primary side of the switching transformer 44 omitted, and the power supply output as the switching power supply is obtained by the diode 45 and the capacitor 46 connected to the secondary side winding 44b. The cathode of the diode 45 which is the power output of one electrode is connected to the positive electrode side of the secondary battery (lithium ion battery) 47 mounted to this charging equipment, and at the same time, the negative electrode side of this secondary battery 47 is connected to the other end side (the side to which diode 45 is not connected) of the secondary winding 44b via the field effect transistor 48 which is the switching means for charging control.

And a voltage detection/charging control circuit 55 for detecting the voltage across the terminals of the secondary battery 47 and controlling charging in accord with the detected potential is provided. To this voltage detection/charging control circuit 55, one and the other terminals of this battery 47 are connected to detect the voltage across terminals of the secondary battery 47 as well as to supply the output of the switching power supply. And based on the detected battery voltage, control is carried out on the gate of the field effect transistor 48, on determining which state should be selected for this transistor 48, from three conditions of conducting, nonconducting, and high-impedance, and on charging. In FIG. 23, the parasitic diode of the field effect transistor 48 is omitted. To this point, the configuration is same as that of the fourth embodiment described above.

In this example, the voltage control of the switching power supply by the voltage detection/charging control circuit 55 is carried out in proportion to the battery voltage at that time. To describe the configuration, using the series circuit of resistors 56, 57, one end and the other end from which the output of the switching power are obtained are connected, and the connection middle point of these resistors 56, 57 is connected to the base of an NPN type transistor 58. The cathode of the diode 45 is connected to the collector of the transistor 48 via the light emitting diode 52a, of the photo coupler 52 and the other side of the secondary winding 44b is connected to the emitter of the transistor 58 via a zener diode 59.

Using the series circuit of resistors 60, 61, the cathode of diode 45 and the voltage control terminal of the voltage detection/charging control circuit 55 are connected, and the connection middle point of the resistors 60, 61 is connected to the base of a PNP type transistor 62. The cathode of the diode 45 is connected to the emitter of this transistor 62, and the collector of this transistor 62 is connected to the base of the transistor 58 via a resistor 63.

In this kind of circuit configuration, varying the voltage value of the voltage control signal outputted from the voltage control terminal in proportion to the battery voltage detected by the voltage detection/charging control circuit 55 at the time of precharging varies the voltage control condition at the control circuit on the primary side of the switching power supply not illustrated, and the voltage of the power supply supplied to the secondary battery 47 is varied.

Now, processing at the time of precharging in this example is described referring to the flow chart of FIG. 24 and the voltage characteristic diagram of FIG. 25. First of all, the transistor 48 is brought into the high impedance state, the power supply voltage Va is brought to the minimum voltage (for example, the minimum voltage that can operate the voltage detection/charging control circuit 55), and precharging operation is started (Step S241). And the battery voltage Vb is detected (Step S242). In this event, the battery 47 is gradually charged by this precharging, and as shown in FIG. 8, the battery voltage VA gradually rises. At this point, control for increasing the power supply voltage VA is carried out as shown in FIG. 25 in proportion to the increase of voltage by the control of the voltage detection/charging control circuit 55 (Step S243).

And whether or not the battery voltage VB attains the predetermined standard voltage $V_{21}$ or higher is judged (Step S244), and if it is less than the standard voltage $V_{21}$, control is carried out for increasing power supply voltage in proportion to the battery voltage at Step S242 and S243. And if it is judged that the voltage attains the standard voltage $V_{21}$ or higher at Step S224, the transistor 48 is changed from the high-impedance state to the conducting state to increase the charging current, and rapid charging is started with the power supply VA used for the voltage $V_{22}$ for rapid charging (Step S245).

Carrying out control at the time of precharging in this way can keep the power applied to the field effect transistor 48 constantly to nearly same level during precharging, and the condition of the field effect transistor 48, the switching means, can be maintained in the favorable condition.

In this example, the battery voltage is designed to be detected during precharging, but instead, as shown in the third embodiment, the voltage across the source and the drain of the field effect transistor 48 may be designed to be detected.

Figure 26:
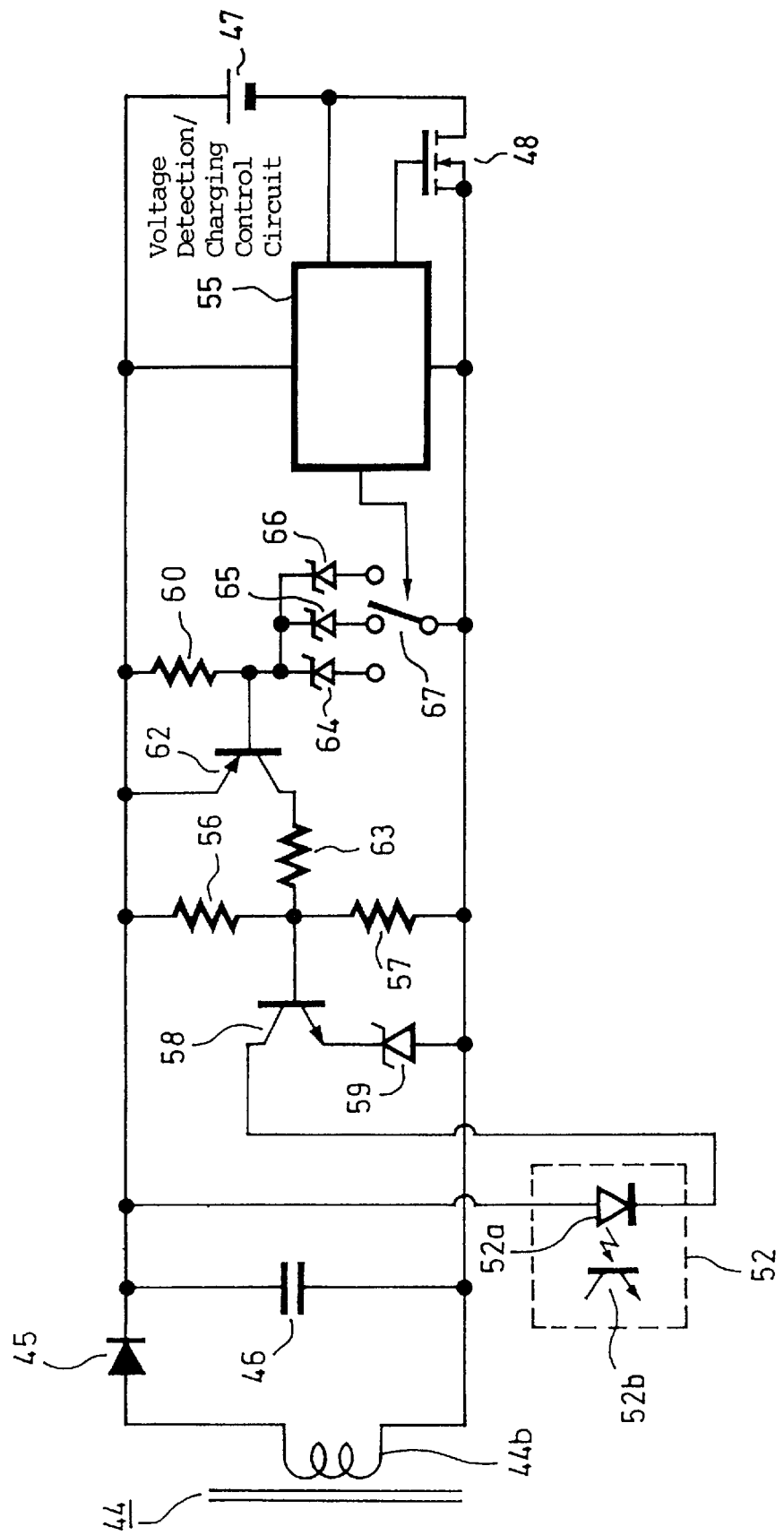
FIG. 26 is a structural diagram showing a charging equipment according to the seventh embodiment of this invention.
Figure 27:
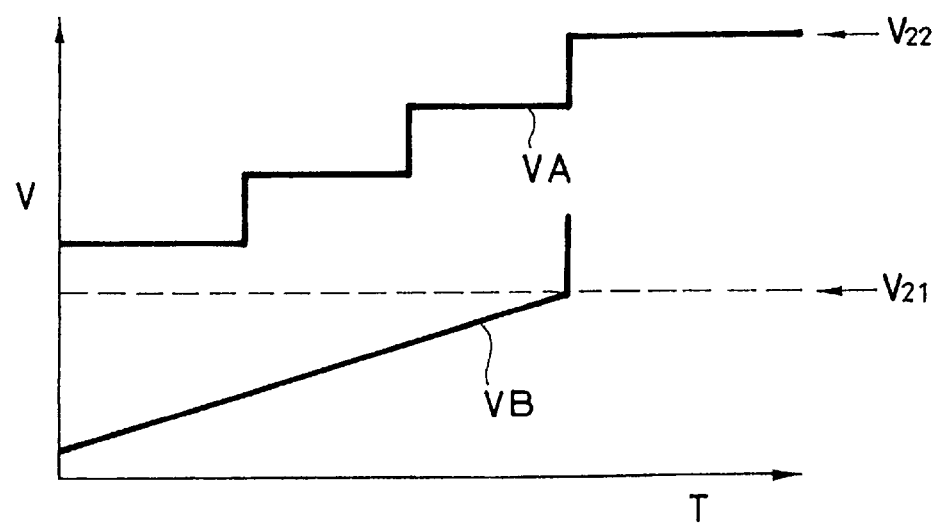
FIG. 27 is a characteristic diagram showing the charging condition according to the seventh embodiment.

Now referring to FIG. 26 and FIG. 27, the seventh embodiment of the present invention is described. In the case of this seventh embodiment, the secondary battery (lithium ion battery) is charged by the charging equipment of the circuit shown in FIG. 26. In FIG. 26 showing the configuration of the charging equipment of the seventh embodiment, parts corresponding to those previously described with reference to FIG. 18, FIG. 20, and FIG. 23 which show a configuration of the third, fourth, and sixth embodiments are denoted by the same reference numerals, and their detailed description is omitted.

Referring to FIG. 26, the charging equipment of this example is described. The circuit of FIG. 26 has the primary side of the switching transformer 44 omitted as in the case of the circuit of FIG. 23, and the power supply output as the switching power supply is obtained by the diode 45 and the capacitor 46 connected to the secondary side winding 44b. The cathode of the diode 45 which is the power output of one electrode is connected to the positive electrode side of the secondary battery (lithium ion battery) 47 mounted to this charging equipment, and at the same time, the negative electrode side of this secondary battery 47 is connected to the other end side (the side to which diode 45 is not connected) of the secondary winding 44b via the field effect transistor 48 which is the switching means for charging control.

And the voltage detection/charging control circuit 55 for detecting the voltage across the terminals of the secondary battery 47 and controlling charging in accord with the detected potential is provided, and based on the detected battery voltage, control is carried out on the gate of the field effect transistor 48, on determining which state should be selected for this transistor 48, from three conditions, conducting, nonconducting, and high-impedance, and on charging. To this point, the configuration is same as that of the charging equipment of the sixth embodiment shown in FIG. 23.

In this example, control is designed to be carried out in such a manner that the voltage of the switching power supply by the voltage detection/charging control circuit 55 is varied in a plurality of stages in proportion to the battery voltage at this time. To describe the configuration, using the series circuit of resistors 56, 57, one end and the other end from which the output of the switching power are obtained are connected, and the connection middle point of these resistors 56, 57 is connected to the base of the NPN type transistor 58. The cathode of the diode 45 is connected to the collector of the transistor 48 via the light emitting diode 52a of the photo coupler 52, and the other side of the secondary winding 44b is connected to the emitter of the transistor 58 via the zener diode 59.

To the cathode of diode 45, one end of the resistor 60 is connected, and the other terminal of this resistor 60 is connected to the base of the PNP type transistor 62. The cathode of the diode 45 is connected to the emitter of this transistor 62, and the collector of this transistor 62 is connected to the base of the transistor 58 via the resistor 63.

And zener diodes 64, 65, 66 with different voltage characteristics, respectively, are prepared, and the cathodes of these three zener diodes 64, 65, 66 are connected to the connection point between the resistor 56 and the base of the transistor 62. The anode of each of zener diodes 64, 65, 66 is connected to the other end side of the secondary wiring 44b via a change over switch 67, and depending on the change-over condition of the changeover switch 67, only the anode of either one of the zener diodes 64, 65, 66 is connected to the other end side of the secondary wiring 44b. The change-over of this changeover switch 67 is controlled by the voltage control signal voltage outputted from the voltage control terminal of the voltage detection/charging control circuit 55.

In this kind of circuit configuration, varying the voltage value of the voltage control signal outputted from the voltage control terminal in a plurality of stages in proportion to the battery voltage detected by the voltage detection/ charging control circuit 55 at the time of precharging varies in a plurality of stages the voltage control condition at the control circuit on the primary side of the switching power supply not illustrated, and the voltage of the power supply supplied to the secondary battery 47 is varied in a plurality of stages.

Now, processing at the time of precharging in this example is described referring to the voltage characteristic diagram of FIG. 27. First of all, the transistor 48 is brought into the high impedance state, the power supply voltage VA is brought to the minimum voltage (for example, the minimum voltage that can operate the voltage detection/charging control circuit 55), and precharging operation is started. That is, a zener diode whose voltage becomes the minimum by the changeover switch 67 (for example, zener diode 64) is connected. And the battery 47 is gradually charged by this precharging, and as shown in FIG. 27, the battery voltage VB gradually rises. At this point, when the battery voltage VB rises to a certain value, the changeover switch 67 is changed over by the control of the voltage detection/ charging control circuit 55, and the power supply voltage VA is increased by one step. And when the battery voltage VB is further increased to a certain value, the changeover switch 67 is changed over by the control of the voltage detection/ charge control circuit 55, and the power supply voltage VA is increased by one more step.

And when the battery voltage VB attains the predetermined standard voltage $V_{21}$ or higher, the transistor 48 is changed from the high-impedance state to the conducting state to increase the charging current, and rapid charging is started with the power supply VA used for the voltage $V_{22}$ for rapid charging.

Carrying out control at the time of precharging in this way can keep the power applied to the field effect transistor 48 constantly to nearly same level during precharging, and the condition of the field effect transistor 48, the switching means, can be maintained in the favorable condition. In this event, in the case of this seventh embodiment, control of the power supply voltage is carried out in a plurality of stages, and control is able to be effected with a simpler configuration than in the case of sixth embodiment in which the power supply voltage is controlled nearly continuously.

In the case of this seventh embodiment as well, the battery voltage is designed to be detected during precharging, but instead, as shown in the third embodiment, the voltage across the source and the drain of the field effect transistor 48 may be designed to be detected.

In this seventh embodiment, the power supply voltage during precharging is designed to be varied in three stages, but it may be varied in two stages or more than three stages.

Now referring to FIG. 28, the eighth embodiment of the present invention is described. In the case of this eighth embodiment, the secondary battery (lithium ion battery) 33 is charged by the charging equipment of a circuit shown in FIG. 28.

Referring to FIG. 28, the charging equipment of this example is described. FIG. 28 schematically shows the supply source of the power supply voltage in a block form, where two types of power supply are prepared: a first constant voltage source 71 for generating the voltage during precharging and a second constant voltage source 72 for generating the voltage during rapid charging. In this event, the output voltage of the first constant voltage source 71 should be the voltage lower than the minimum required voltage for operating a charging control circuit 75 later described. The outputs of these two constant voltage sources 71, 72 are selectively supplied to the positive electrode side of the secondary battery (lithium ion battery) 33 by the change over switch 73. In this event, the change-over of the change over switch 73 is controlled by the charging control circuit 75.

And across the negative side of the secondary battery 33 and the constant voltage sources 71, 72, a field effect transistor 48 as a switching means for controlling charging is connected. The field effect transistor 48 is controlled by the charging control circuit 75 composed of integrated circuits, and is controlled in the three states: conducting, nonconducting, and high-impedance. And the detection signal of the voltage detection circuit 77 for detecting the battery voltage of the secondary battery 33 is designed to be supplied to the charging control circuit 75.

For the power supply feeding path of the charging control circuit 75, the power supply selected by the switch 73 is designed to be supplied via a diode 74. And in parallel to the power supply feeding path of this charging control circuit 75, a capacitor 76 with comparatively large capacity is connected.

For control of charging by the charging control circuit 75, in carrying out precharging, the transistor 48 is brought to the high-impedance state, and then the switch 73 is changed over as required to change over the first constant voltage source 71 and the second constant voltage source 72 as required. The change-over frequency should be such that the condition in which a sufficient volume of charge is accumulated in the capacitor 76 is maintained.

At the time of rapid charging, the transistor 48 is brought to the conducting state, and the output of the second constant voltage source 72 is continuously supplied to the secondary battery 33. This precharging is changed over to and from rapid charging based on the detection of the battery voltage by the voltage detection circuit 77.

Controlling in this way is unable to secure a required voltage for operating the charging control circuit 75 under the condition in which the output of the first constant voltage source 71 supplied to the secondary battery 33 during precharging, but while the power supply is fed from the second constant voltage source 72 (the voltage of this power supply is the voltage big enough to operate the charging control circuit 75), the capacitor 76 is charged. Consequently, while the output of the first constant voltage source is being supplied, the voltage enough to operate the charging control circuit 75 is obtained by the charge charged to the capacitor 76, and proper precharging control is carried out by the charging control circuit 75.

Because the power supply voltage during precharging is able to be made lower than the voltage required for operating the circuit in the charging equipment, the voltage of the power supply fed to the secondary battery 33 during precharging can be made extremely low, and favorable precharging can be achieved by extremely low voltage. That is, because the power supply voltage fed to the secondary battery 33 can be made low during precharging, even when there is any trouble in the secondary battery 33 due to some factor (for example, when shorting occurs across terminals), damages on the charging circuit side attributed to it can be suppressed to the minimum.

In the case of this eighth embodiment, two constant voltage sources are provided for changing over between the two, but as described in other embodiments, it may be configured to vary the power supply voltage by the control of the primary side of the switching power supply or others. In the case of the sixth embodiment as well, the battery condition is designed to be detected by detection of the battery voltage, but it may be configured to detect the potential across one end and the other end of the switching means (field effect transistor 48).

Now referring to FIG. 29–FIG. 33, the ninth embodiment of the present invention is described.

Figure 29:
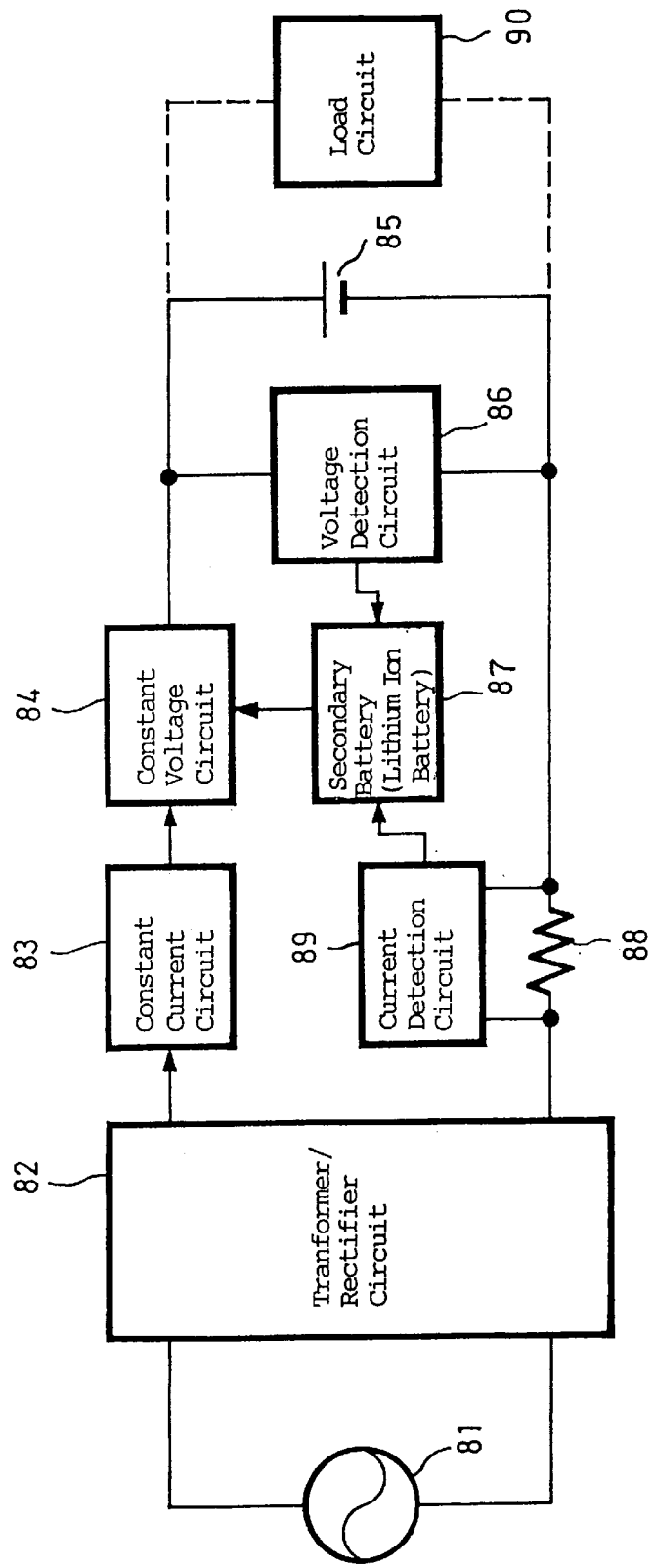
FIG. 29 is a structural diagram showing a charging equipment applied to the ninth embodiment of this invention.

FIG. 29 is a block diagram showing the configuration of the charging equipment applied to this embodiment, and using the charging equipment of the configuration shown in FIG. 29, charging is carried out.

First of all, the configuration of the charging equipment shown in FIG. 29 is described, where AC power supply is supplied from a commercial AC power supply 81 to a transformer/rectifier circuit 82 to provide DC low-voltage power supply. And this DC low-voltage power supply is supplied to a constant current circuit 83 to provide an output of a constant current. And this constant-current output is supplied to a constant voltage circuit 84 to obtain an output of a constant voltage. In this case, this constant voltage circuit 84 is designed to set 4.2V constant voltage output and 4.0V constant voltage output. For this output voltage, either 4.2V or 4.0V is designed to be selected by the control of a control circuit 87 later described.

On the positive electrode side of a secondary battery 85 mounted to this charging equipment, the output voltage of the constant voltage circuit 84 is supplied. In this event, in this example, a lithium ion battery is used for the secondary battery 85. The lithium ion battery used here must provide characteristics in which the battery voltage is 4.2V when the battery is 100% charged (fully charged). Then, the potential difference between the positive electrode side and the negative electrode side of this secondary battery 85 is detected with a voltage detection circuit 86. The data of voltage values detected in this voltage detection circuit 86 is supplied to a control circuit 87.

The negative electrode side of the secondary battery 85 is connected to the transformer/rectifier circuit 82 via a current detection resistor 88 to form a charging circuit of the secondary battery 85. Based on the potential difference between one end and the other end of the current detection resistor 88, the current flowing through the resistor 88 is detected by a current detection circuit 89. The current value detected by this current detection circuit 89 corresponds to the charging current supplied to the secondary battery 85. The data of current values detected by the current detection circuit 89 is supplied to the control circuit 87. This control circuit 87 is a circuit composed by a microcomputer with integrated circuits for controlling the charging operation, and based on the data of the battery voltage detected by the voltage detection circuit 86 and the data of current values detected by the current detection circuit 89, the supply from the constant voltage circuit 84 to the secondary battery 85 of the charging power supply is controlled. The control circuit 87 of this example has a timer circuit (not illustrated) built in so that the passage of a predetermined time is designed to be judged.

By the way, there is a case in which a load circuit 90 may be connected to the secondary battery 85.

Now, referring to the flow chart of FIG. 30, charging processing of the ninth embodiment in which the secondary battery (lithium ion battery) is charged using the charging equipment shown in FIG. 29 will be described.

The charging control of this example is carried out based on the control of the control circuit 87, and when the charging operation begins and the battery is charged to a certain extent, 4.2V is allowed to be outputted from the constant voltage circuit 84 to carry out constant voltage charging (Step S301). And during this charging, the control circuit 87 judges whether the battery is fully charged (or nearly fully charged) or not (Step S302). The full-charged condition is judged, for example, by judging whether the current lowers to the charging current corresponding to full charge or not based on the detection data of the current detection circuit 89. If it is judged that the battery is fully charged, the output of 4.2V from the constant voltage circuit 84 is stopped by the control of the control circuit 87 and charging is stopped (step S303). It is allowed to stop charging when a specified time (for example, 1 hour) passes from the time when the current or voltage corresponding to full charge is detected.

And after this charging is stopped, the battery voltage of the secondary battery 85 is detected by the voltage detection circuit 86 (Step S304). Here, it is judged whether the detected voltage value is the voltage of standard voltage $V_{12}$ or lower previously set to the control circuit 87 or not (Step S305). In this example, 4.0V is used for the standard voltage $V_{12}$ and for processing at Step S305, whether or not the voltage is 4.0 V or lower is judged by the control circuit 87. If it is not 4.0V or lower, detection of the battery voltage at Step S304 is repeatedly carried out.

For comparison processing of the voltage detected at Step S305, with 4.2V outputted from the constant voltage circuit 84 set as the voltage serving as a standard, the voltage difference between this 4.2V and the battery voltage detected by the voltage detection circuit 86 is judged in the control circuit 87. And whether or not the voltage difference exceeds 0.2V or not is judged to carry out processing to judge whether the battery voltage is 4.0V or lower.

Or for another comparison processing of the voltage at Step S305, based on the grounding potential (that is, 0V), 4.0V may be set to the control circuit 87 as the standard voltage. And the battery voltage detected by the voltage detection circuit 86 may be compared to this standard voltage (4.0V), and processing for judging whether the battery voltage attains the standard voltage or lower may be carried out.

And when it is judged that the battery voltage is 4.0V or lower at Step S305, the timer set in the control circuit 87 is operated (Step S306). And whether a predetermined time $n_1$ after this timer is operated has passed or not is judged (Step S307). For this time $n_1$, for example, 30 minutes are assigned.

When the control circuit 87 judges the passage of time $n_1$ (that is, judgment that time $n_1$ has passed since the battery voltage reached 4.0V or lower), processing returns to Step S301 and charging operation is started. For the charging operation at this time, based on the control of the control circuit 87, 4.2V is outputted from the constant voltage circuit 84 and constant-voltage charging is carried out using this 4.2V. And processing of Step S301 and after is repeatedly carried out.

Figure 30:
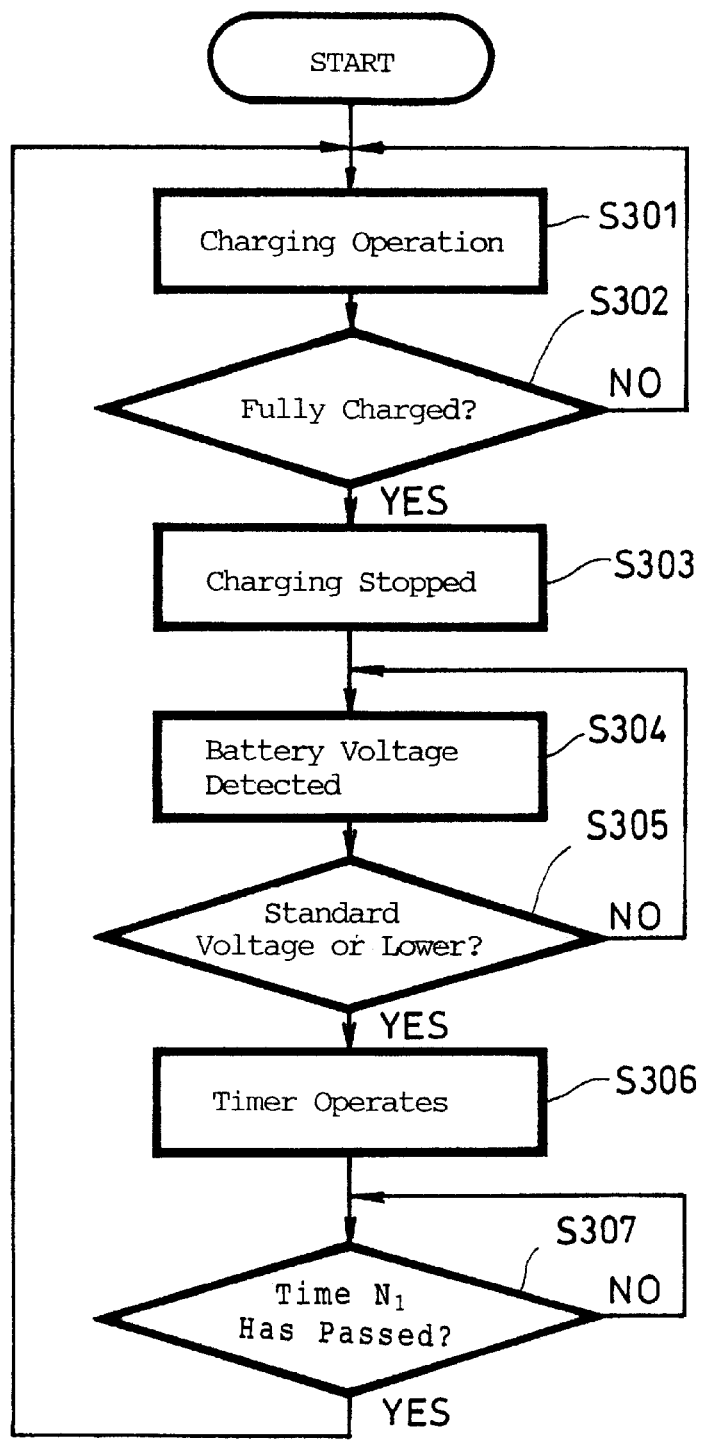
FIG. 30 is a flow chart showing charging processing according to the ninth embodiment.
Figure 31:
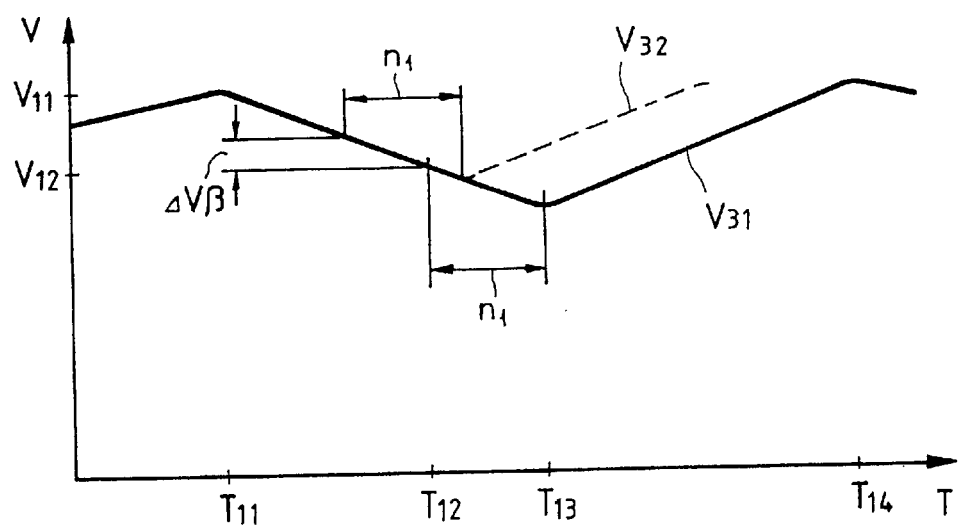
FIG. 31 is a characteristic diagram showing the charging condition according to the ninth embodiment.

Now referring to FIG. 31, the charging processing condition of this example shown in the flow chart of FIG. 30 is described. The voltage characteristics $V_{31}$ shown in FIG. 31 show changes of the battery voltage, carrying out charging causes the battery voltage $V_{31}$ approaches to a voltage $V_{11}$ at the full-charge, and the output of the constant voltage circuit 84 is stopped at the timing $T_{11}$ when the voltage $V_{11}$ (4.2V) is attained at the time of this full-charge, and charging to the secondary battery 85 is stopped. By the stopping of this charging, the battery voltage $V_{31}$ gradually lowers by self discharge of the battery (or discharge to the load circuit) from timing $T_{11}$.

Under this charging stopping condition, let detection of the battery voltage $V_{31}$ be carried out successively, and at timing $T_{12}$, let the battery voltage $V_{31}$ lowers from the standard voltage $V_2$ (4.0V). In this event, the timer circuit in the control circuit 87 operates at timing $T_{12}$, and at timing $T_{13}$ in which time $n_1$ (for example, 30 minutes) passes from the start of the operation, charging to the secondary battery 85 is restarted and continues to timing $T_{14}$ when the battery voltage $V_{31}$ attains $V_{11}$ again.

By charging in this way, the timing for restarting charging is favorably set and even if there is a detection error in the battery voltage, recharging is able to be carried out favorably, and deterioration of battery characteristics due to the continuation of the condition close to the full-charge condition can be prevented. That is, when the detection of the battery voltage $V_{31}$ is accurately carried out, the battery voltage becomes a voltage sufficiently lower than the standard voltage $V_{12}$ at the timing $T_{13}$ for restarting charging. And as shown in FIG. 31, suppose that there exists a detection error $\Delta VB$ of the battery voltage, and then, the timer circuit operates when the battery voltage is higher than the voltage $V_{12}$ by this error $\Delta V\beta$ and when time $n_1$ passes from the start of the operation, such characteristics that charging is restarted are obtained (voltage $V_{32}$ shown with a broken line). Consequently, even if there is a detection error of battery voltage, sufficient time is able to be secured from the restart of charging to the return to full-charge, and deterioration of the battery due to continuation of the full-charge condition of the secondary battery (lithium ion battery) can be prevented.

In this event, for judgment of battery voltage detected in this example, 4.2V outputted from the constant voltage circuit 84 (this 4.2V is the battery voltage when fully charged) is designated as a standard voltage, and the voltage difference between this 4.2V and the battery voltage detected by the voltage detection circuit 86 is judged in the control circuit 87 to judge the lowering of battery voltage to 4.0V or lower, and accurate judgment of the battery voltage with less error is enabled, and charging of the secondary battery is able to be controlled more satisfactorily.

When 4.0V is designed to be judged with the voltage based on the grounding potential (that is, 0V) without designating the battery voltage at the time of full-charge to the standard in this way, it is possible for the control circuit 87 to judge the battery voltage by directly judging the detection data of the voltage detection circuit 86 and judgment of the battery voltage can be carried out with a simple configuration, but in this case, as described above, it is possible to secure sufficient time from the restart of charging to the return to the full charge, and deterioration of the battery caused by the continuation of the full-charged condition of the secondary battery can be effectively prevented.

Figure 32:
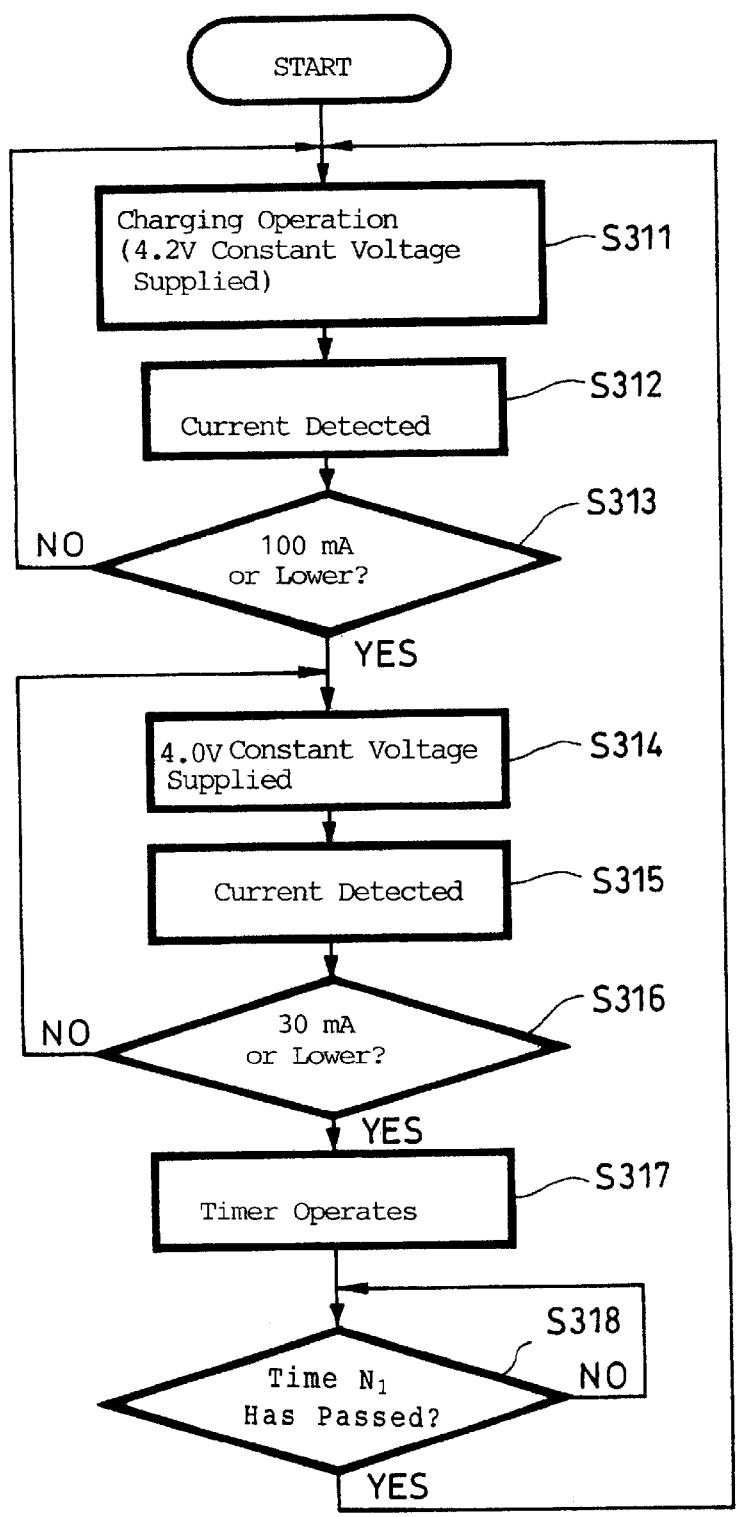
FIG. 32 is a flow chart showing charging processing when full-charge detection is carried out by another processing in the ninth embodiment.

In the processing of the ninth embodiment, it is designed to carry out judgment at the restart of charging by the detection of the battery voltage, but it may be designed to carry out the judgment at the restart of charging by detection of the charging current. The flow chart of FIG. 32 shows charging processing in this event, which will be now described in detail.

First of all, charging operation is carried out based on the control of the control circuit 87 (Step S311). In this event, with the secondary battery 85 charged to a certain extent, 4.2V is outputted from the constant voltage circuit 84 and constant voltage charging is carried out. And during this charging, the control circuit 87 allows the current detection circuit 89 to detect the charging current (Step S312), and judges whether the detected charging current is 100 mA or lower or not (Step S313). In this event, if the charging current exceeds 100 mA, the control circuit 87 judges that the secondary battery 85 is not yet fully charged, and allows charging at Step S311 to continue. If it judges that the charging current is 100 mA or lower, the control circuit judges that the secondary battery 85 is in the full-charge state (or nearly full-charged state), and the control circuit 87 changes over the output voltage of the constant-voltage circuit 84 to 4.0V (Step S314).

With this 4.0V constant voltage applied to the secondary battery 85, the then charging current is detected with the current detection circuit 89 (Step S315). And the control circuit 87 judges whether or not the detected charging current is 30A or higher (Step S316). If the detected charging current is not 30 mA or higher, supply of 4.0V constant voltage at step 314 is carried out continuously while detection of the charging current at Step S315 is repeatedly carried out.

If the charging current is judged to be 30 mA or higher, the timer circuit in the control circuit 87 is operated (Step S317). It is judged whether a predetermined time $n_1$ has passed since this timer is operated (Step 318). For this time $n_1$, for example, 30 minutes may be adopted.

When the control circuit 87 judges the passage of time $n_1$ (that is, judgment that time $n_1$ has passed since the charging current attains 30 mA or higher), processing returns to Step S311 and charging operation is begun. To describe the charging operation at this time, based on the control of the control circuit 87, output of the constant voltage circuit 84 is changed over to 4.2V, and constant voltage charging is carried out with this 4.2V. And processing after Step S311 is repeatedly carried out.

It may be designed to stop charging when a specified time (for example, 1 hour) passes after the charging current corresponding to the full charge is detected at Step S313.

Figure 33:
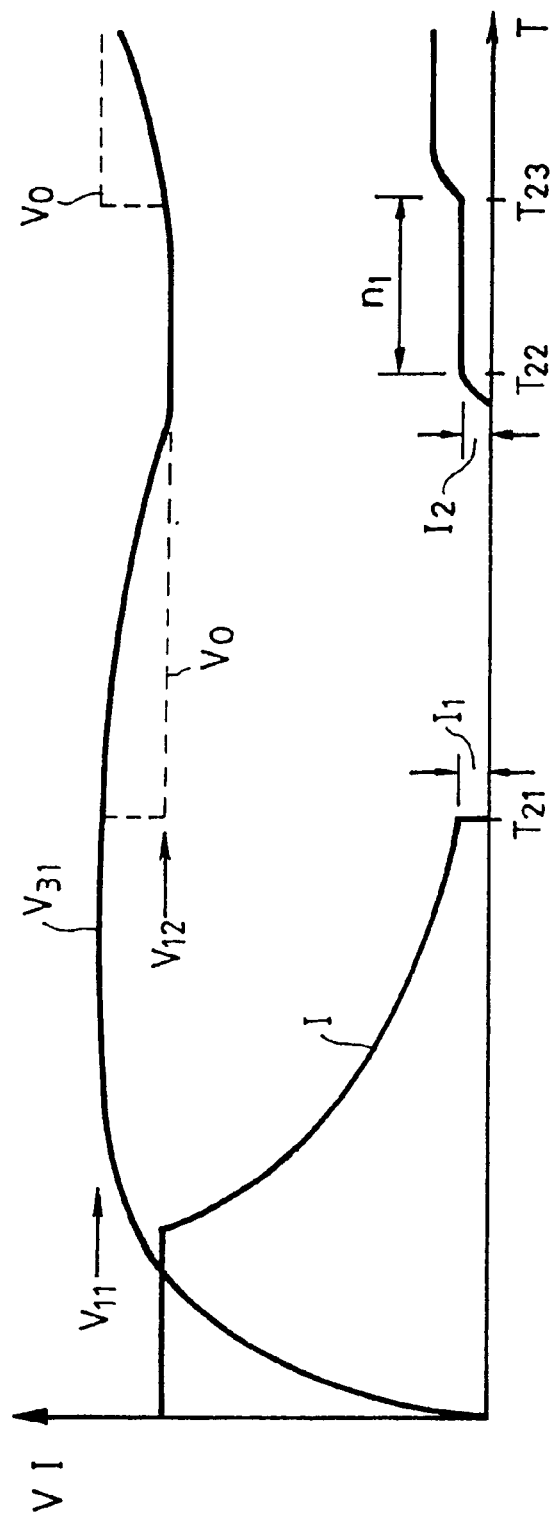
FIG. 33 is a characteristic diagram showing the charging condition according to the example of FIG. 32.

Now, referring to FIG. 33, the charging processing condition in this example shown in the flow chart of FIG. 32 is described. FIG. 33 shows changes of the battery voltage $V_{31}$ and the charging current I, and the execution of charging causes the battery voltage $V_{31}$ to approach to the voltage $V_{11}$ at the time of full-charge, but as the voltage approaches to the full-charge, the charging current I gradually decreases. At timing $T_{21}$ when the charging current I attains 100 mA ($I_1$), charging voltage $V_0$ from the constant voltage circuit 84 is changed over to 4.0V ($V_{12}$). If the battery voltage is 4.0V or over with this 4.0V charging voltage supplied, the charging current scarcely flows. When the battery voltage $V_{31}$ lowers to 4.0V, the charging current that is detectable is generated, and when the charging current becomes 30 mA ($I_2$) or higher (timing $T_{22}$), the timer circuit in the control circuit 87 operates. At timing $T_{23}$ when time $n_1$ (for example, 30 minutes) passes from the start of the operation of the timer circuit, output voltage of the constant voltage circuit 84 is returned to 4.2V, and charging to the secondary battery 85 by this 4.2V charging voltage is restarted, and the battery is charged until the charging current becomes 100 mA or lower.

By charging in this way, similar to the case of detecting the voltage in the ninth embodiment described above (at the time of processing by the flow chart of FIG. 30), timing for restarting charging is favorably set, and deterioration of characteristics of the secondary battery (lithium ion battery)

caused by the continuation of the condition close to the full-charged condition can be prevented.

Now, the 10th embodiment of this invention is described. In this 10th embodiment, charging is carried out by the charging equipment of the configuration shown in FIG. 29 described in the ninth embodiment described above, and the charging is controlled by the control circuit 87 in accordance with the flow chart of FIG. 34. The processing is described hereinafter. First of all, charging operation is carried out based on the control of the control circuit 87 (Step S321). In this event, with the secondary battery 85 charged to a certain extent, 4.2V is outputted from the constant voltage circuit 84 and constant voltage charging is carried out. And during this charging, the control circuit 87 allows the current detection circuit 89 to detect the charging current (Step S322), and judges whether the detected charging current is 100 mA or lower or not (Step S323). In this event, if the charging current exceeds 100 mA, the control circuit 87 judges that the secondary battery 85 is not yet fully charged, and allows charging at Step S321 to continue. If it judges that the charging current is 100 mA or lower, the control circuit judges that the secondary battery 85 is in the full-charge state (or nearly full-charged state), and the control circuit 87 controls to stop the output voltage of the constant voltage circuit 84 and stops charging (Step S324). It may be designed to stop charging when a specified time (for example, 1 hour) passes after the charging current corresponding to the full charge is detected.

At the same time as the charging is stopped, the timer circuit in the control circuit 87 is operated (Step S325). It is judged whether a predetermined time $n_2$ (for example, 30 minutes) has passed since this timer is operated or not (Step S326). When this time $n_2$ passes, the control circuit 87 controls to output the 4.2V charging voltage from the constant voltage circuit 84 and restarts charging operation temporarily (Step S327). And the charging current at this time is allowed to be detected by the current detection circuit 89 (Step S328). And with the control circuit 87, it is judged whether the charging current detected in this event is 200 mA or higher or not (Step S329). If the charging current is not 200 mA or higher, processing returns to stop S324 to stop the output voltage of the constant voltage circuit 84, and charging is stopped. Then, the timer circuit is started at Step S325 and every time the time $n_2$ passes from the start, charging operation and detection of the then charging current are repeated by carried out.

When the charging current is judged to be 200 mA or higher at Step S329, processing returns to Step S321, and charging to achieve the full-charged state is restarted.

Figure 34:
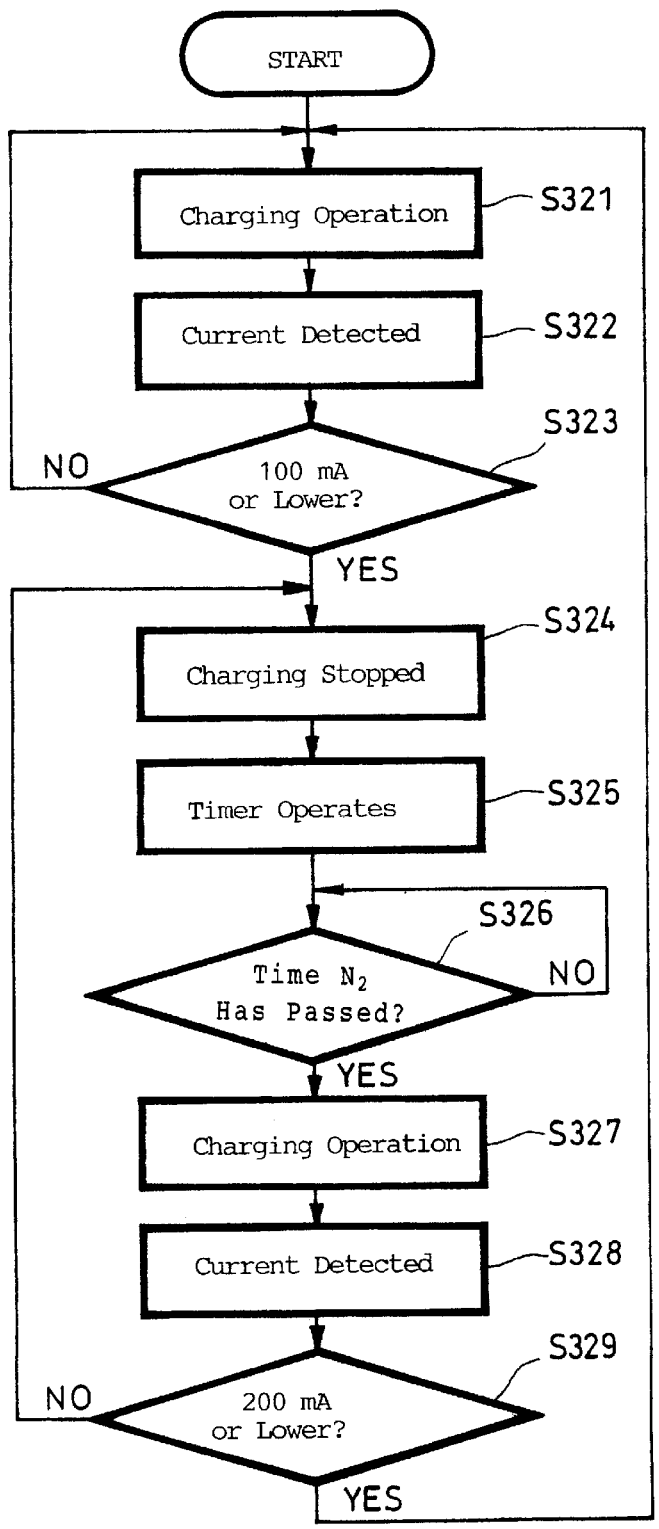
FIG. 34 is a flow chart showing charging processing according to the tenth embodiment of this invention.
Figure 35:
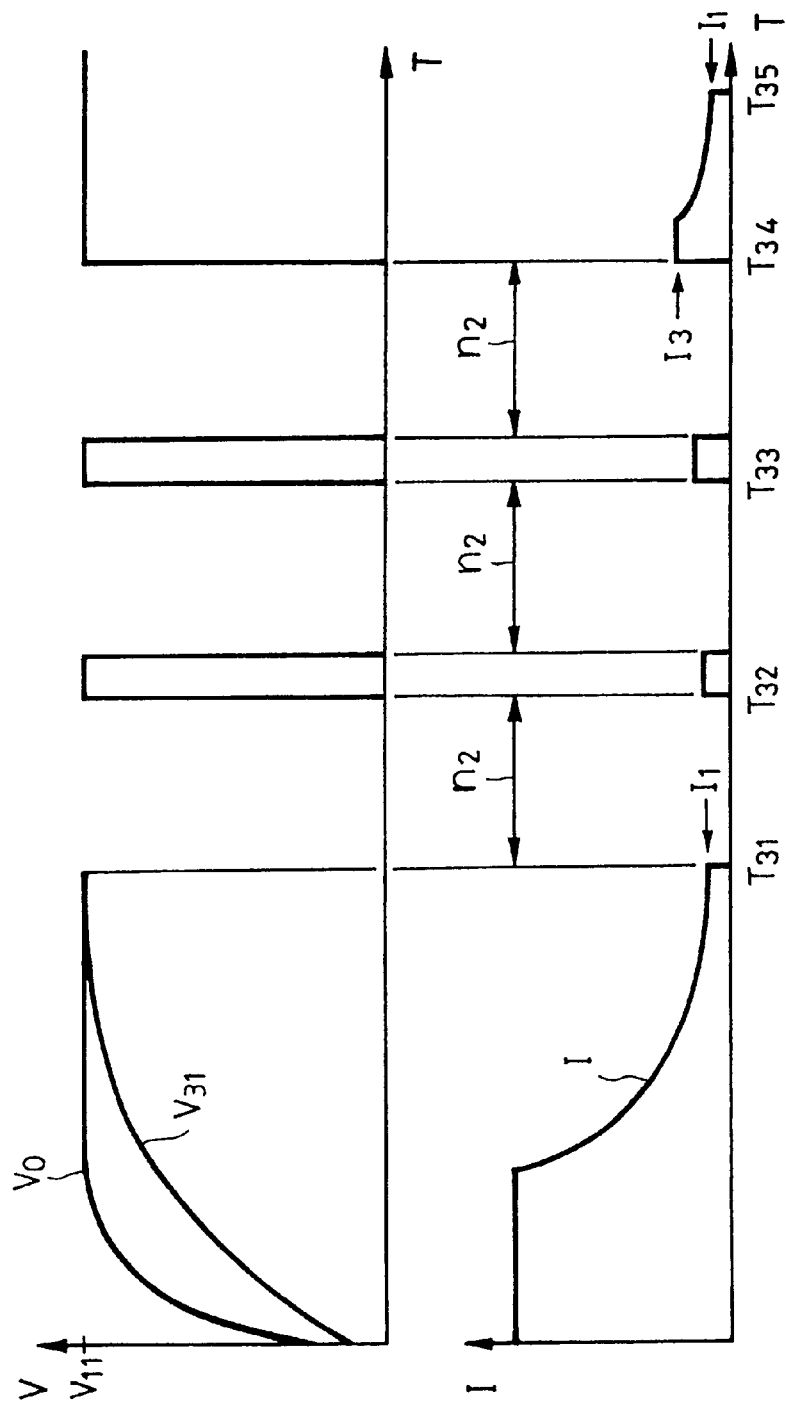
FIG. 35 is a characteristic diagram showing the charging condition according to the tenth embodiment.

Now, referring to FIG. 35, the charging processing condition in this example shown in the flow chart of FIG. 34 is described. FIG. 35 shows changes of the battery voltage $V_{31}$ and the charging voltage $V_0$, and the charging current I, and the execution of charging causes the battery voltage $V_{31}$ to approach to the voltage $V_{11}$ at the time of full-charge, but as the voltage approaches to the full-charge, the charging current I gradually decreases. At timing $T_{31}$ when the charging current I attains 100 mA ($I_1$), the supply of 4.2V charging voltage $V_0$ from the constant voltage circuit 84 is stopped.

At the same time as this charging stops, the timer circuit in the control circuit 87 operates and at timing $T_{32}$ when time $n_2$ (for example, 30 minutes) passes from the start of the operation of the timer circuit, 4.2V output voltage from the constant voltage circuit 84 is temporarily restarted. And the charging current I in this event is detected. And whether the charging current I is 200 mA ($I_3$) or higher or not is judged, but if it is 200 mA or lower, the supply of the charging voltage $V_0$ is stopped, and waits until the next time $n_2$ by the timer circuit passes (timing $T_{33}$).

And while repeating detection of temporary charging current every time this time $n_2$ passes, the secondary battery 85 is no longer in the full-charged state due to self-discharge, etc., and when a specified charging remainder is attained, charging current of 200 mA ($I_3$) or higher is detected at 4.2V charging voltage (Timing $T_{34}$), and charging of the secondary battery 85 is carried out at 4.2V constant voltage. And at Timing $T_{35}$ when the charging current I becomes 100 mA ($I_1$) by this charging, the battery is judged to be in the full-charged state, and the supply of 4.2V charging voltage $V_0$ from the constant voltage circuit 84 is stopped.

By charging in this way, after charging is stopped once the battery becomes the full-charged state (or nearly full-charge), unless at least a specified time $n_2$ (for example, 30 minutes) passes, charging is not restarted, and moreover, charging is not restarted if the battery charging remainder is detected to be a nearly full-charge state by the detection of charging current every specified time $n_2$, and therefore, charging is not restarted unless the battery charging remainder decreases to a certain level, thereby preventing deterioration of the characteristics of the secondary battery (lithium ion battery) caused by the continuation of the nearly full-charge state.

Figure 36:
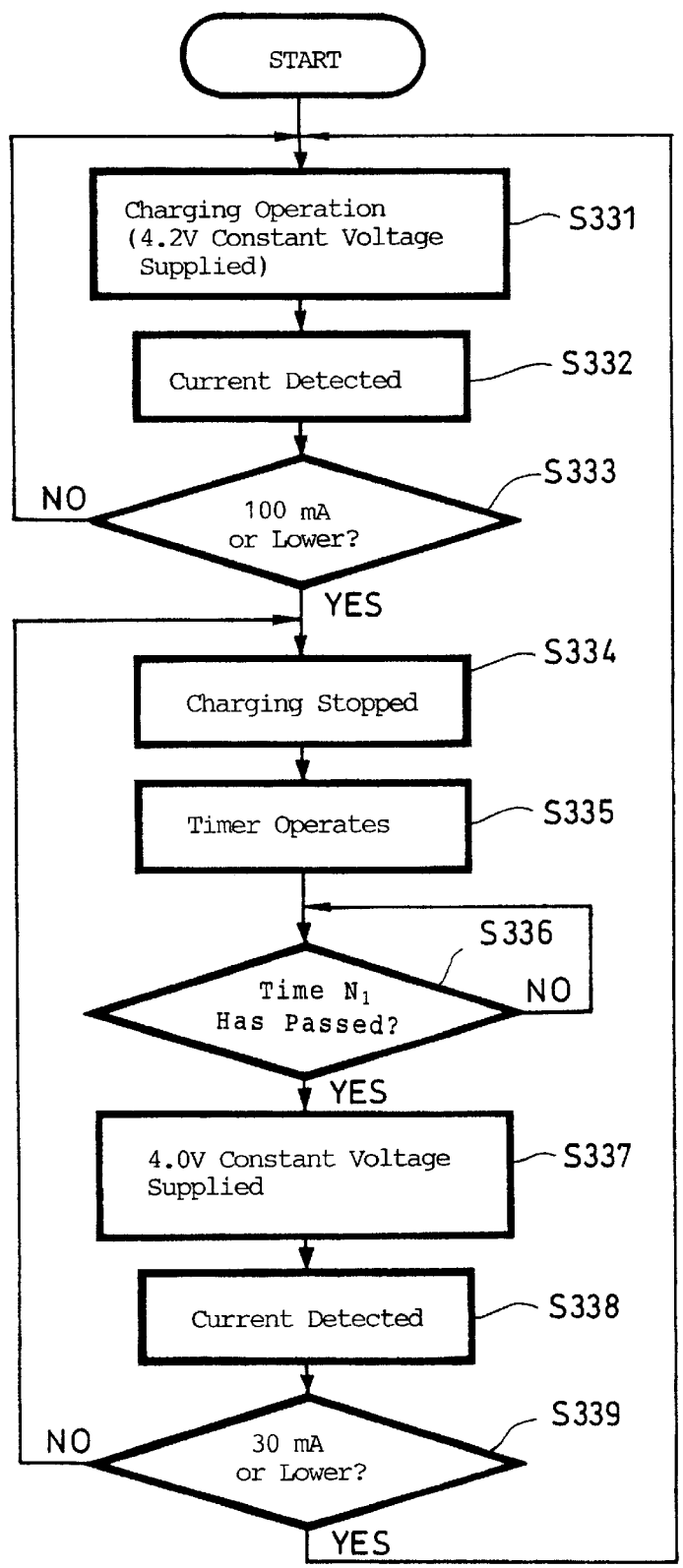
FIG. 36 is a flow chart showing charging processing when full-charge detection is carried out by another processing in the tenth embodiment.

In the processing shown in the flow chart of FIG. 34, it is designed to supply only 4.2V, the battery voltage at the time of full-charge of the secondary battery 85, as the output of the constant voltage circuit 84, but it may be allowed to use still lower charging voltage when temporary charging current is detected. The flow chart of FIG. 36 shows the processing when the charging voltage is varied in the case of the tenth embodiment.

The processing is described hereinafter. First of all, charging operation is carried out based on the control of the control circuit 87 (Step S331). In this event, with the secondary battery 85 charged to a certain extent, 4.2V is outputted from the constant voltage circuit 84 and constant voltage charging is carried out. And during this charging, the control circuit 87 allows the current detection circuit 89 to detect the charging current (Step S332), and judges whether the detected charging current is 100 mA or lower or not (Step S333). In this event, if the charging current exceeds 100 mA, the control circuit 87 judges that the secondary battery 85 is not yet fully charged, and allows charging at Step S331 to continue. If it judges that the charging current is 100 mA or lower, the control circuit judges that the secondary battery 85 is in the full-charge state (or nearly full-charged state), and the control circuit 87 controls to stop the output voltage of the constant voltage circuit 84 and stops charging (Step S334). It may be designed to stop charging when a specified time (for example, 1 hour) passes after the charging current corresponding to the full charge is detected.

At the same time as the charging is stopped, the timer circuit in the control circuit 87 is operated (Step S335). It is judged whether a predetermined time $n_2$ (for example, 30 minutes) has passed since this timer is operated or not (Step S336). When this time $n_2$ passes, the control circuit 87 controls to output the 4.0V charging voltage from the constant voltage circuit 84 and restarts charging operation temporarily (Step S337) by this 4.0V charging voltage. And the charging current at this time is allowed to be detected by the current detection circuit 89 (Step S338). And with the control circuit 87, it is judged whether the charging current detected in this event is 30 mA or higher or not (Step S339). If the charging current is not 30 mA or higher, processing returns to Step S334 to stop the output voltage of the constant voltage circuit 84, and charging by the supply of the 4.0V charging voltage is stopped. Then, the timer circuit is started at Step S335 and every time the time $n_2$ passes from the start, charging operation and detection of the then charging current are repeated.

When the charging current is judged to be 30 mA or higher at Step S339, processing returns to Step S331, 4.2V is outputted from the constant voltage circuit 84 to carry out constant voltage charging, and charging to achieve the full-charged state is restarted.

In this way, when the battery state is detected, by bringing the charging voltage to 4.0V lower than 4.2V, the battery voltage at the time of full-charge of the secondary battery 85, it is possible to detect the battery state by applying low voltage, and the battery state (charging remainder) is accurately detected with the burden to the secondary battery reduced, and deterioration of the battery can also be prevented from this point.

Now, referring to the flow chart of FIG. 37, the case in which charging processing based on the 10th embodiment is carried out by detection of the battery voltage will be described. First of all, when the charging operation begins and the battery is charged to a certain extent, 4.2V is allowed to be outputted from the constant voltage circuit 84 to carry out constant voltage charging (Step S341). And during this charging, the control circuit 87 judges whether the battery is fully charged (or nearly fully charged) or not (Step S342). The full-charged condition is judged, for example, by judging whether the current lowers to the charging current corresponding to full charge or not based on the detection data of the current detection circuit 89. If it is judged that the battery is fully charged, the output of 4.2V from the constant voltage circuit 84 is stopped by the control of the control circuit 87 and charging is stopped (Step S343). It may be allowed to stop charging when a specified time (for example, 1 hour) passes from the time when the current or voltage corresponding to full charge is detected.

At the same time as the charging is stopped, the timer circuit in the control circuit 87 is operated (Step S344). It is judged whether a predetermined time $n_2$ (for example, 30 minutes) has passed since this timer is operated or not (Step S345). When this time $n_2$ passes, the control circuit 87 controls to detect the battery voltage of the secondary battery 85 by the voltage detection circuit 86 (Step S346). And it is judged whether the battery voltage in this event is 4.0V or lower or not (Step S347).

If the control circuit 87 judges that the battery voltage is not 4.0V or lower, it judges that the battery is still in the nearly full-charge state, and only the energy required for detection of the battery voltage at the time is charged (Step S348). That is, 4.2V charging voltage is supplied from the constant voltage 84 circuit to the secondary battery 85 only for the time previously set in the control circuit 87 (this time is comparatively short time in proportion to the power supply consumed at the voltage detection circuit 86 at Step S346), and the battery is charged only in accordance with how much the energy is discharged by the detection of the battery state. Or, the battery may be charged slightly more than that. At the same time as charging at Step S348 stops, processing returns to Step S344 to operate the timer circuit and the battery voltage is repeatedly detected every time the time $n_2$ passes.

When 4.0V or lower is detected by the detection of the battery voltage at Step S357, it is judged that the secondary battery 85 has a charging remainder of a chargeable level, and processing returns to Step S341 to output 4.2V from the constant voltage circuit 84, and constant voltage charging is restarted.

Because charging processing is carried out in this way, similar to the processing shown in the flow chart of FIG. 34, it is possible to extend the time before charging is restarted longer than at least the specified time $n_2$ (for example, 30 minutes), the secondary battery charging condition is able to be properly maintained, and deterioration of the characteristics of the secondary battery can be effectively prevented.

Figure 37:
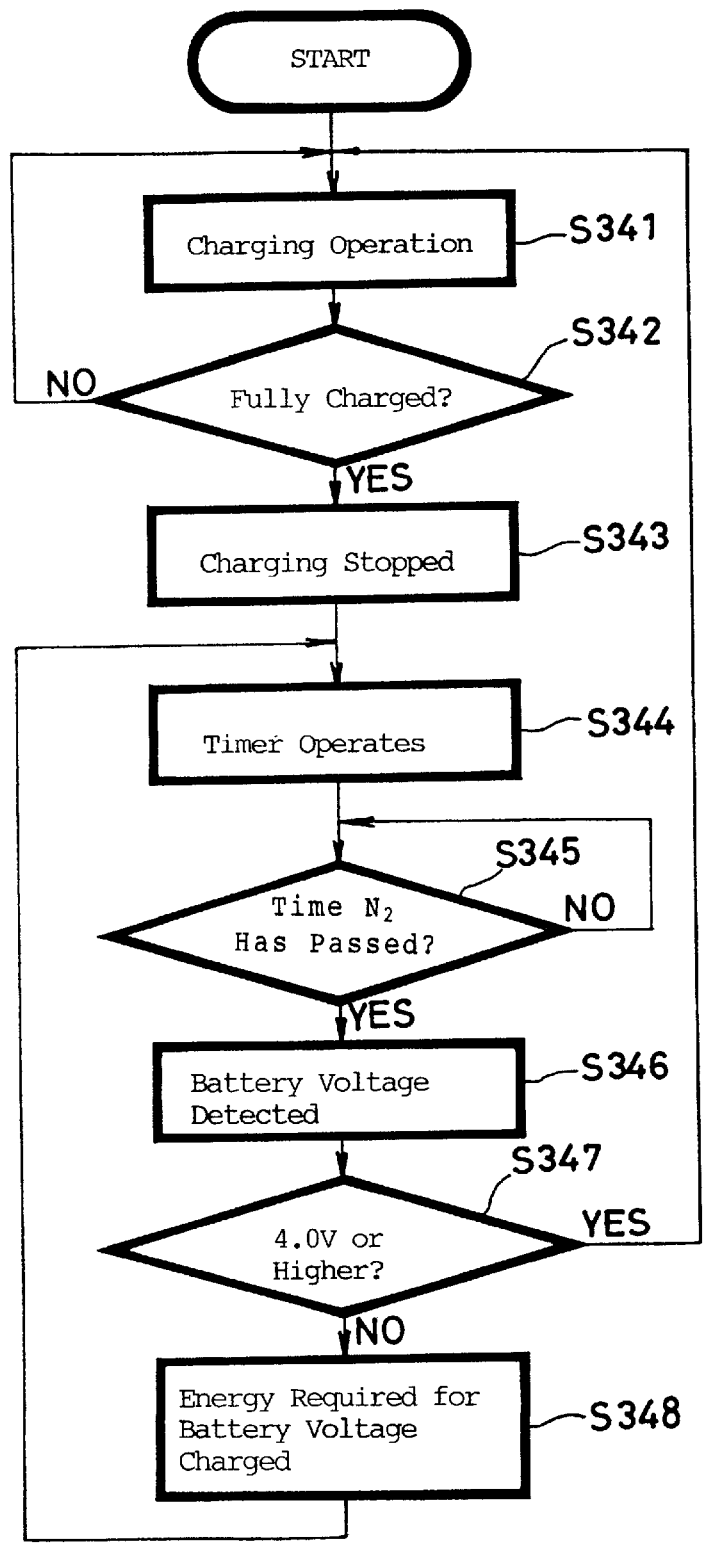
FIG. 37 is a flow chart showing charging processing when full-charge detection is carried out by still another processing in the tenth embodiment.

In the processing shown in flow chart of FIG. 37, for detection processing of the battery voltage at Step S346, with 4.2V outputted from the constant voltage circuit 84 set as the voltage serving as a standard, the voltage difference between this 4.2V and the battery voltage detected by the voltage detection circuit 86 is judged in the control circuit 87. And whether the voltage difference exceeds 0.2V or not is judged to carry out processing to judge whether or not the battery voltage is 4.0V or lower.

Or, for another comparison processing of the voltage, based on the grounding potential (that is, 0V) as a standard, 4.0V may be set to the control circuit 87 as the standard voltage. And the battery voltage detected by the voltage detection circuit 86 may be compared to this standard voltage (4.0V), and processing for judging whether or not the battery voltage attains the standard voltage or lower may be carried out.

Figure 38:
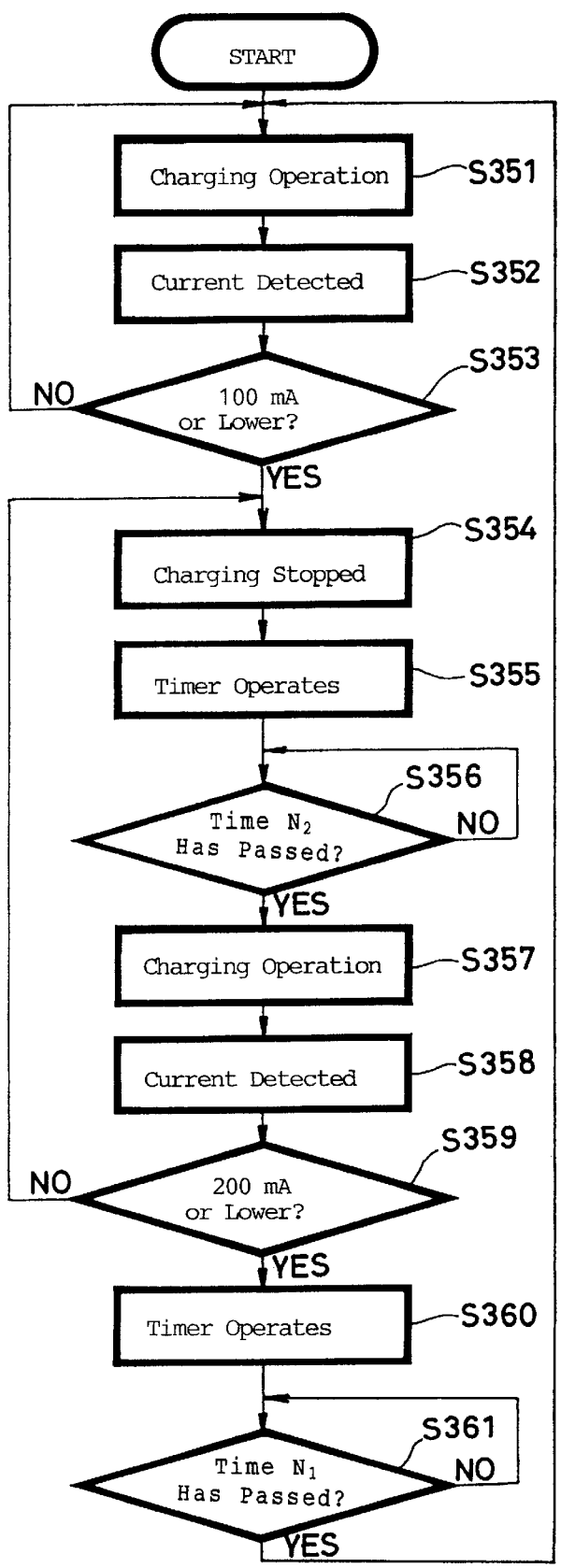
FIG. 38 is a characteristic diagram showing the charging condition according to the 11th embodiment of this invention.

Now the 11th embodiment of this invention will be described. In the case of the 11th embodiment as well, charging is carried out by the charging equipment of the configuration shown in FIG. 29 described in the 9th embodiment, and charging is controlled by the control circuit 87 in accordance with the flow chart of FIG. 38. In the case of the 11th embodiment, the control to start recharging after waiting for the specified time $n_1$ described in the 9th embodiment is combined with the control to detect the battery condition every specified time $n_2$ after stopping charging described in the 10th embodiment.

The processing is described hereinafter. First of all, charging operation is carried out based on the control of the control circuit 87 (Step S351). In this event, with the secondary battery 85 charged to a certain extent, 4.2V is outputted from the constant voltage circuit 84 to carry out constant voltage charging. And during this charging, the control circuit 87 allows the current detection circuit 89 to detect the charging current (Step S352), and judges whether the detected charging current is 100 mA or lower or not (Step S353). In this event, if the charging current exceeds 100 mA, the control circuit 87 judges that the secondary battery 85 is not yet fully charged, and allows charging at Step S351 to continue. If it judges that the charging current is 100 mA or lower, the control circuit judges that the secondary battery 85 is in the full-charge state (or nearly full-charged state), and the control circuit 87 controls to stop the output voltage of the constant voltage circuit 84 and stops charging (Step S354). It may be designed to stop charging when a specified time (for example, 1 hour) passes after the charging current corresponding to the full charge is detected.

At the same time as the charging is stopped, the timer circuit in the control circuit 87 is operated (Step S355). It is judged whether a predetermined time $n_2$ (for example, 30 minutes) has passed since this timer is operated or not (Step S356). When this time $n_2$ passes, the control circuit 87 controls to output the 4.2V charging voltage from the constant voltage circuit 84 and restarts charging operation temporarily (Step S357). And then charging current is allowed to be detected by the current detection circuit 89 (Step S358). And with the control circuit 87, it is judged whether the charging current detected in this event is 200 mA or higher or not (Step S359). If the charging current is not 200 mA or higher, processing returns to Step S354 to stop the output voltage of the constant voltage circuit 84, and charging is stopped. Then, the timer circuit at Step S355 is started and every time the time $n_2$ passes from the start, charging operation and detection of the then charging current are repeated by carried out.

When the charging current is judged to be 200 mA or higher at Step S359, the timer circuit in the control circuit 87 is operated again (Step S360). And judgment is made on whether the predetermined time $n_1$ has passed or not after the timer is operated at this Step S360. For this time $n_1$, for example, 30 minutes are designated.

When the control circuit 87 judges the passage of time $n_1$ (that is, judgment that time $n_1$ has passed since the charging current attains 200 mA or higher), processing returns to Step S351 to start charging operation. For the charging operation in this event, based on the control of the control circuit 87, the output of the constant voltage circuit 84 is changed over to 4.2V to carry out constant voltage charging by this 4.2V. And processing after Step S351 on is repeatedly carried out.

Because charging processing is carried out in this way, the detection processing of this secondary battery state after charging to the secondary battery is stopped is carried out every time the time $n_2$ passes by the timer circuit, and control for properly maintain the secondary battery charging state is favorably carried out, and at the same time, because when it is judged by the detection every time $n_2$ that the battery charging remainder is in the chargeable condition, recharging is designed to be started after waiting time $n_1$ passes by means of the timer circuit, the period before the secondary battery returns to the full-charged state is able to be constantly satisfactorily maintained irrespective of then detection accuracy, and from this point, as well, control for properly maintaining the secondary battery charging condition is carried out.

In this 11th embodiment, the charging voltage at the time of temporary charging after charging stops is designed to be 4.2V, same as that at the time of regular charging, but the charging voltage at the time of temporary charging may be designated to low voltages, such a 4.0V or the like. By doing so, it is possible to reduce burdens applied to the secondary battery when the battery condition is detected.

In place of detecting the secondary battery condition by the current value, it may be allowed to detect the secondary battery condition with the battery voltage. In the case of detecting this battery voltage, when the battery voltage is detected under the charging stopping state, the energy discharged from the secondary battery for the detection may be charged.

Now, referring to FIG. 39 to FIG. 41, the 12th embodiment of this invention will be described.

Figure 39:
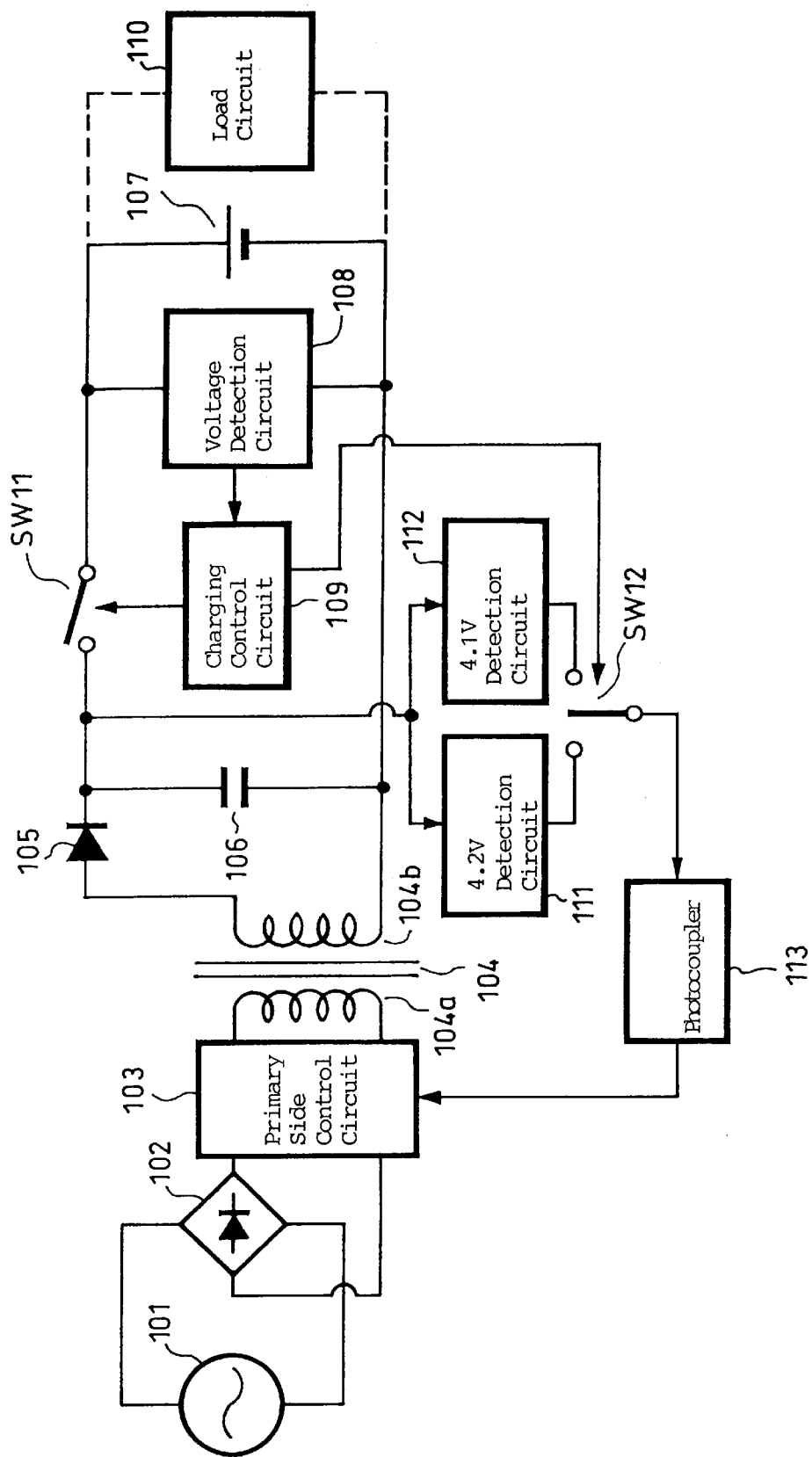
FIG. 39 is a structural diagram showing a charging equipment according to the 12th embodiment of this invention.

FIG. 39 is a block diagram showing the configuration of the charging equipment of this example, where AC power supply is supplied from a commercial AC power supply 101 to a rectifier circuit 102 comprising a diode bridge to provide DC power supply. And this DC power supply is supplied to a primary side control circuit 103, and at the primary side control circuit 103. A specified processing is carried out in the primary side control circuit 103 and then supplied to a primary side winding 104*a* of a switching transformer 104. And at a secondary side wiring 104*b* of the switching transformer 104, DC low-voltage power supply converted to a specified low voltage is obtained. To the primary-side control circuit 103, a control signal is supplied from a voltage detection circuit 111 or 112 on the secondary side later described via a photocoupler 113, and the output voltage is controlled in accord with this control signal. This primary side control circuit is configured with integrated circuits.

One end of the secondary winding 104*b* of this switching transformer 104 is connected to the anode of a switching diode 105, and the cathode of this diode 105 and the other end of the secondary winding 104*b* are connected by a switching capacitor 106 to provide a DC low-voltage power supply of a specified voltage.

The anode of the diode 105 from which the low-voltage DC power supply is obtained is connected to one end of a connecting switch SW11 and the other end of the connecting switch SW11 in connected to one end (positive electrode) of a secondary battery 107 (here, lithium ion battery is used for the secondary battery) loaded on this charging equipment. The connecting switch SW11 is controlled to turn on and off by a later-described charging control circuit 109, and comprised of a switch such as a relay or the like in addition to a semiconductor switch such as a field effect transistor (FET) or the like. However, when the semiconductor switch is used, it is preferable to use the field effect transistor with less loss at the time of conduction.

And the other end (negative electrode) of the secondary battery 107 is connected to the other end of the secondary winding 104*b* of the switching transformer 104. Across the other end (negative electrode) of this secondary battery 107 and the other end of the secondary winding 104*b* of the switching transformer 104, a charging control means such as the field-effect transistor, etc. may be connected.

Across one end and the other end of the secondary battery 107, a voltage detection circuit 108 is connected for detecting the battery voltage, and the detection output of this voltage detection circuit 108 is supplied to the charging control circuit 109. At the charging control circuit 109, based on the detection condition of the battery voltage, ON/OFF control is carried out on the connecting switch SW11. The charging control circuit 109 comprises integrated circuits, whose control condition will be later discussed based on the flow chart of FIG. 40.

On the cathode side of the diode 105, two voltage detection circuits are connected. That is, the 4.2V detection circuit 111 and the 4.1V detection circuit 112 are connected, and at each of the detection circuits 111, 112, voltage detection with 4.2V or 4.1V set as a standard is carried out, and the detection error information (that is, information on the difference between voltage values used for the standard) is obtained, and of the detection error informations of both detection circuits 111, 112, the information selected by a change-over switch SW12 is supplied to the primary side control circuit 103 as a switching control signal via the photocoupler 113. Consequently, if the changeover switch SW12 is set to the 4.2V detection circuit 111 side, the power supply of the 4.2V voltage is controlled to be obtained on the cathode side of the diode 105, and when the changeover switch SW12 is set to the 4.1V detection circuit 112 side, the power supply of 4.1V voltage is controlled to be obtained on the cathode side of the diode 105. The change-over of the changeover switch SW12 is controlled by the charging control circuit 109.

The charging equipment of this example is configured as described above, but there is a case in which some load circuit 110 may be connected to the secondary battery 107.

Figure 40:
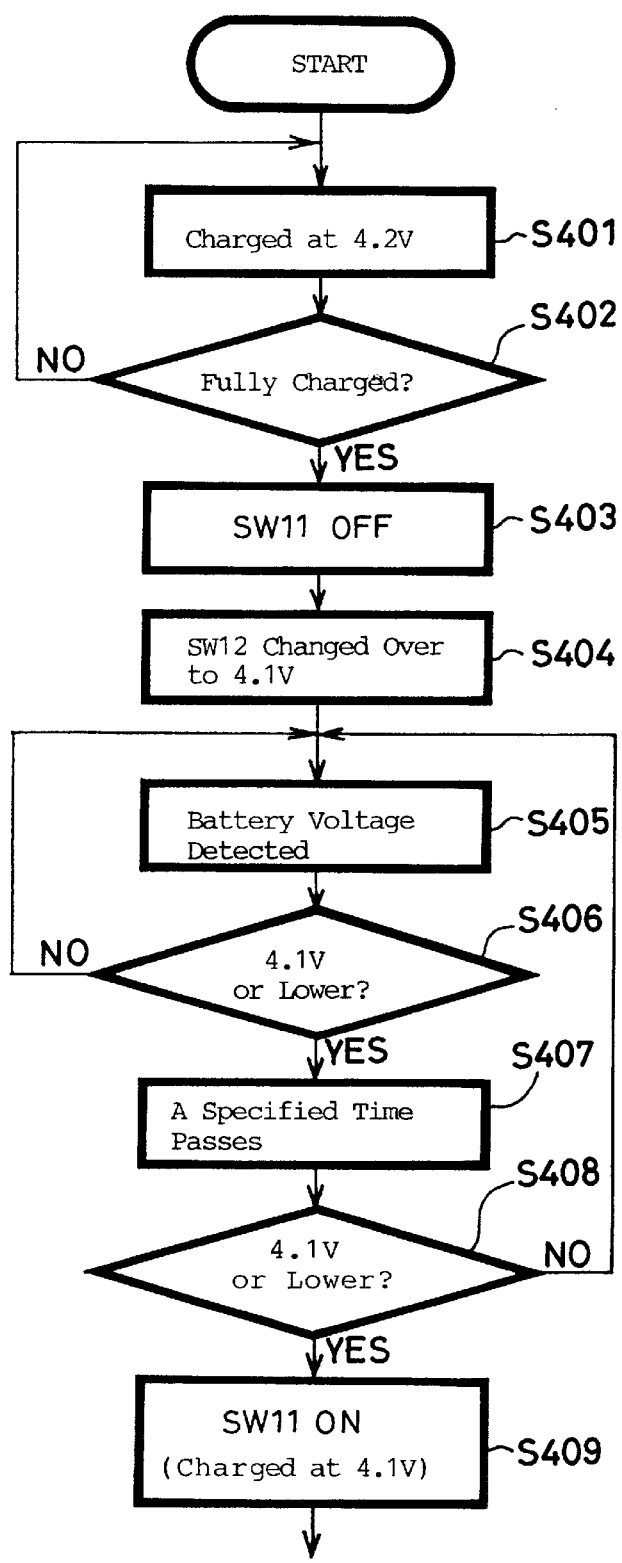
FIG. 40 is a flow chart showing charging processing by the 12th embodiment.

Now, referring to the flow chart of FIG. 40, operation when the secondary battery 107 is charged with the charging equipment of the configuration of FIG. 39 is described. In the case of this example, a lithium ion battery with the 4.2V battery voltage at the time of full-charge is used for the secondary battery 107.

If the charging remainder of the secondary battery 107, the lithium ion battery, is lower than a specified level, the charging control circuit 109 controls to turn on the connecting switch SW11 with the connecting switch SW12 set to the 4.2V detection circuit 111 side, and supply 4.2V to the secondary battery 107 for charging (Step S401). It is determined whether or not the battery is charged to the full-charge (or a specified capacity close to the full-charge) by detection of the battery voltage or the like (Step S402), and if it is determined that the battery is fully charged, then the control circuit turns off the connecting switch SW11 to stop charging (Step 403). And the control circuit allows the connecting switch SW12 to change over to the 4.1V detection circuit 112 side (Step S404).

Under this condition, the charging control circuit 109 judges a battery voltage detected by the battery voltage detection circuit 108 (Step S405). It is determined whether or not the battery voltage is lower than 4.1V (Step S406). If it is determined that the battery voltage is not lower than 4.1V, then the decision processing of the battery voltage in step S405 is continued. If it is determined that the battery voltage is lower than 4.1V, then, after waiting for a predetermined time (for example, several minutes to several tens of minute) to pass (Step S407), it is again determined whether the battery voltage is lower than 4.1V (Step S408). If it is determined that the battery voltage is not lower than 4.1V, then the processing returns to the decision processing for the battery voltage in step S405. If it is determined in the battery-voltage judgement processing in Step S408 again that the battery voltage is lower than 4.1V, then the connection switch SW11 is turned on (Step S409). Since the connecting switch SW12 is set to the 4.1V detection circuit 112 side at this time, the secondary battery is charged until the battery voltage becomes 4.1V. Thereafter, a so-called trickle charging is carried out in which detection as to whether or not the battery voltage is lower than 4.1V and the restart of charging operation after a predetermined time since the detection are repeatedly carried out.

Because after the secondary battery is once charged to full-charge (or nearly full-charged condition) by charging as shown in the flow chart of FIG. 40, the switch SW11 between the charging circuit side and the secondary battery is turned off, and only when the battery voltage is detected under this condition and the conditions up to Step S408 are satisfied, the switch SW11 is turned on and charging is resumed, under the condition where charging is stopped, the charging circuit and the secondary battery are held separated, preventing wasteful discharge from the battery because the voltage set on the charging circuit side (4.1V) is lower than the battery voltage (4.2V). In addition, because for a condition to resume charging at 4.1V, charging is designed to be resumed only when passage of a specified time is waited at Step S407 after the battery voltage 4.1V or lower is detected, and the battery voltage 4.1V or lower is detected in such event, it is the condition in which the battery voltage is accurately lower than 4.1V (because self-discharge or discharge to the load circuit takes place after 4.1V or lower is first detected), and the trickle charge at 4.1V is accurately carried out.

As described in the flow chart of FIG. 40, in stead of waiting the passage of a specified time at Step S407 after detecting the battery voltage of 4.1V or lower, it may be designed to detect a specified voltage lower than 4.1V (for example, 4.0V). That is, for example, as shown in the flow chart of FIG. 41, by carrying out battery voltage detection processing at Step S405 (same as processing of FIG. 40 up to Step S405), whether the battery voltage is 4.0V or lower or not is judged (Step S411). If it is judged to be 4.0V or lower at this step, the connection switch SW11 is brought to the ON state (Step S412), and the secondary battery 107 is charged at 4.1V. And thereafter, detection of battery voltage of 4.0V or lower and resumption of charging at 4.1V are repeatedly carried out, achieving so-called trickle charging.

Figure 41:
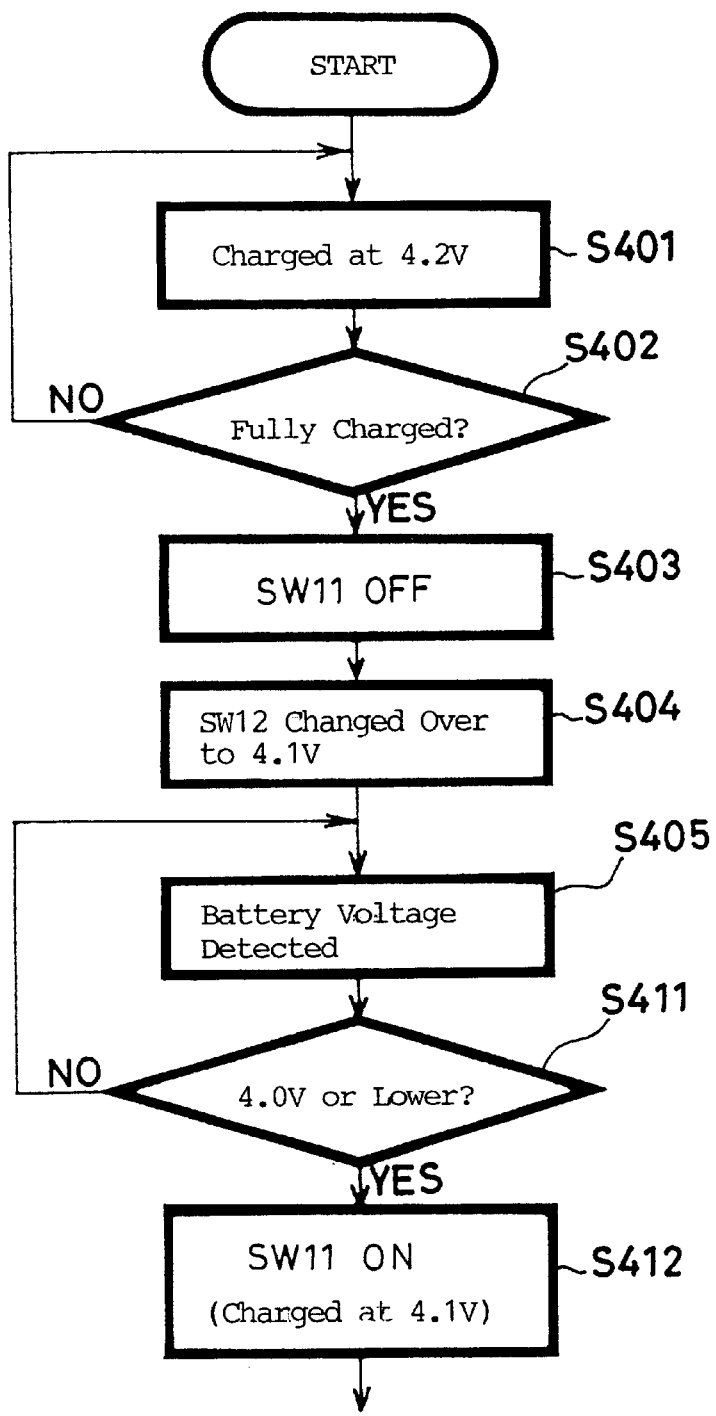
FIG. 41 is a flow chart showing charging condition by the modified example of the 12th embodiment.

Carrying out charging by the processing shown in FIG. 41 eliminates a need for counting the passage of a required time at the charging control circuit, and simplifies the configuration for charging control as much.

Figure 42:
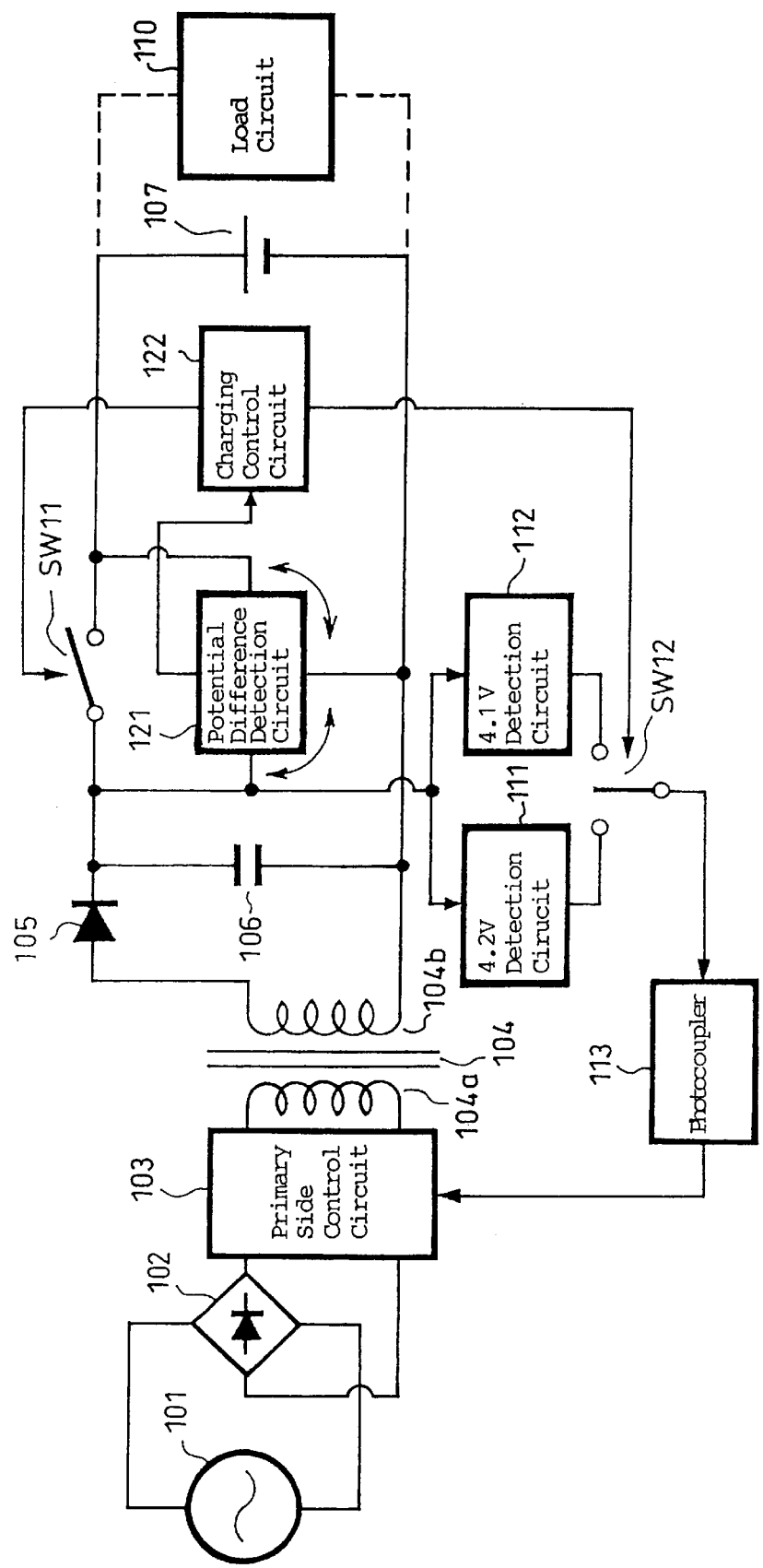
FIG. 42 is a structural diagram showing a charging equipment according to the 13th embodiment of this invention.
Figure 43:
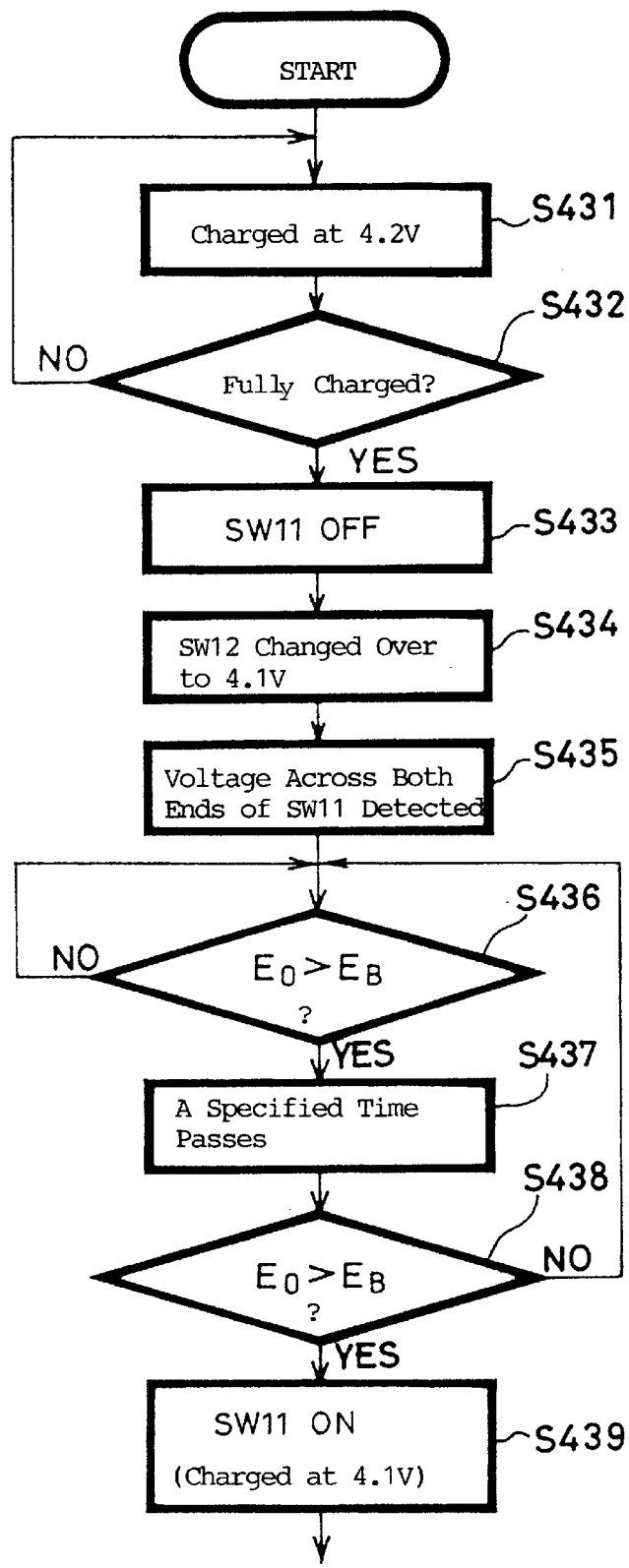
FIG. 43 is a flow chart showing charging processing by the 13th embodiment.

Next referring to FIG. 42 and FIG. 43, the 13th embodiment of the present invention is described. In FIG. 42 showing the configuration of the charging equipment according to this 13th embodiment, parts corresponding to those in FIG. 39 which shows a configuration of the 12th embodiment are denoted by the same reference numerals, and their detailed description is omitted.

In this example as well, the charging equipment is designed to charge the secondary battery 107, a lithium ion battery, and in this case, in place of providing a circuit for detecting the battery voltage, a potential difference detection circuit 121 for detecting the potential difference between one end and the other of the connecting switch SW11 is provided, and based on the detection data of this detection circuit 121, a charging control circuit 122 is designed to carry out ON/OFF control of the switch SW11.

That is, the potential difference detection circuit 121 detects not only the potential $E_O$ across one end of the connecting switch SW11 (side connected to the diode 105) and the negative electrode side of the secondary battery 107 (that is, the other end of the secondary winding 104b of the switching transformer) but also the potential $E_B$ across the other end of the connecting switch SW11 (the side connected to the secondary battery 107) and the negative electrode side of the secondary battery 107. And the relationship of the magnitude between the detected potential $E_O$ and the potential $E_B$ is judged and the judgment results are supplied to the charging control circuit 122. In the charging control circuit 122, based on the results, switches SW11 and SW12 are controlled to control the charging. This charging control circuit 122 comprises integrated circuits, and the control condition thereof will be later described based on the flow chart of FIG. 43. Other parts are configured in the same manner as in the case of the charging equipment shown in FIG. 39.

Now referring to the flow chart of FIG. 43, operation when the secondary battery 107 is charged with the charging equipment of the configuration of FIG. 42 is described. In the case of this example, a lithium ion battery with the 4.2V battery voltage at the time of full-charge is used for the secondary battery 107.

If the charging remainder of the secondary battery 107, the lithium ion battery, is lower than a specified volume, the charging control circuit 122 controls to turn on the connecting switch SW11 with the connecting switch SW12 set to the 4.2V detection circuit 111 side, and supply 4.2V to the secondary battery 107 for charging (Step S431). It judges whether or not the battery is charged to the full-charge (or a specified capacity close to the full-charge) by detection of the battery voltage, etc., and if it judges that the battery is fully charged, the control circuit turns off the connecting switch SW11 to stop charging (Step 433). And the control circuit allows the connecting switch SW12 to change over to the 4.1V detection circuit 112 side (Step S434).

Under this condition, the potential $E_0$ and the potential $E_B$ are detected by the potential difference detection circuit 121 (Step S435), and it is judged whether or not the power supply voltage $E_0$ is higher than the battery voltage $E_B$ (Step S436). In this event, if the power supply voltage $E_0$ is judged to be higher, after waiting for a predetermined time (for example, a few minutes to scores of minutes) to pass (Step S437), it is again judged whether or not the power supply voltage $E_0$ is higher than the battery voltage $E_B$ (Step S438). If the battery voltage $E_B$ is higher than the power supply voltage $E_0$, processing returns to the potential difference judgment at Step S436. And if in the repeated potential difference judgment at Step S438. The power supply voltage $E_0$ is judged to be higher, the connection switch SW11 is turned on (Step S439). In this event, because the connecting switch SW12 is set to the 4.1V detection circuit 112 side, the secondary battery 107 is charged with 4.1V.

Because after the secondary battery is once charged to full-charge (or nearly full-charged condition) by charging as shown in the flow chart of FIG. 43, similar to the case of the 12th embodiment described above, the switch SW11 between the charging circuit side and the secondary battery is turned off, and only when the battery voltage is detected under this condition and the conditions up to Step S438 are satisfied, the switch SW11 is turned on and charging is resumed, under the condition where charging is stopped, the charging circuit and the secondary battery are held separated, preventing wasteful discharge from the battery because the voltage set on the charging circuit side (4.1V) is lower than the battery voltage (4.2V). In addition, because charging is designed to be resumed only when passage of a specified time is waited at Step S437 after the battery voltage is detected to be lower than the power supply voltage (that is, 4.1V or lower), and the battery voltage is detected to be lower than the power supply voltage in such event, charging is definitely resumed under the condition in which the battery voltage is lower than the power supply voltage.

In the 13th embodiment, the battery voltage is judged by the comparison with the power supply voltage, it is possible to correctly judge the battery voltage, and judgment for resuming charging can be accurately carried out.

Figure 44:
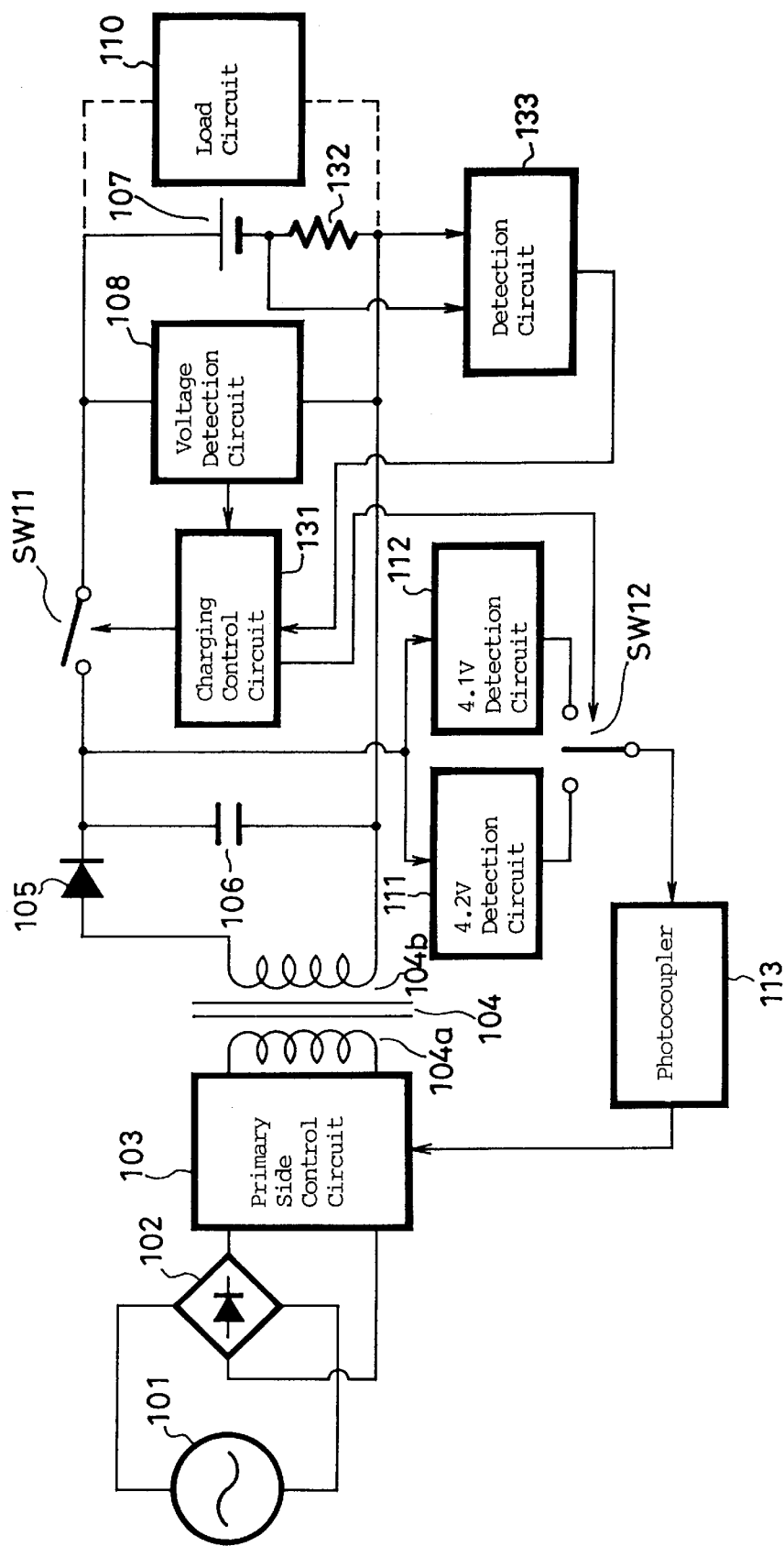
FIG. 44 is a structural diagram showing a charging equipment according to the 14th embodiment of this invention.
Figure 45:
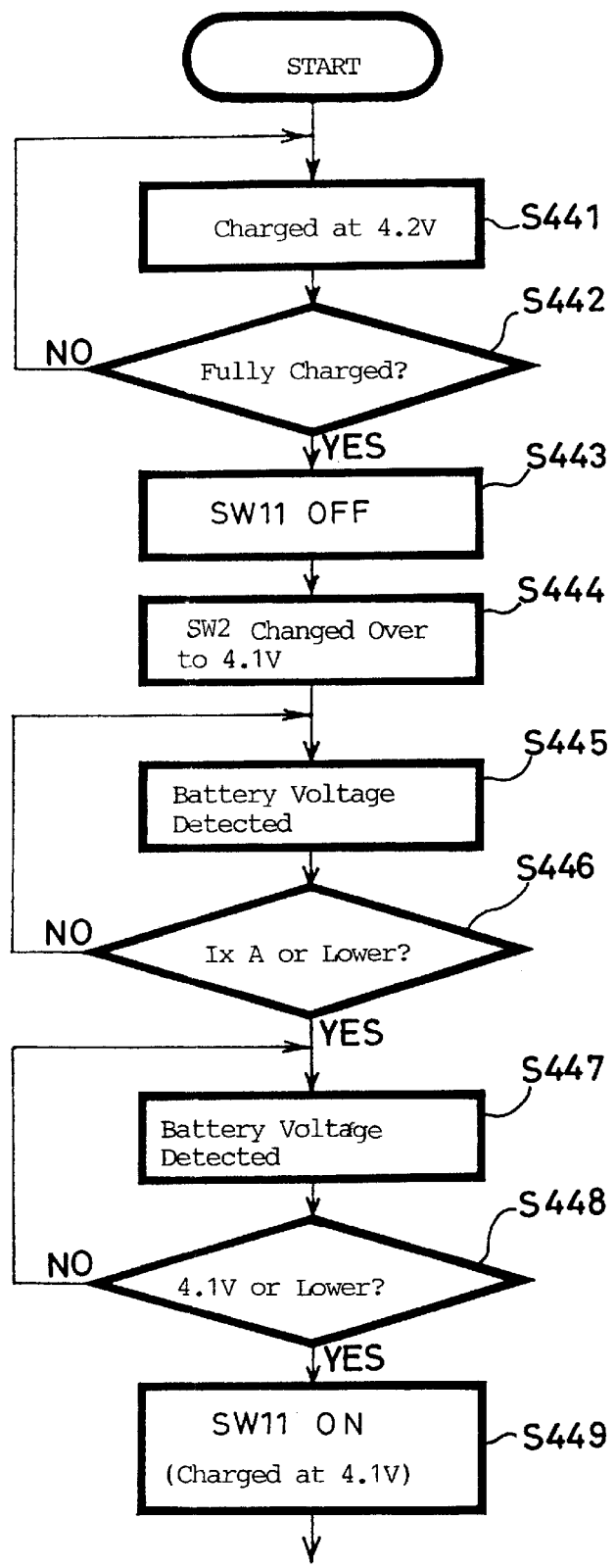
FIG. 45 is a flow chart showing charging processing by the 14th embodiment.

Now referring to FIG. 44 and FIG. 45, the 14th embodiment of the present invention is described. In FIG. 44 showing the configuration of the charging equipment according to this 14th embodiment, parts corresponding to those in FIG. 39 which shows the configuration of the 12th embodiment are denoted by the same reference numerals, and their detailed description is omitted.

In this example as well, the charging equipment is designed to charge the secondary battery 107, a lithium ion battery, and in this case, in addition to a battery voltage detecting circuit 108, a resistor 132 for detecting the current flowing through the secondary battery 107 is connected to the secondary battery 107 in series, and the potential across both ends of this resistor 132 is detected with a detection circuit 133, and the current flowing through the secondary battery 107 is designed to detect with a detection circuit 133. And the data of the current value detected by this detection circuit 133 are supplied to a charging control circuit 131. The data on battery voltage detected by the battery voltage detection circuit 108 is supplied to the charging control circuit 131.

In the charging control circuit 131, based on each detection data supplied, the connecting switch SW11 is controlled to turned on and off, and at the same time, the change-over of the connecting switch SW12 is also controlled. This charging control circuit comprises integrated circuits, and the control condition thereof will be later described based on the flow chart of FIG. 45. Other parts are configured in the same manner as in the case of the charging equipment shown in FIG. 39.

Now, referring to the flow chart of FIG. 45, operation when the secondary battery 107 is charged with the charging equipment of the configuration of FIG. 44 is described. In the case of this example, a lithium ion battery with the 4.2V battery voltage at the time of full-charge is used for the secondary battery 107.

If the charging remainder of the secondary battery 107, the lithium ion battery, is lower than a specified amount, the charging control circuit 131 controls to turn on the connecting switch SW11 with the connecting switch SW12 set to the 4.2V detection circuit 111 side, and supply 4.2V to the secondary battery 107 for charging (Step S441). It judges whether or not the battery is charged to the full-charge (or a specified capacity close to the full-charge) by detection of the battery voltage, etc. (Step S442), and if it judges that the battery is fully charged, the control circuit turns off the connecting switch SW11 to stop charging (Step S443). And the control circuit allows the connecting switch SW12 to change over to the 4.1V detection circuit 112 side (Step S444).

Under this condition, the current flowing the secondary battery 107 detected by the current detection circuit 133 is judged by the charge control circuit 131 (Step S445). In this event, it is judged whether or not the current value is a predetermined threshold value Ix A or lower (Step S446). This threshold value Ix A is set in advance based on the battery characteristics. In this event, if it is lower than Ix A, it is judged that there is discharge to the load circuit 110, and current detection at Step S445 is repeatedly carried out. And if the current detected at Step S446 is judged to be lower than Ix A, battery voltage is judged based on the detection data of the battery voltage detection circuit 108 (Step S447). And in this event, the battery voltage is judged to be 4.1V or lower (Step S448) or not, and it is judged to be 4.1V or lower, the connecting switch SW11 is turned on (Step S449), and charging at 4.1V is resumed. For judgment of this battery voltage, as in the case of the processing described in the 12th embodiment (processing at Step S407, S408 in the flow chart of FIG. 40), charging may be resumed after a specified time passes if 4.1V or lower is again detected.

Because after the secondary battery is once charged to full-charge (or nearly full-charged condition) by charging as shown in the flow chart of FIG. 45 similar to the case of the first embodiment described above, the switch Sw11 between the charging circuit side and the secondary battery is turned off, and only when the battery voltage is detected under this condition and the conditions up to Step S448 are satisfied, the switch SW11 is turned on and charging is resumed, under the condition where charging is stopped, the charging circuit and the secondary battery are held separated, preventing wasteful discharge from the battery because the voltage set on the charging circuit side (4.1V) is lower than the battery voltage (4.2V).

And in the 14th embodiment, because the battery voltage is judged and trickle charge at 4.1V is designed to be carried out after confirming that there is no discharge exceeding a specified volume from the battery 107 to the load circuit 110 side, if there is any discharge exceeding a specified volume from the battery 107 to the load circuit 110 side, trickle charge treatment in this example is not carried out, and trickle charge is properly carried out only when it is required. When the charging remainder of the battery is considerably reduced due to the discharge to the load circuit 110, regular charging at 4.2V (that is, charging treatment conventionally known) is carried out by another control system not illustrated.

Figure 46:
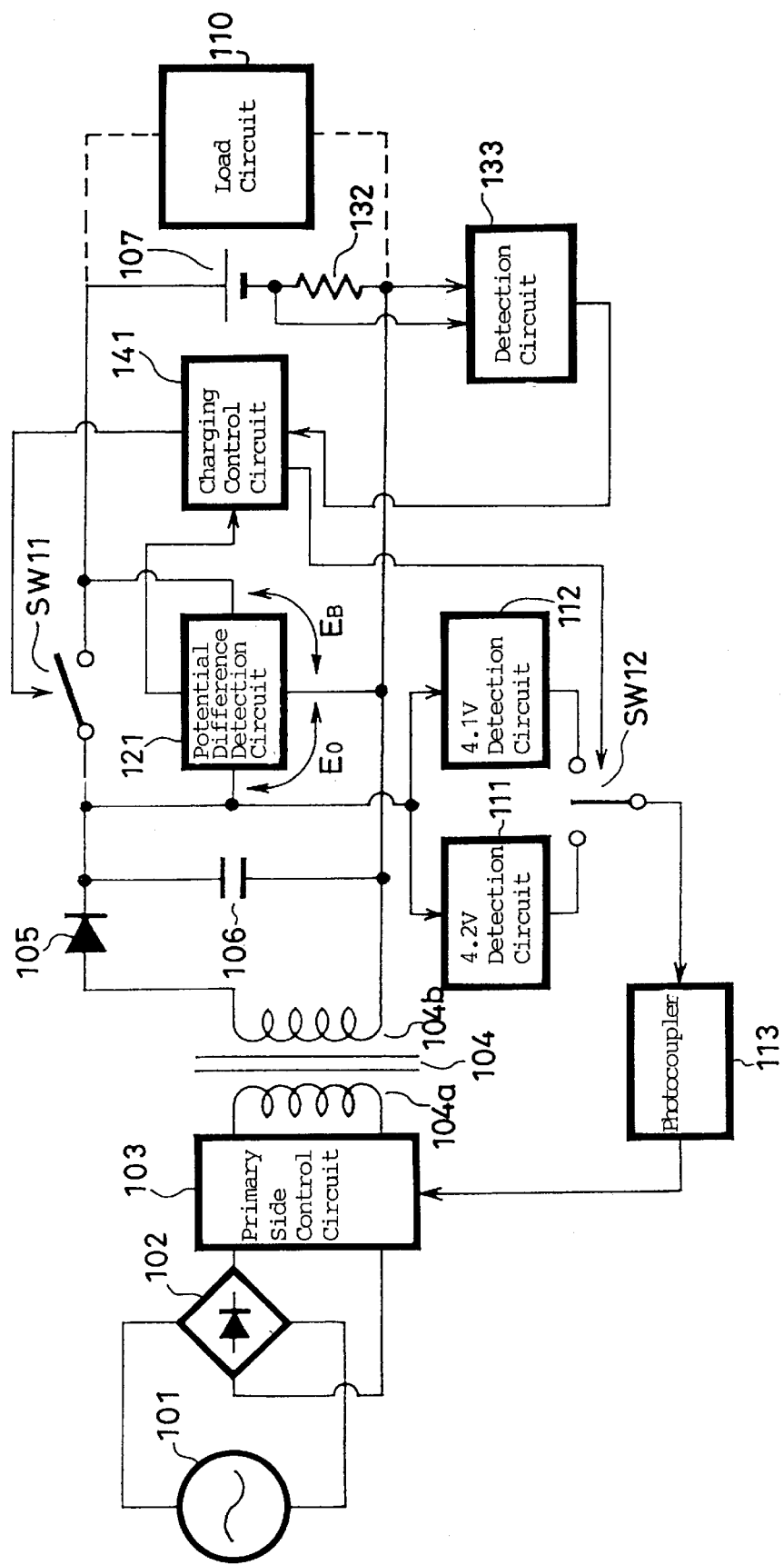
FIG. 46 is a structural diagram showing a charging equipment according to the 15th embodiment of this invention.
Figure 47:
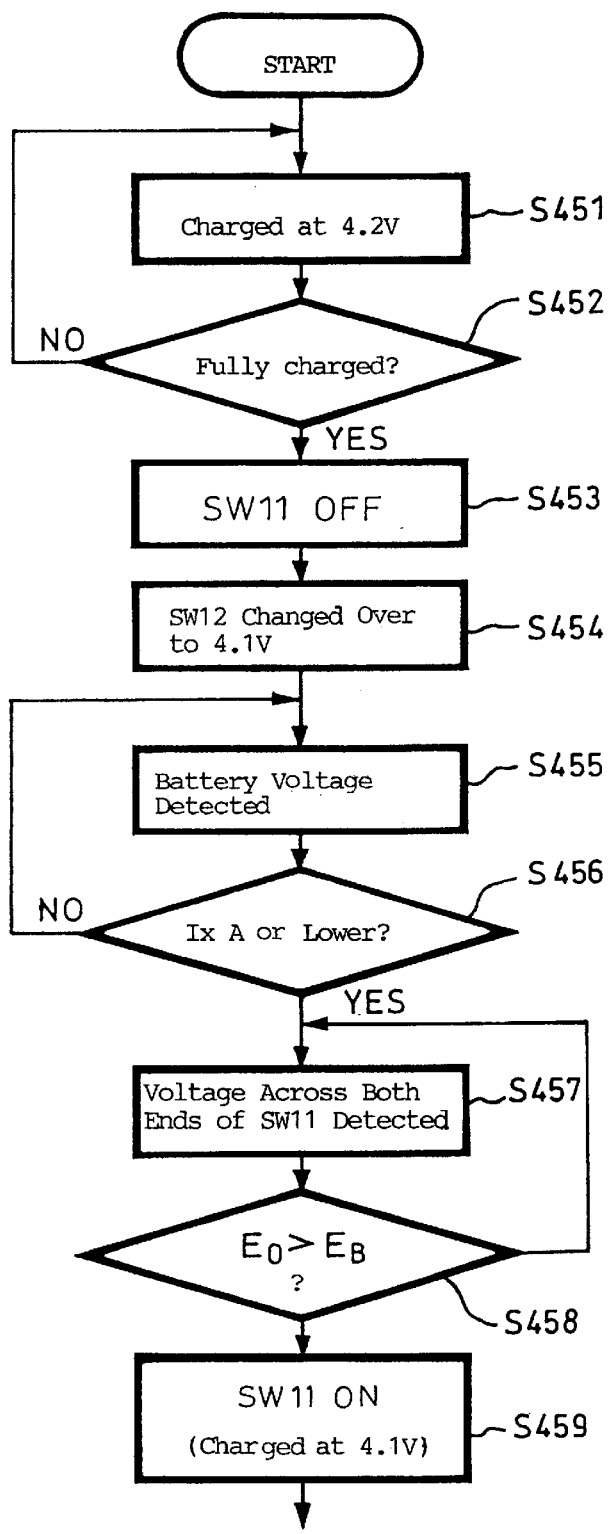
FIG. 47 is a flow chart showing charging processing by the 15th embodiment.

Now referring to FIG. 46 and FIG. 47, the 15th embodiment of the present invention is described. In FIG. 46 showing the configuration of the charging equipment according to this 15th embodiment, parts corresponding to those in FIG. 39, FIG. 42, and FIG. 44 which show configurations of the 12th, 13th, and 14 embodiments, respectively, are denoted by the same reference numerals, and their detailed description is omitted.

In this example as well, the charging equipment is designed to charge the secondary battery 107, a lithium ion battery, and in this case, the resistor 132 for detecting the current flowing through the secondary battery 107 is connected in series to the secondary battery 107, and the potential across both ends of this resistor 132 is detected with the detection circuit 133 and the current flowing through the secondary battery 107 is designed to detect with the detection circuit 133. In addition, a potential difference detection circuit 121 for detecting the potential difference between one end and the other of the connecting switch Sw11 is provided, and with this potential difference detection circuit 121, the power supply potential $E_0$ and the battery potential $E_B$ are detected, and the relationship of the magnitudes between the detected power supply potential $E_0$ and the battery potential $E_B$ is judged and the judgment results are supplied to a charging control circuit 141. In the charging control circuit 141, based on the current detection data from the detection circuit 133 and the potential difference detection data from the detection circuit 121, the switches SW11 and SW12 are controlled to control the charging. This charging control circuit 141 comprises integrated circuits, and the control condition thereof will be later described based on the flow chart of FIG. 47. Other parts are configured in the same manner as in the case of the charging equipment shown in FIG. 39.

Now referring to the flow chart of FIG. 47, operation when the secondary battery 107 is charged with the charging equipment of the configuration of FIG. 46 is described. In the case of this example, a lithium ion battery with the 4.2V battery voltage at the time of full-charge is used for the secondary battery 107.

If the charging remainder of the secondary battery 107, the lithium ion battery, is lower than a specified volume, the charging control circuit 141 controls to turn on the connecting switch SW11 with the connecting switch SW12 set to the 4.2V detection circuit 111 side, and supply 4.2V to the secondary battery 107 for charging (Step S451). It judges whether or not the battery is charged to the full-charge (or a specified capacity close to the full-charge) by detection of the battery voltage, etc. (Step S452), and if it judges that the battery is fully charged, the control circuit turns off the connecting switch SW11 to stop charging (Step S453). And the control circuit allows the connecting switch SW12 to change over to the 4.1V detection circuit 112 side (Step S454).

Under this condition, the current flowing through the secondary battery 107 detected by the current detection circuit 133 is judged by the charging control circuit 141 (step S455). In this event, it is judged whether or not the current value is the predetermined threshold value Ix A or lower (Step S456). In this event, if it is not lower than Ix A, it is judged that there is discharge to the load circuit 110, and the current detection at Step S455 is repeatedly carried out. And if the current value detected at Step S456 is judged to be lower than Ix A, potential $E_0$ and potential $E_B$ are detected by the potential difference detection circuit 121 (Step S457) and it is judged whether the power supply voltage $E_0$ is higher than the battery voltage $E_B$ (Step S458) or not. If it is judged that the power supply voltage $E_0$ is higher, the connection switch SW11 is turned on (Step S459) to resume trickle charging at 4.1V. If the battery voltage $E_B$ is higher than the power supply voltage $E_0$, processing returns to the potential difference judgment at Step S457. For judgment of this potential difference, as with the processing described in the 13th embodiment (processing at Steps S437, S438 of the flow chart of FIG. 43), charging may be designed to be resumed when the power supply voltage $E_0$ is again detected to be higher after a specified time passes.

Because after the secondary battery is once charged to full-charge (or nearly full-charged condition) by charging as shown in the flow chart of FIG. 47, as in the case of each embodiment described above, the switch SW11 between the charging circuit side and the secondary battery is turned off, and only when the battery voltage is detected under this condition and the conditions up to Step S458 are satisfied, the switch SW11 is turned on and charging is resumed, under the condition where charging is stopped, the charging circuit and the secondary battery are held separated, preventing wasteful discharge from the battery because the voltage set on the charging circuit side (4.1V) is lower than the battery voltage (4.2V). In this event, since the battery voltage is judged by the comparison of the power supply voltage, the battery voltage is able to be accurately judged and the judgment of resuming charging is able to be accurately made.

In the 15th embodiment, because after making sure there is no discharge exceeding a specified volume from the battery 107 to the load circuit 110 side, the battery voltage is judged and trickle charging by 4.1V is designed to be carried out, if any discharge exceeding the specified volume exists from the battery 107 to the load circuit 110 side, trickle charge processing of this example is not carried out, but is properly carried out only when trickle charge is needed. When the charging remainder of the battery is considerably reduced due to the discharge to the load circuit 110, regular charging at 4.2V (that is, charging treatment conventionally known) is carried out by another control system not illustrated.

Figure 48:
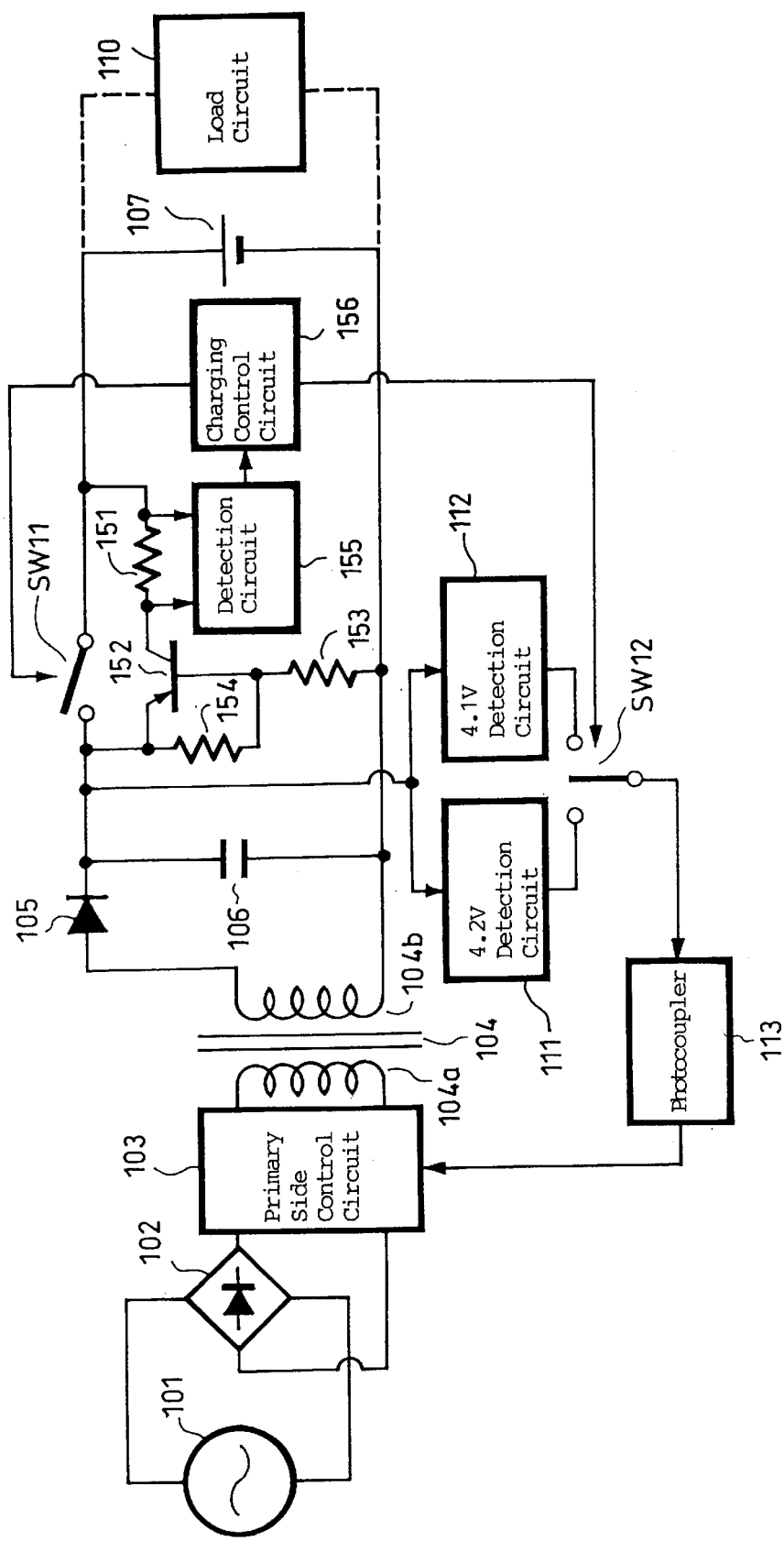
FIG. 48 is a structural diagram showing a charging equipment according to the 16th embodiment of this invention.

Now, referring to FIG. 48 and FIG. 49, the 16th embodiment of this invention will be described. In FIG. 48 showing the configuration of the charging equipment according to this 16th embodiment, parts corresponding to those in FIG. 39 which shows configuration of the 12th embodiment, are denoted by the same reference numerals, and their detailed description is omitted.

In this example as well, the charging equipment is designed to charge the secondary battery 107, a lithium ion battery, and in this case, in parallel with the connecting switch SW11 for controlling the supply of charging voltage to the secondary battery 107, a charging current supply path and a current detection means of the supply path are connected. That is, one end of the connecting switch SW11 (the side connected to the diode 105) is connected to the emitter of a PNP type transistor 152, and the collector of this transistor 152 is connected to the other end (side connected to the secondary battery 107) of the connecting switch SW11 via a resistor 151. And the base of the transistor 152 is connected to the other end of the secondary winding 104b of the switching transformer via a resistor 153, and the emitter and the base of the transistor 152 are the connected by a resistor 154. And the potential across both ends of this resistor 151 is detected with a detection circuit 155 and based on the potential detection thereof, the charging current supplied from the diode 105 side to the secondary battery 107 is detected. This charging current detection data is supplied to a charging control circuit 156. In the charging control circuit 156, based on the current detection data from the detection circuit 155, switches SW11 and SW12 are controlled to control the charging. This charging control circuit 156 comprises integrated circuits, and the control condition thereof will be later described based on the flow chart of FIG. 49. By connecting the transistor 152 to its surrounding circuits as shown in FIG. 49, the current flow via this transistor 152 becomes only the flow from the diode 105 side to the secondary battery 107 side, and no current in the reverse direction is generated. Other parts are configured in the same manner as in the case of the charging equipment shown in FIG. 39.

Figure 49:
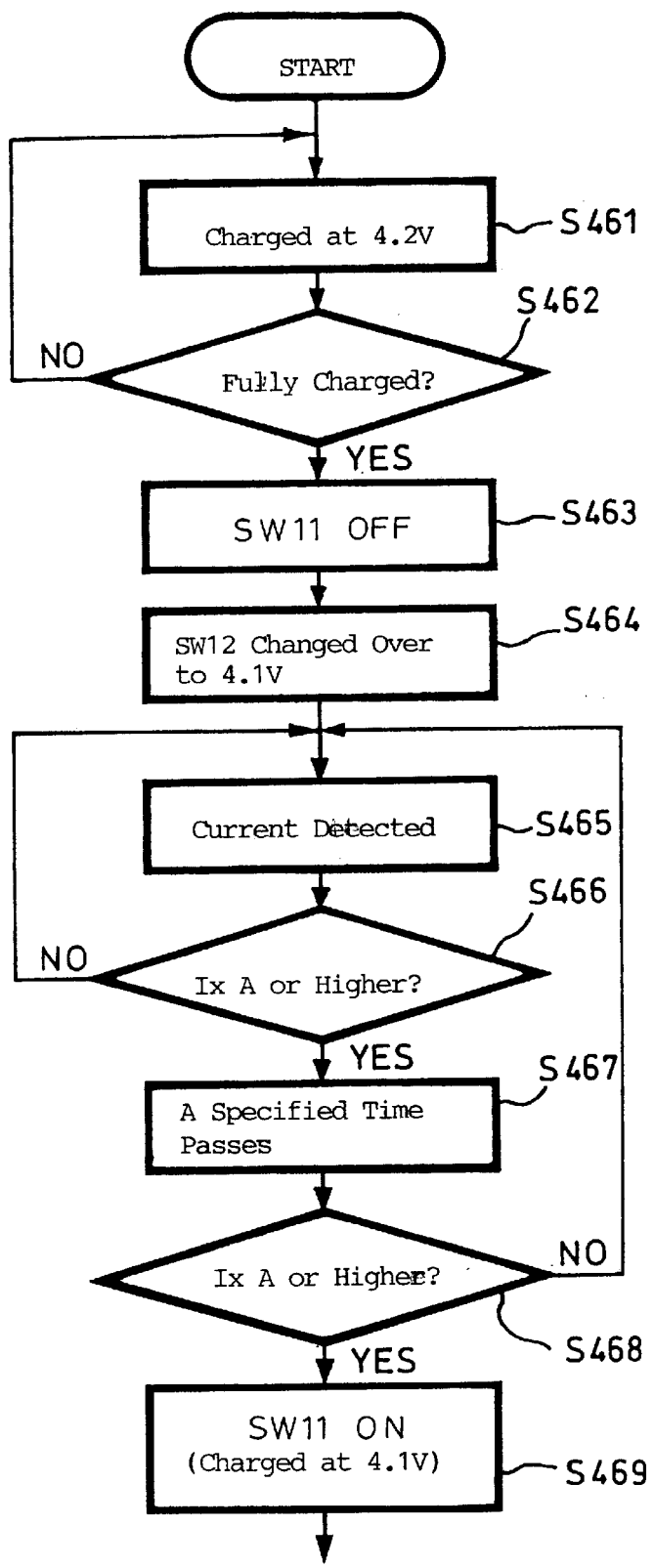
FIG. 49 is a flow chart showing charging processing by the 16th embodiment.

Now referring to the flow chart of FIG. 49, operation when the secondary battery 107 is charged with the charging equipment of the configuration of FIG. 48 is described. In the case of this example, a lithium ion battery with the 4.2V battery voltage at the time of full-charge is used for the secondary battery 107.

If the charging remainder of the secondary battery 107, the lithium ion battery, is lower than a specified volume, the charging control circuit 156 controls to turn on the connecting switch SW11 with the connecting switch SW12 set to the 4.2V detection circuit 111 side, and supply 4.2V to the secondary battery 107 for charging (Step S461). It judges whether or not the battery is charged to the full-charge (or a specified capacity close to the full-charge) by detection of the battery voltage, etc. (Step S462), and if it judges that the battery is fully charged, the control circuit turns off the connecting switch Sw11 to stop charging (Step S463). And the control circuit allows the connecting switch SW12 to change over to the 4.1V detection circuit 112 side (Step S464).

Under this condition, the current flowing through the secondary battery 107 detected by the current detection circuit 155 is judged by the charging control circuit 156 (Step S465). In this event, it is judged whether the current value is a predetermined threshold value Ix A or higher (Step S466). In this event, if it is not lower than Ix A, it is judged that charging current exceeding a specified volume is not generated, and current detection at Step S465 is repeatedly carried out. And if the current detected at Step S466 is judged to be higher than Ix A (that is, the condition in which the charging volume of the secondary battery 107 decreases and charging current is supplied to some extent), after waiting for a predetermined time (for example, a few minutes to scores of minutes) to pass (Step S467), it is again judged whether the current is the predetermined threshold value Ix A or higher (Step S468). In this event, if it is judged not to be higher than Ix A, processing returns to the current judgment at Step S465. And by the repeated current judgment at Step S468, if it is judged that the current is higher than the threshold value Ix A, the connecting switch SW11 is turned on (Step S469). In this event, because the connecting switch SW12 is set to the 4.1V detection circuit 112 side, the secondary battery 107 is charged at 4.1V. Thereafter, detection of the charging current and resumption of charging after a specified time passes after the detection are repeated carried out, and the so-called trickle charging is carried out.

Because the secondary battery is charged as shown in the flow chart of FIG. 49, trickle charging is favorably controlled based on the detection of the charging current. In this case, too, it is possible to prevent wasteful discharge from the secondary battery 107 with charging stopped to the charging circuit side, and in addition, because it is designed to judge that the current higher than the specified current continues to flow for a specified time and to resume charging after detecting the current higher than the specified value when charging is resumed, the battery is accurately checked for the condition suited for resuming charging; thereby proper charging processing can take place. That is, when constant voltage is applied, the lithium ion battery has such characteristics which tend to increase charging current as the battery charging remainder decreases, and making the best use of the characteristics, resumption of charging can be accurately judged.

Figure 50:
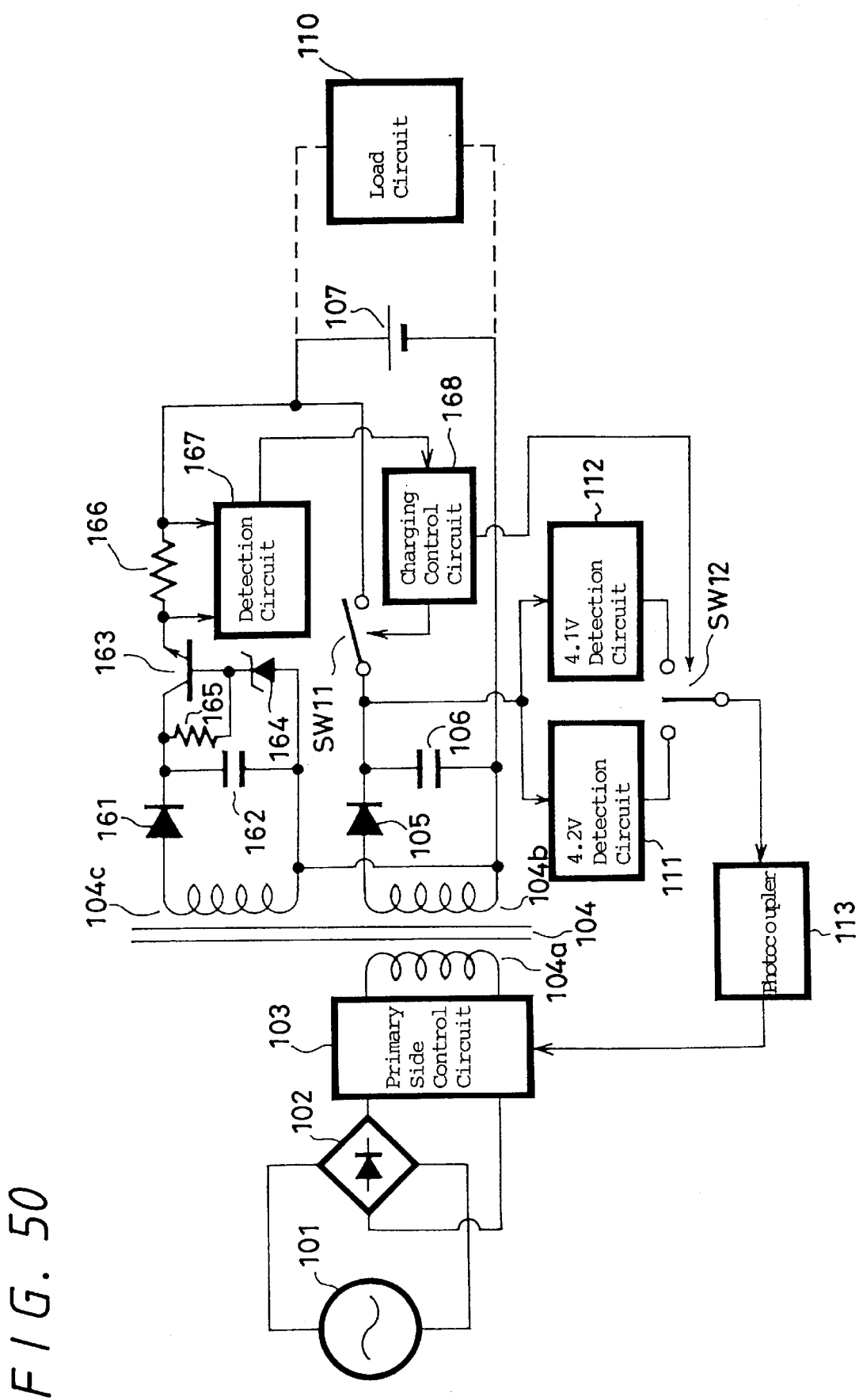
FIG. 50 is a structural diagram showing a charging equipment according to the 17th embodiment of this invention.

Now, referring to FIG. 50, the 17th embodiment of this invention will be described. In FIG. 50 showing the configuration of the charging equipment according to this 17th embodiment, parts corresponding to those in FIG. 39 which shows the configuration of the 12th embodiment, are denoted by the same reference numerals, and their detailed description is omitted.

In this example as well, the charging equipment is designed to charge the secondary battery 107, a lithium ion battery, and in this case, as with the case of the 16th embodiment, in parallel with the connecting switch SW11 for controlling the application of charging voltage to the secondary battery 107, a current detection means is provided, but in the case of this example, this current detection means is designed to be connected to a power supply different from the system to which the switch SW11 is connected.

That is, to the switching transformer 104, an auxiliary winding 104c is provided separately from the secondary winding 104b, and to one end of this auxiliary winding 104c, the anode of a switching diode 161 is connected, and the cathode of this diode 161 and the other end of the auxiliary winding 104c are connected by a switching capacitor 162. And the other end of the auxiliary winding 104c and the other end of the secondary winding 104b are connected in common.

And the cathode of the diode 161 is connected to the collector of a NPN type transistor 163, and the other end of the auxiliary winding 104c is connected to the base of the transistor 163 via a zener diode 164. And the collector and the base of this transistor 163 are connected with a resistor 165. And the emitter of the transistor 163 is connected to one end (positive electrode) of the secondary battery 107 via a resistor 166 for current detection.

And the voltage across both ends of this resistor 166 is detected with a detection circuit 167 and current flowing through the resistor 166 is detected. This current detection data is supplied to a charging control circuit 168 and based on the current detection data from the detection circuit 167, switches SW11 and SW12 are controlled to control the charging. Other parts are configured in the same manner as in the case of the charging equipment shown in FIG. 39.

By configuring in this way, as with the case of the 26th embodiment described above, it is possible to judge the resumption of charging from the charging current, thereby achieving favorable charging control. For charging control with the charge control circuit 168, for example, processing of the flow chart of FIG. 49 described in the 16th embodiment is recommended to carry out.

Figure 51:
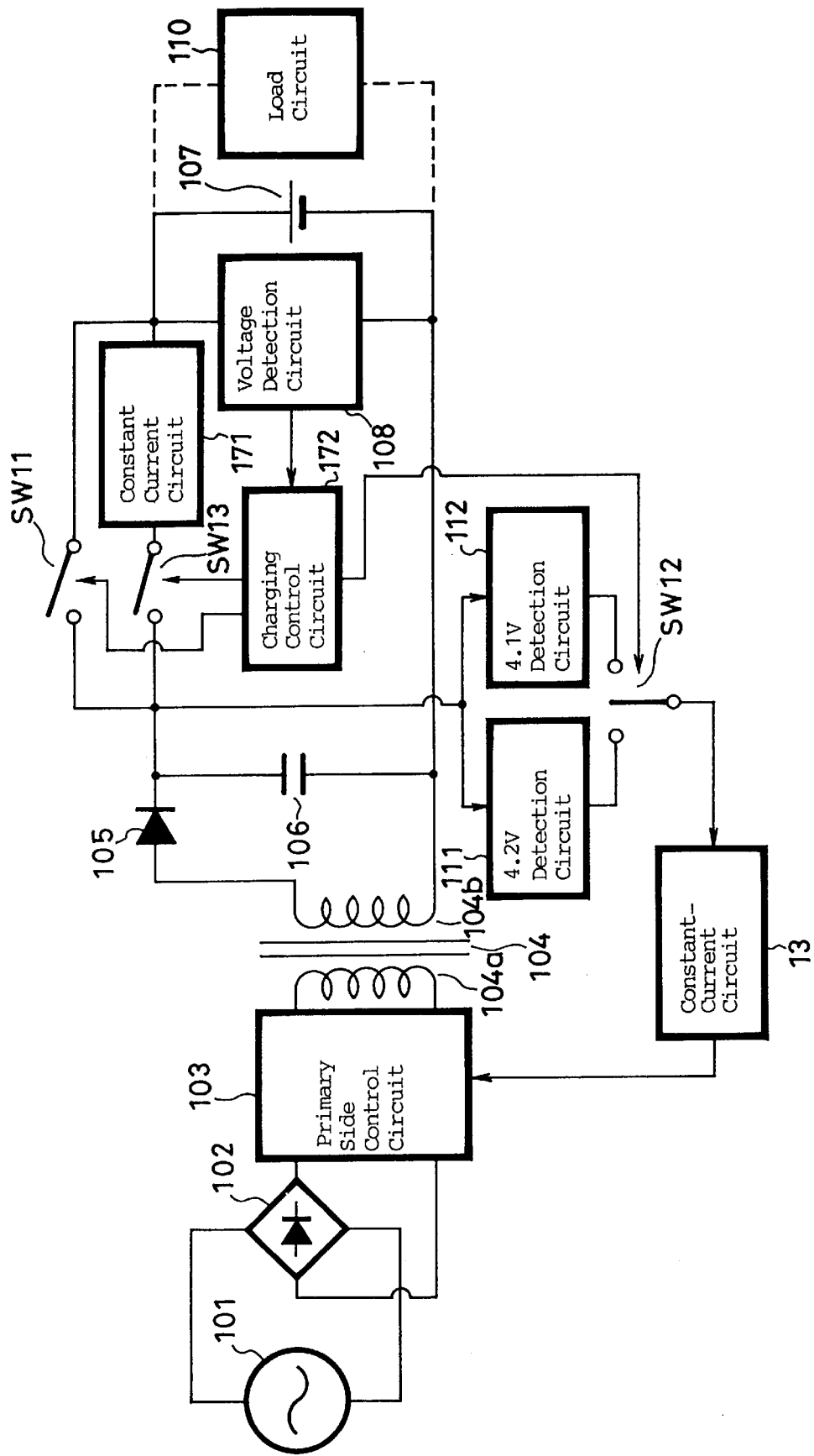
FIG. 51 is a structural diagram showing a charging equipment according to the 18th embodiment of this invention.

Now, referring to FIG. 51 and FIG. 52, the 18th embodiment of this invention will be described. In FIG. 51 showing the configuration of the charging equipment according to this 18th embodiment, parts corresponding to those in FIG. 39 which shows the configuration of the 12th embodiment, are denoted by the same reference numerals, and their detailed description is omitted.

In this example as well, the charging equipment is designed to charge the secondary battery 107, a lithium ion battery, and in this case, in parallel with the connecting switch SW11, a series circuit comprising a connecting switch SW13 and a constant current circuit 171 is connected. And based on the detection data of the battery voltage detection circuit 108 of the secondary battery 107, a charging control circuit 172 is designed to control connecting switches SW11, SW13, and changeover switch SW12. For the output current of the constant current circuit 171, for example, comparatively small current suited for trickle charging is used. Other parts are configured in the same manner as in the case of the charging equipment shown in FIG. 39.

Figure 52:
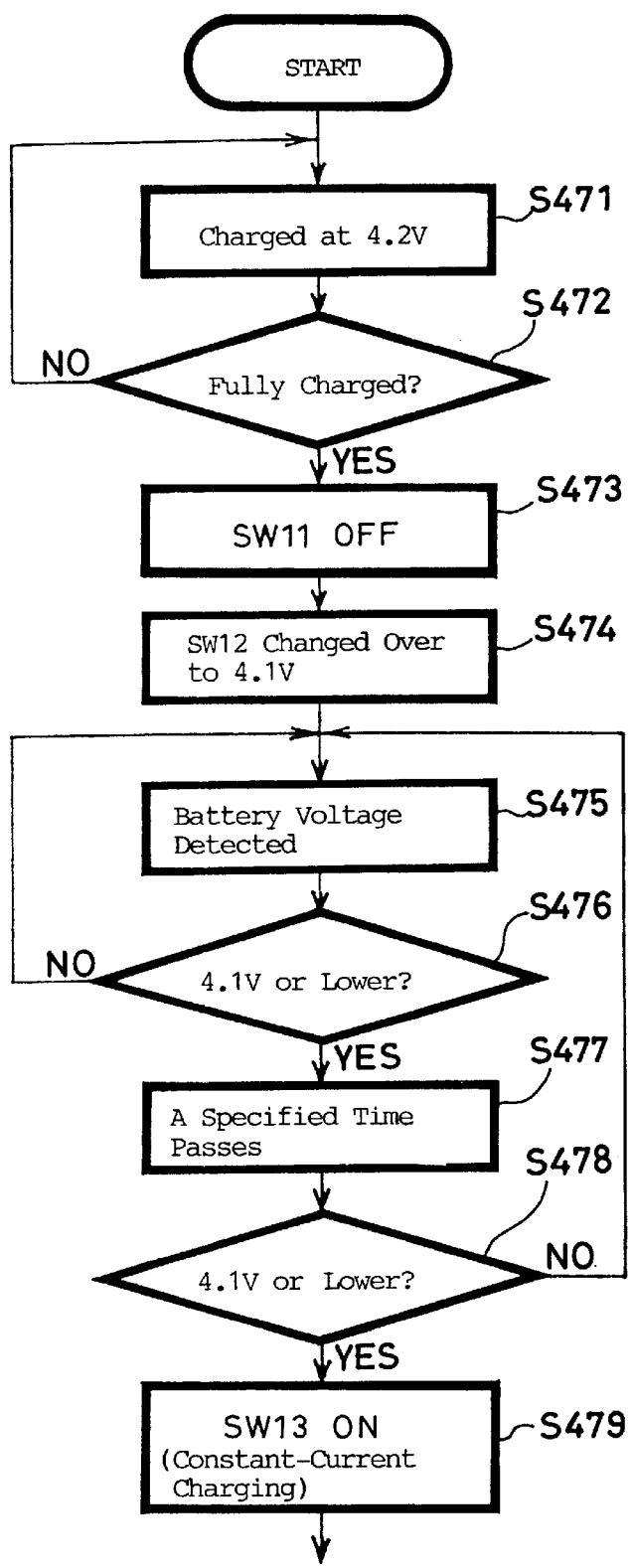
FIG. 52 is a flow chart showing charging processing by the 18th embodiment.

Now referring to the flow chart of FIG. 52, operation when the secondary battery 107 is charged with the charging equipment of the configuration of FIG. 51 is described. In the case of this example, a lithium ion battery with the 4.2V battery voltage at the time of full-charge is used for the secondary battery 107.

First of all, if the charging remainder of the secondary battery 107, the lithium ion battery, is lower than a specified volume, the charging control circuit 172 controls to supply 4.2V to the secondary battery for charging (Step S471) with the changeover switch SW12 set to the 4.2V detection circuit 111 side and the connecting switch SW11 turned on (connecting switch SW13 is held turned off). It is judged whether the battery is charged to the full-charge (or a specified capacity close to the full-charge) by detection of the battery voltage, etc. (Step S472), and if it is judged that the battery is fully charged, the control circuit turns off the connecting switch SW11 (the connecting switch SW13 is held turned off) to stop charging (Step S473). And the control circuit allows the changeover switch SW12 to change over to the 4.1V detection circuit 112 side (Step S474).

Under this condition, the battery voltage detected by the current detection circuit 108 is judged by the charging control circuit 172 (Step S475), In this event, it is judged whether or not the battery voltage is 4.1V or lower (Step S476). In this event, if it is not lower than 4.1V, judgment of the battery voltage at Step S475 is continuously carried out. If it is determined that the battery voltage is lower than 4.1V, then, after waiting for predetermined time (for example, several minutes to several tens of minute) to pass (Step S477), it is again determined whether or not the battery voltage is lower than 4.1V (Step S478). If it is determined that the battery voltage is not lower than 4.1V, then the processing returns to the decision processing for the battery voltage is step S475. If it is determined in the battery-voltage is lower than 4.1V, then the connection switch SW13 is turned on (Step S479). In this event, the connection switch SW11 is kept in its off-state.

In this event, because the changeover switch SW12 is set to the 4.1V detection circuit 112 side, the constant current output by the constant current circuit 171 at 4.1V voltage is supplied to charge the secondary battery 107 until the battery voltage achieves 4.1V. Thereafter, detection of the charging current and resumption of charging after a specified time passes after the detection are repeated carried out, and so-called trickle charging is carried out.

Because the secondary battery is charged as shown in the flow chart of FIG. 52, after the secondary battery is charged once to the full-charge (or, the condition close to full-charge), the switch SW11 across the charging circuit side and the secondary battery is turned off, it is possible to prevent wasteful discharge as with the case of the 11th embodiment. And only when the battery voltage is detected under this state and conditions up to Step S478 are satisfied, constant current charging with switch SW13 turned on is carried out, and charging by constant current can be carried out. Because charging by the constant current is carried out in this way, even when the secondary battery 107 or load circuit 110 is shorted due to a certain factor, only the charging current restricted by the constant current circuit 171 is supplied to the battery side, and hence there is no case in which large current flows to the battery side.

Charging processing in the 18th embodiment is described using an example with the constant current circuit and switch SW13 connected to the charging equipment of the 12th embodiment, but this may be achieved by connecting the series circuit of the constant current output circuit and switch SW13 in parallel to the connecting switch SW11 of the charging equipment from the 13th embodiment to the 17th embodiment described above. For the control of this case, only when trickle charging is resumed, the connecting switch SW13 is turned on, and when other upon other charging, the connecting switch SW11 is turned on.

In each of the above-mentioned embodiments, description is made on the cases when a lithium ion battery is charged as the secondary battery, but needless to say that it can be applied to the charging equipment of the secondary battery requiring charging at other similar characteristics. Values of voltage, current to be charged to full-charge or the like, and time to be set at the timer circuit or the like may be appropriately selected in accord with the voltage characteristics, etc. of the battery used, and shall not be restricted to the values of each of the above-mentioned embodiments.

| EXPLANATION OF REFERENCE NUMBERS | |
|---|---|
| 1 | the switching transformer |
| 2 | the diode |
| 3 | the capacitor |
| 4 | the secondary battery |
| 5 | the resistor |
| 6 | the control circuit |
| 7 | the control circuit |
| 11 | the commercial AC power supply' |
| 12 | the transformer/rectifier circuit |
| 13 | the constant current circuit |
| 14 | the changeover switch |
| 14a | the first fixed contact |
| 14b | the second fixed contact |
| 14m | the movable contact |
| 15 | the constant voltage circuit (for outputting 4.2 V) |
| 16 | the constant voltage circuit (for outputting 4.0 V) |
| 17 | the secondary battery (lithium ion battery) |
| 18 | the voltage detection circuit |
| 19 | the current detection resistor |
| 20 | the current detection circuit |
| 21 | the control circuit |

-continued

EXPLANATION OF REFERENCE NUMBERS

| | |
|---|---|
| 22 | the changeover switch |
| 22a | the first fixed contact |
| 22b | the second fixed contact |
| 22c | the third fixed contact |
| 22m | the movable contact |
| 23 | the constant voltage circuit (for outputting 4.2 V) |
| 24 | the constant voltage circuit (for outputting 4.1 V) |
| 25 | the constant voltage circuit (for outputting 4.0 V) |
| 26 | the control circuit |
| 27 | the temperature sensor |
| 28 | the load circuit |
| 41 | the commercial AC power supply |
| 42 | the rectifier circuit |
| 43 | the primary-side control circuit |
| 44 | the switching transformer |
| 44a | the primary-side winding |
| 44b | the secondary-side winding |
| 44c | the auxiliary winding |
| 45 | the diode |
| 46 | the capacitor |
| 47 | the secondary battery (lithium ion battery) |
| 48 | the field effect transistor |
| 49 | the parasitic diode |
| 50 | the charging control circuit |
| 51 | the voltage detection circuit |
| 52 | the photocoupler |
| 52a | the light emitting diode |
| 52b | the photosensor |
| 53 | the voltage detection circuit |
| 54 | the charging control circuit |
| 55 | the voltage detection/charging control circuit |
| 56, 56 | the resistors |
| 58 | the transistor |
| 59 | the Zener diode |
| 60 | the resistors |
| 62 | the transistor |
| 63 | the resistor |
| 64, 65, 66 | the Zener diodes |
| 67 | the changeover switch |
| 71 | the first constant voltage source |
| 72 | the second constant voltage source |
| 73 | the changeover switch |
| 74 | the diode |
| 75 | the charging control circuit |
| 76 | the capacitor |
| 77 | the voltage detection circuit |
| 81 | the commercial AC power supply |
| 82 | the transformer/rectifier circuit |
| 83 | the constant current circuit |
| 84 | the constant voltage circuit |
| 85 | the secondary battery (lithium ion battery) |
| 86 | the voltage detection circuit |
| 87 | the control circuit |
| 88 | the current detection resistor |
| 89 | the current detection circuit |
| 90 | the load circuit |
| 101 | the commercial AC power supply |
| 102 | the rectifier circuit |
| 103 | the primary-side control circuit |
| 104 | the switching transformer |
| 104a | the primary-side winding |
| 104b | the secondary-side winding |
| 104c | the auxiliary winding |
| 105 | the diode |
| 106 | the capacitor |
| 107 | the secondary battery (lithium ion battery) |
| 108 | the voltage detection circuit |
| 109 | the charging control circuit |
| 110 | the load circuit |
| 111 | the 4.2 V detection circuit |
| 112 | the 4.1 V detection circuit |
| 113 | the photocoupler |
| 121 | the potential difference detection circuit |
| 122 | the charging control circuit |

-continued

EXPLANATION OF REFERENCE NUMBERS

| | |
|---|---|
| 131 | the charging control circuit |
| 132 | the resistor |
| 133 | the detection circuit |
| 141 | the charging control circuit |
| 151 | the resistor |
| 152 | the transistor |
| 153, 154 | the resistors |
| 155 | the detection circuits |
| 156 | the charging control circuit |
| 161 | the diode |
| 162 | the capacitor |
| 163 | the transistor |
| 164 | the Zener diode |
| 165, 166 | the resistors |
| 167 | the detection circuit |
| 168 | the charging control circuit |
| 171 | the constant current circuit |
| 172 | the charging control circuit |
| SW1, SW2, SW3, SW4 | the connection switches |
| SW12 | the changeover switch |
| SW13 | the connection switch |

What is claimed is:

1. A charging method for a secondary battery, comprising:
    detecting a charging current;
    changing over a voltage applied to said secondary battery to a second voltage lower than a first voltage when said charging current reaches a first charging current corresponding to a substantially charged condition of said secondary battery during charging while said first voltage is applied to said secondary battery; and
    changing over said voltage applied to said secondary battery to said first voltage when said charging current exceeds a second charging current corresponding to a discharging battery voltage while said second voltage is applied to said secondary battery.

2. The charging method according to claim 1, wherein said second charging current is equal to said first charging current.

3. The charging method according to claim 1, further comprising:
    measuring one of an internal temperature and an environmental temperature surrounding said secondary battery; and
    changing over the application of said second voltage to the application of a third voltage instead of said first voltage when said measured temperature exceeds a specified temperature, wherein said third voltage is in a range between said first and second voltages.

4. The charging method according to claim 3, wherein said third voltage is continuously changed in response to said measured temperature.

5. A charging method for a secondary battery, comprising:
    detecting a charging current;
    changing over a voltage applied to said secondary battery to a second voltage lower than a first voltage when a voltage of said secondary battery corresponding to a substantially charged condition is detected during charging said secondary battery while applying said first voltage; and
    changing over said voltage applied to said secondary battery to said first voltage when said charging current reaches a specified charging current while said second voltage is applied to said secondary battery.

6. The charging method according to claim 5, further comprising changing over the application of said second voltage to the application of a third voltage in a range between said first and second voltages instead of said first voltage when one of an internal temperature and an environmental temperature surrounding said secondary battery reaches a specified temperature or higher.

7. The charging method according to claim 6, wherein said third voltage is continuously changed in response to said detected temperature.

8. A charging method for a secondary battery, comprising:
   detecting a potential across respective ends of a switching means for controlling a supply of a charging power supply to said secondary battery and a potential across respective ends of said secondary battery while a low-voltage charging power supply is fed to said secondary battery; and
   turning on said switching means based on said detected potentials for starting charging of said secondary battery with said supply of said charging power supply being fed to said secondary battery at a specified voltage.

9. The charging method according to claim 8, wherein a field effect transistor is used as said switching means to increase an impedance across respective ends of said field effect transistor and for detecting said potential.

10. The charging method according to claim 8, wherein a voltage of said charging power supply when detecting said potential is set to a value of about the lowest required voltage for controlling said switching means.

11. The charging method according to the claim 8, wherein said supply of said charging power supply is increased in response to with an increase of said potential across said respective ends of said secondary battery after the start of said charging.

12. The charging method according to claim 8, wherein said supply of said charging power supply is changed in a plurality of stages and increased in response to an increase of said potential across said respective ends of said secondary battery after said charging begins.

13. The charging method according to claim 8, wherein said supply of said charging power supply when said potential is detected is lowered to a voltage below the minimum required for controlling said switching means, and
   said charging power supply is accumulated in a charge-storage means, thereby securing a charge required for carrying out a corresponding control by said switching means.

14. The charging method according to claim 8, wherein after charging is stopped when a substantially fully charged state of said secondary battery is detected and when said secondary battery is detected to be at a specified electrical state,
   charging of said secondary battery is restarted after a specified time passes from this detection.

15. The charging method according to claim 14, wherein said specified electrical state is detected by detecting that a battery voltage of said secondary battery is lower by a specified value than a standard voltage with which said charging voltage is set.

16. The charging method according to claim 14, wherein said specified electrical state is detected by detecting that a battery voltage reaches a specified voltage from a voltage value with a grounding potential of said secondary battery set as a standard.

17. The charging method according to claim 14, wherein said specified electrical state is detected by detecting that a charging current reaches a specified value when a predetermined voltage is applied to said secondary battery.

18. The charging method according to claim 17, wherein said predetermined voltage is a voltage lower than said supply of said charging power supply.

19. The charging method according to claim 8, further comprising:
   detecting an electrical condition of said secondary battery periodically when a specified time passes from a time when a substantially fully charged state of said secondary battery is detected and charging is stopped; and
   restarting said charging when said detected electrical condition is a specified condition.

20. The charging method according to claim 19, wherein charging is restarted after said specified time passes from a time when said specified electrical condition is detected.

21. The charging method according to claim 19, wherein said specified condition is a charging current exceeding a specified value when a charging voltage or a voltage lower than said charging voltage is applied to said secondary battery.

22. The charging method according to claim 19, wherein said specified condition is detected when a voltage of said secondary battery equals said specified voltage.

23. The charging method according to claim 22, wherein when said voltage of said secondary battery does not reach said specified voltage and charging is not restarted, an energy required for detecting said voltage is charged in said secondary battery.

24. The charging method according to claim 22, wherein said specified condition is detected when a battery voltage is lower than a specified voltage.

25. The charging method according to claim 22, wherein said specified condition is detected when a battery voltage equals said specified voltage value from a voltage set with a grounding potential of said secondary battery designated as a standard.

26. A charging equipment for a secondary battery, comprising:
   first voltage feeding means for feeding a first voltage to said secondary battery;
   second voltage feeding means for feeding a second voltage lower than said first voltage to said secondary battery;
   current detection means for detecting a charging current to said secondary battery; and
   control means for changing over said first voltage feeding means to said second voltage feeding means based on an output of said current detection means, wherein when said current detecting means detects a first charging current corresponding to a substantially charged condition of said secondary battery said first voltage feeding means is changed over to said second voltage feeding means, and when said current detection means detects a current exceeding a second charging current while said second voltage feeding means is applied, said second voltage feeding means is changed over to said first voltage feeding means.

27. The charging equipment according to claim 26, wherein said first charging current is equal to said second charging current.

28. The charging equipment according to claim 26, further comprising:
   third voltage feeding means for feeding a third voltage in a range between said first and second voltages to said secondary battery; and
   temperature detection means for detecting one of an internal temperature and an environmental temperature surrounding said secondary battery, wherein when said detected temperature exceeds a specified temperature said second voltage feeding means is changed over to said third voltage feeding means instead of said first voltage feeding means.

29. The charging equipment according to claim 28, wherein an output voltage of said third voltage feeding means is continuously changed in response to said detected temperature.

30. A charging equipment for a secondary battery, comprising;
   first voltage feeding means for feeding a first voltage to said secondary battery;
   second voltage feeding means for feeding a second voltage lower than said first voltage to said secondary battery;
   current detection means for detecting a charging current to said secondary battery;
   voltage detection means for detecting a secondary battery voltage; and
   control means for changing over said first voltage feeding means to said second voltage feeding means based on outputs of said voltage and current detection means, wherein when a specified voltage corresponding to a substantially charged condition of said secondary battery is detected by the voltage detection means said first voltage feeding means is changed over to said second voltage feeding means, and when said current detection means detects a current exceeding a specified charging current while said second voltage feeding means is applied to said secondary battery said second voltage feeding means is changed over to said first voltage feeding means.

31. The charging equipment according to claim 30, further comprising;
   third voltage feeding means for feeding a third voltage in a range between said first and second voltages to said secondary battery; and
   temperature detection means for detecting one of an internal temperature and an environmental temperature surrounding said secondary battery, wherein when said detected temperature of said temperature detecting means exceeds a specified temperature said second voltage feeding means is changed over to said third voltage feeding means instead of said first voltage feeding means.

32. The charging equipment according to claim 31, wherein said third output voltage of said third voltage feeding means is continuously changed in response to said temperature detected by said temperature detecting means.

33. A charging equipment for a secondary battery, comprising:
   a power supply circuit for feeding a charging power to said secondary battery;
   switching means for controlling said power supply circuit feed to said secondary battery;
   detecting means for detecting a potential across respective ends of said switching means and a potential across respective ends of said secondary battery while a low-voltage charging power is fed from said power supply circuit to said secondary battery; and
   charging control means for starting charging of said secondary battery by turning on said switching means in response to said detected potentials by said detection means and for controlling said power supply circuit to feed a specified voltage to said secondary battery.

34. The charging equipment according to claim 33, wherein a field-effect transistor is used as said switching means, and said potential is detected by the said detection means by increasing an impedance across respective ends of said field-effect transistor.

35. The charging equipment according to claim 33, wherein a voltage of said power supply circuit when detected by said detection means is set to a value of about the lowest voltage required for controlling said switching means.

36. The charging equipment according to claim 33, wherein said charging power of said power supply is increased in response to an increase of said potential across said respective ends of said secondary battery after starting said charging.

37. The charging equipment according to claim 33, wherein said charging power of said power supply circuit is varied in a plurality of stages in response to an increase of said potential across said respective ends of said secondary battery after starting said charging.

38. The charging equipment according to claim 33, wherein a charged load storage means is connected across said power supply circuit and said charging control means; and
   said charging power of said power supply circuit detected by said detection means is lowered to the minimum power required for controlling said switching means.

39. The charging equipment according to claim 33, further comprising:
   battery condition detecting means for detecting a condition of said secondary battery; and
   a timer triggered by said battery condition detecting means, wherein when a specified time passes from a start of operation of said timer means said charging control means starts charging said secondary battery.

40. The charging equipment according to claim 39, wherein said condition of said secondary battery is a specified voltage.

41. The charging equipment according to claim 39, wherein said condition of said secondary battery is a charging current of a specified value when a predetermined voltage is applied to said secondary battery.

42. The charging equipment according to claim 41, wherein said predetermined voltage for pre-charging is a voltage lower than said charging voltage.

43. The charging equipment according to claim 39,
   wherein said timer means is triggered when said battery condition detection means detects a substantially fully charged condition of said secondary battery, and said charging control means controls said battery condition detection means to detect a condition of said secondary battery periodically when a specified time passes from a time when said timer is triggered, and when said detected condition is a specified condition charging is restarted.

44. The charging equipment according to claim 43, wherein charging is restarted when said specified time passes from a time when said specified condition is detected.

45. The charging equipment according to claim 43, wherein said battery condition detection means detects a charging current exceeding a specified value when a charging voltage or a voltage lower than said charging voltage is applied to the said secondary battery.

46. The charging equipment according to claim 43, wherein said battery condition detection means detects a battery voltage of said secondary battery equal to said specified voltage.

47. The charging equipment according to claim 46, wherein an energy required for detecting a battery voltage is charged in said secondary battery by controlling said charging control means when said secondary battery voltage does not reach said specified voltage and charging is not restarted.

48. An integrated circuit for controlling charging of a secondary battery, in which a charging current to said secondary battery is detected and control is carried out for selectively supplying a first voltage and a second voltage lower than said first voltage to said secondary battery, wherein when said secondary battery is judged to be at a substantially charged condition based on a first value of said detected charging current while said first voltage is applied to said secondary battery said first voltage is changed over to said second voltage, and when said secondary battery is judged to be in a discharging condition based on a second value of said detected charging current while said second voltage is applied to said secondary battery, said second voltage is changed over to said first voltage.

49. The integrated circuit according to claim 48, wherein one of an internal temperature and an environmental temperature surrounding said secondary battery is measured, and when said measured temperature exceeds a specified temperature control is carried out for applying a third voltage in a range between said first voltage and said second voltage to said secondary battery.

50. The integrated circuit according to claim 48, wherein said third voltage is controlled to be continuously changed in response to said measured temperature.

51. An integrated circuit for controlling charging of a secondary battery, in which a charging current to said secondary battery is detected and control is carried out for selectively supplying a first voltage and a second voltage lower than said first voltage to said secondary battery, wherein when said secondary batter is judged to be at a substantially charged condition based on a value of a detected charging voltage while said first voltage is applied to said secondary battery said first voltage is changed over to said second voltage, and when said secondary battery is judged to be in a discharging condition based on a value of said detected charging current while said second voltage is applied to said secondary battery, said second voltage is changed over to said first voltage.

52. The integrated circuit according to claim 51, wherein one of an internal temperature and an environmental temperature surrounding said secondary battery is measured, and when said measured temperature exceeds a specified temperature control is carried out for applying a third voltage in a range between said first voltage and said second voltage to said secondary battery.

53. The integrated circuit according to claim 52, wherein said third voltage is controlled to be continuously changed in response to said measured temperature.

54. An integrated circuit for controlling charging of a secondary battery, wherein a potential across respective ends of a switching means for controlling a supply of a charging power supply to said secondary battery and a potential across respective ends of said secondary battery is detected while a low-voltage charging power supply is fed to said secondary battery, and said switching means is controlled based on said detected potentials for starting charging of said secondary battery with said supply of said charging power supply supplied being fed to said secondary battery at a specified voltage.

55. The integrated circuit according to claim 54, wherein said detected potential across respective ends of said secondary battery is judged after said charging begins, and controls is carried out to raise said supply of said charging power supply in response to an increase of said judged potential.

56. The integrated circuit according to claim 54, wherein a detected value of said potential across said respective ends of said secondary battery is judged after said charging begins, and control is carried out for raising said supply of said charging power supply by varying said supply in a plurality of stages in response to an increase of said judged potential.

57. The integrated circuit according to claim 54, wherein when it is judged that the battery is at a specified electrical condition and after charging is stopped when a substantially fully charged state of said secondary battery is detected, charging of said secondary battery is restarted after a specified time passes from the judgment of said specified electrical condition.

58. The integrated circuit according to claim 57, wherein said specified electrical condition is judged by judging that a battery voltage of said secondary battery reaches a specified voltage.

59. The integrated circuit according to claim 57, wherein said specified electrical condition is judged by judging that a charging current reaches a specified current value when a specified voltage is applied to said secondary battery.

60. The integrated circuit according to claim 59, wherein said specified voltage is lower than said supply of said charging power supply.

61. The integrated circuit according to claim 54, wherein a specified electrical condition of said secondary battery is judged periodically when a specified time passes from a time when a substantially fully charged state of said secondary battery is detected and charging is stopped, and when it is judged that said battery enters said specified electrical condition said charging is restarted.

62. The integrated circuit to claim 61, wherein charging is restarted after said specified time passes from a time when it is judged that said specified electrical condition is reached.

63. The integrated circuit according to claim 61, wherein said specified electrical condition is a detected charging current exceeding a specified value when a charging voltage or a voltage lower than said charging voltage is applied to said secondary battery.

64. The integrated circuit according to claim 61, wherein said specified electrical condition is a detected secondary battery voltage equal to said specified voltage.

65. The integrated circuit according to claim 64, wherein control is carried out so that at least an energy required for detecting a battery voltage is charged in said secondary battery when said detected secondary battery voltage does not reach said specified voltage and charging is not restarted.

* * * * *